(12) United States Patent
Kile

(10) Patent No.: US 12,082,532 B1
(45) Date of Patent: Sep. 10, 2024

(54) SIEVE CHUTES FOR A LOWER SIEVE OF AN AGRICULTURAL COMBINE

(71) Applicant: Ronald J. Kile, Rosalia, WA (US)

(72) Inventor: Ronald J. Kile, Rosalia, WA (US)

( * ) Notice: Subject to any disclaimer, the term of this patent is extended or adjusted under 35 U.S.C. 154(b) by 0 days.

(21) Appl. No.: 18/623,687

(22) Filed: Apr. 1, 2024

(51) Int. Cl.
    *A01F 12/44*     (2006.01)
    *A01F 12/48*     (2006.01)
    *A01F 12/52*     (2006.01)

(52) U.S. Cl.
    CPC ............ *A01F 12/446* (2013.01); *A01F 12/48* (2013.01); *A01F 12/52* (2013.01)

(58) Field of Classification Search
    CPC ......... A01F 12/446; A01F 12/48; A01F 12/52
    See application file for complete search history.

(56) References Cited

U.S. PATENT DOCUMENTS

| | | | | |
|---|---|---|---|---|
| 2,253,296 A * | 8/1941 | Holtzman | ............. | A01F 12/446 |
| | | | | 209/394 |
| 3,593,719 A * | 7/1971 | Ashton | .................... | A01F 12/00 |
| | | | | 460/73 |
| 3,742,686 A * | 7/1973 | Rowland-Hill | ........... | A01F 7/06 |
| | | | | 56/12.9 |
| 3,757,797 A * | 9/1973 | Mathews | .................. | B07B 1/42 |
| | | | | 460/13 |
| 4,208,858 A * | 6/1980 | Rowland-Hill | ........... | A01F 7/06 |
| | | | | 460/98 |
| 4,480,643 A * | 11/1984 | Alm | ...................... | A01F 12/446 |
| | | | | 460/99 |
| 4,712,568 A * | 12/1987 | Strong | .................. | A01F 12/448 |
| | | | | 460/109 |
| 9,521,808 B2 * | 12/2016 | Farley | .................... | A01F 12/446 |
| 2008/0318650 A1 * | 12/2008 | Dhont | ..................... | A01F 12/32 |
| | | | | 460/101 |
| 2010/0064652 A1 * | 3/2010 | Straeter | ................ | A01D 75/282 |
| | | | | 56/303 |
| 2014/0128133 A1 * | 5/2014 | Claerhout | ............. | A01F 12/446 |
| | | | | 460/101 |
| 2016/0286728 A1 * | 10/2016 | De Smet | ............... | A01F 12/446 |

(Continued)

FOREIGN PATENT DOCUMENTS

| | | | | |
|---|---|---|---|---|
| CN | 106576578 A | * | 4/2017 | ............. A01D 41/12 |
| DE | 3720696 C1 | * | 7/1988 | ........... A01F 12/446 |
| EP | 0121094 A1 | * | 10/1984 | ............. A01F 12/44 |

(Continued)

*Primary Examiner* — Arpad Fabian-Kovacs

(74) *Attorney, Agent, or Firm* — Parsons & Goltry, PLLC; Michael W. Goltry; Robert A. Parsons

(57) ABSTRACT

An agricultural combine has a cleaning shoe including an upper sieve or chaffer over a lower sieve. The lower sieve is over a clean gain chute. A return chute open to a return opening is under the clean grain chute. The clean grain chute receives clean grain from the chaffer and the lower sieve. The return chute receives unclean grain and tailings from the cleaning shoe through the return opening. The chaffer's rear extremity extends beyond the lower sieve's rear extremity configured with a sieve chute. The sieve chute is spaced under the chaffer's rear extremity and extends rearward and angularly upward above the return opening toward the chaffer's rear extremity from the lower sieve's rear extremity, allowing the sieve chute to intercept grain from the chaffer and divert it forward to the lower sieve and away from the return opening.

26 Claims, 34 Drawing Sheets

(56) References Cited

U.S. PATENT DOCUMENTS

2019/0335667 A1* 11/2019 Duquesne ............. A01F 12/446
2023/0240191 A1* 8/2023 Mayerle ............. A01D 41/1243
                                                                                                    56/14.7

FOREIGN PATENT DOCUMENTS

| GB | 2032749 A | * | 5/1980 | ......... A01D 41/1208 |
| WO | WO-2015121725 A1 | * | 8/2015 | ............. A01F 12/44 |
| WO | WO-2017042050 A1 | * | 3/2017 | ........... A01F 12/305 |

* cited by examiner

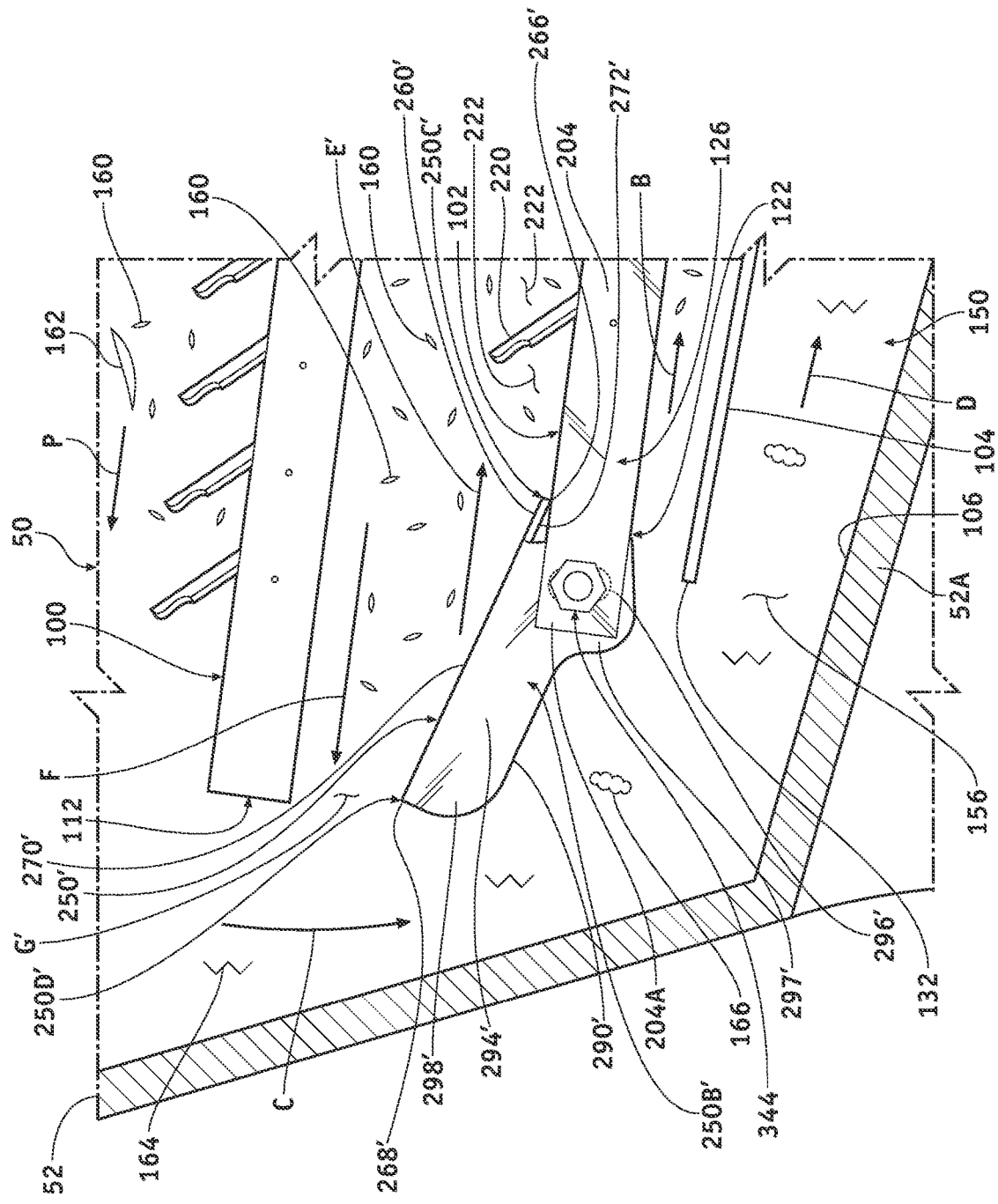

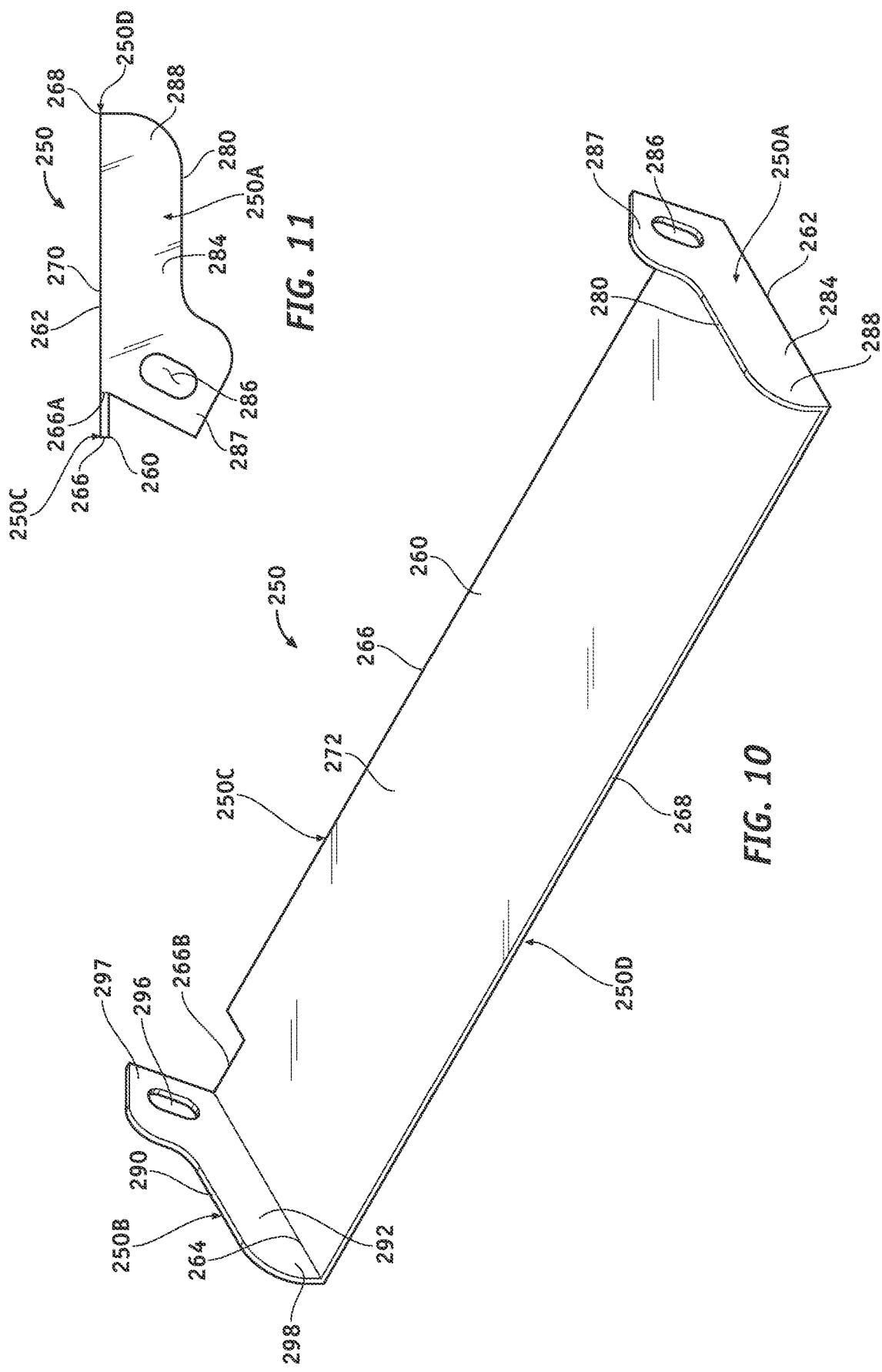

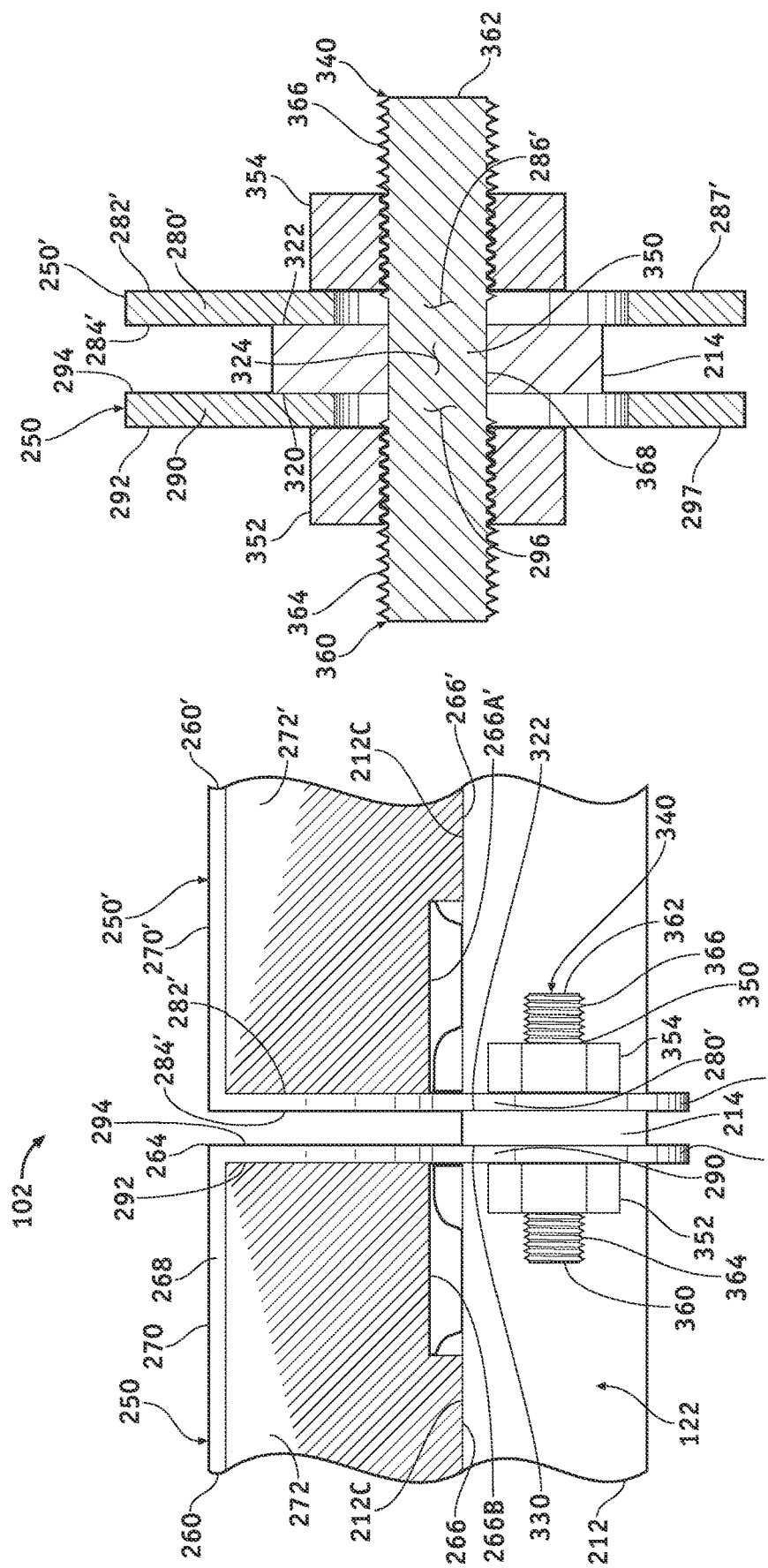

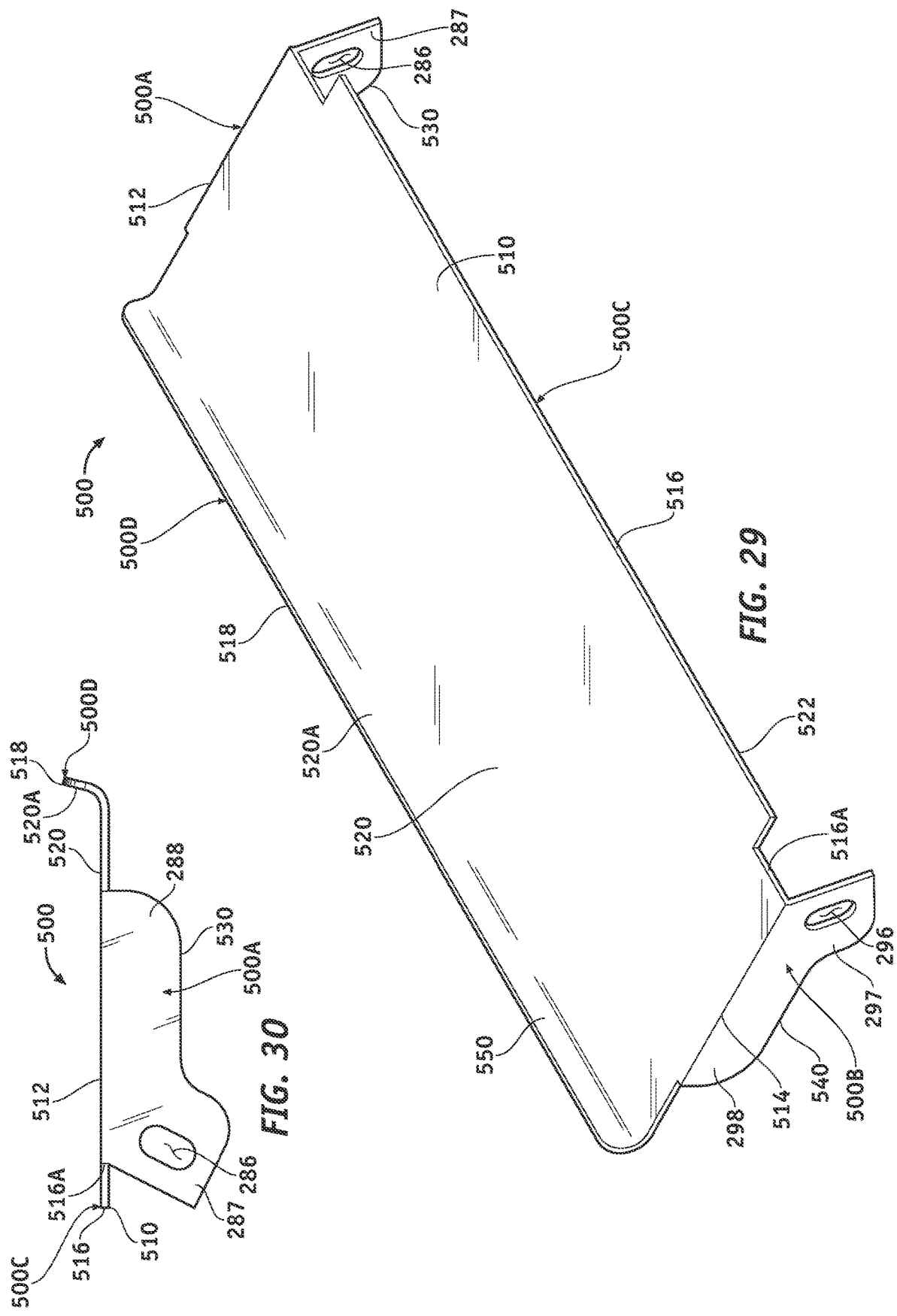

SIEVE CHUTES FOR A LOWER SIEVE OF AN AGRICULTURAL COMBINE

FIELD OF THE INVENTION

The present invention relates to agricultural combines.

More particularly, the present invention relates to agricultural combine cleaning systems.

In a further and more specific aspect, the present invention relates to sieves of agricultural combine cleaning systems.

DESCRIPTION OF RELATED ART

An agricultural combine performs the essential functions of harvesting, threshing, and cleaning grain, such as wheat, barley, corn, rye, oats, flaxseed, sorghum, soybeans, mixed grain, and other food grains, feed grains, and oilseeds. A standard combine includes a crop harvesting apparatus or header at its forward end. The header is open to an infeed mechanism or feeder house. The infeed mechanism is open to the combine's processor, including the threshing and separating apparatus open to the combine's cleaning shoe housing the combine's cleaning system.

The header reaps the crop as the combine moves through the field at a predetermined ground speed. The infeed mechanism receives the crop material and feeds it to the combine's threshing and separating apparatus. The threshing and separating apparatus threshes the crop material, separating the grain from the chaff, the husks of grains and grasses. The cleaning system receives the threshed crop material, which includes clean grain and impurities or material other than clean grain, including the chaff, tailings, and any unclean grain, grain not wholly separated from the chaff. The cleaning system separates the clean grain from the impurities. It discharges most impurities through the rear of the combine while directing the clean grain to the combine's grain tank. The combine operator actuates an unloading auger to unload the grain tank periodically. A fan blows most of the impurities outward through the rear of the combine. A beater that receives impurities from the threshing and separating apparatus propels most of it through the rear of the combine.

The cleaning system includes the fan and two reciprocally mounted sieves or sieve plates. The sieves include an upper sieve or chaffer spaced above a lower sieve. The lower sieve is so named because it is under the chaffer. The chaffer has a rear extremity at the rear of the combine. The lower sieve has a rear extremity at the rear of the combine. The rear extremity of the chaffer extends rearward beyond the rear extremity of the lower sieve. The chaffer and the lower sieve have transverse openings or passages between adjacent louvers. The openings grade the material by size such that smaller grains fall through the openings, and larger pieces of material move rearward and off the sieves and outwardly through the back of the combine. The fan blows air upward and rearward through the chaffer and the lower sieve. Reciprocation of the chaffer and the lower sieve consolidates the grain and the chaff into a rearward moving crop layer atop the chaffer, a conglomerate mass of clean grain and the material other than clean grain, namely, chaff, unclean grain, and tailings, rearward moving along a crop layer flow path over the chaffer. Air from the fan blowing rearward and upward to the crop layer through the passages between the louvers of the chaffer and the lower sieve separates the clean grain from material other than grain. The blowing air creates a force that urges the chaff and light impurities to float on top of the chaffer in an airborne state to be directed toward and expelled from a discharge end of the combine. The heavier clean grain falls through the openings of the chaffer and the lower sieve to a clean grain chute under the lower sieve. The clean grain chute conveys the clean grain to a clean grain trough. A clean grain auger or conveyor operates in the clean grain trough, transferring the clean grain from the clean grain trough to the combine's grain tank.

A standard combine has a return configured to receive unclean grain and tailings from the cleaning shoe and return it to the threshing and separating apparatus to reprocess it. The return consists of a return elevator or conveyor operating in a return trough open to a return chute that extends rearward from the return trough to a return opening at the rear of the combine. The return opening is proximate to and under the lower sieve's rear or rear end toward the rear of the combine. The return chute receives unclean grain and tailings from the cleaning shoe through the return opening. The return chute conveys the unclean grain and tailings through a return pathway from the return opening to the return trough. The return elevator or conveyor, usually of the paddle type, receives the unclean grain and tailings at the return trough and returns it to the combine's threshing and separating apparatus for reprocessing it.

The ground speed of the combine harvester is the rate at which it moves through the field while harvesting crops. The combine operator determines the combine's ground speed. Crucially, the combine's ground speed determines the amount of material that enters the combine's processor. If the combine moves too fast, it may overwhelm the processor. If the combine moves too slow, it can result in inefficient harvesting.

Standard combine returns inherently allow some clean grain from the chaffer to pass downward to the rear of the lower sieve's rear extremity to the return through the underlying return opening. The clean grain lost to the return through the return opening passes through the return pathway by the return chute to the return trough and back to the combine's threshing and separating apparatus by the return elevator or conveyor operating in the return trough. The loss of clean to the return from the combine's shoe is unsatisfactory. It unfavorably influences grain loss and the yield of clean grain to the combine's grain tank. The return of clean grain to the combine's processor by the return elevator or conveyor operating in the return trough burdens the threshing and separating apparatus by causing it to process the lost clean grain returned to it and the crop material it receives from the feeder house. The increased burden on the threshing and separating apparatus unfavorably influences the combine's ground speed by causing the operator to lower it to prevent overwhelming the threshing and separating apparatus, efficient crop processing, the consumption and degradation of the combine's fuel components, and wear-and-tear on the combine's processor. The clean grain returned to the threshing and separating apparatus can also become pulverized and unrecoverable during its reprocessing, contributing to grain loss.

SUMMARY OF THE INVENTION

According to the invention, a cleaning system for an agricultural combine includes a cleaning shoe including a chaffer having a rear extremity or end and a lower sieve having a rear extremity or end. The chaffer is spaced over the lower sieve. The rear extremity of the chaffer extends rearward beyond the rear extremity of the lower sieve. A fan is configured to blow air rearward and upward through the chaffer and the lower sieve. A clean grain chute has a rear extremity or end. The clean grain chute is under the lower sieve and configured to receive clean grain from the chaffer and the lower sieve. A return chute is under the clean grain chute. A return opening to the return chute is between the return chute and the rear extremity of the clean grain chute. The return chute is configured to receive unclean grain and tailings from the cleaning shoe through the return opening. A sieve chute is mounted proximate to the rear extremity of the lower sieve. The sieve chute is spaced under the rear extremity of the chaffer and extends rearward and angularly upward above the return opening toward the rear extremity of the chaffer from the rear extremity of the lower sieve, allowing the sieve chute to intercept grain from the chaffer and divert it forward to the lower sieve and away from the return opening. The rear extremity of the lower sieve includes a transverse member. The sieve chute includes a front end and a rear end. The sieve chute extends rearward and angularly upward above the return opening to the rear end toward the rear extremity of the chaffer from the front end proximate to the transverse member. The front end includes a front edge. The front edge is in direct contact against the transverse member, defining a closed interface between the front edge and the transverse member. The rear end includes a flange projecting upward toward the rear extremity of the chaffer. The sieve chute is mounted directly to the lower sieve. There is a pathway for air from the fan between the rear extremity of the chaffer and the sieve chute.

According to the invention, a cleaning system for an agricultural combine includes a cleaning shoe including a chaffer and a lower sieve. The chaffer has a rear extremity or end. The lower sieve has a first side and a second side extending between a front extremity or end and a rear extremity or end. The chaffer is spaced over the lower sieve. The rear extremity of the chaffer extends rearward beyond the rear extremity of the lower sieve. A fan is configured to blow air rearward and upward through the chaffer and the lower sieve. A clean grain chute has a rear extremity or end. The clean grain chute is under the lower sieve and configured to receive clean grain from the chaffer and the lower sieve. A return chute is under the clean grain chute. A return opening to the return chute is between the return chute and the rear extremity of the clean grain chute. The return chute is configured to receive unclean grain and tailings from the cleaning shoe through the return opening. A sieve chute is mounted proximate to the rear extremity of the lower sieve. The sieve chute is spaced under the rear extremity of the chaffer and extends between the first side and the second side and rearward and angularly upward above the return opening toward the rear extremity of the chaffer from the rear extremity of the lower sieve, allowing the sieve chute to intercept grain from the chaffer and divert it forward to the lower sieve and away from the return opening. The rear extremity of the lower sieve includes a transverse member. The sieve chute includes a front end and a rear end. The sieve chute extends rearward and angularly upward above the return opening to the rear end toward the rear extremity of the chaffer from the front end proximate to the transverse member. The front end includes a front edge. The front edge is in direct contact against the transverse member, defining a closed interface between the front edge and the transverse member. The rear end includes a flange projecting upward toward the rear extremity of the chaffer. The sieve chute is mounted directly to the lower sieve. There is a pathway for air from the fan between the rear extremity of the chaffer and the sieve chute.

According to the invention, a cleaning system for an agricultural combine includes a cleaning shoe including a chaffer having a rear extremity or end and a lower sieve having a rear extremity or end. The chaffer is spaced over the lower sieve. The rear extremity of the chaffer extends rearward beyond the rear extremity of the lower sieve. A fan is configured to blow air rearward and upward through the chaffer and the lower sieve. A clean grain chute has a rear extremity or end. The clean grain chute is under the lower sieve and configured to receive clean grain from the chaffer and the lower sieve. A return chute is under the clean grain chute. A return opening to the return chute is between the return chute and the rear extremity of the clean grain chute. The return chute is configured to receive unclean grain and tailings from the cleaning shoe through the return opening. A first sieve chute and a second sieve chute are mounted proximate to the rear extremity of the lower sieve. The first sieve chute and the second sieve chute are spaced under the rear extremity of the chaffer in side-by-side fashion and extend rearward and angularly upward above the return opening toward the rear extremity of the chaffer from the rear extremity of the lower sieve, allowing the first sieve chute and the second sieve chute to intercept grain from the chaffer and divert it forward to the lower sieve and away from the return opening. The rear extremity of the lower sieve including a transverse member. The first sieve chute and the second sieve chute each include a front end and a rear end and extend rearward and angularly upward above the return opening to the rear end toward the rear extremity of the chaffer from the front end. Each front end includes a front edge. Each front edge is in direct contact against the transverse member, defining a closed interface between each front edge and the transverse member. Each rear end includes a flange projecting upward toward the rear extremity of the chaffer. The first sieve chute and the second sieve chute are identical. The first sieve chute and the second sieve chute are each mounted directly to the lower sieve. There is a pathway for air from the fan to flow between the rear extremity of the chaffer and the first sieve chute and the second sieve chute.

According to the invention, a cleaning system for an agricultural combine includes a cleaning shoe including a chaffer and a lower sieve. The chaffer has a rear extremity or end. The lower sieve has a first side and a second side extending between a front extremity or end and a rear extremity or end. The chaffer is spaced over the lower sieve. The rear extremity of the chaffer extends rearward beyond the rear extremity of the lower sieve. A fan is configured to blow air rearward and upward through the chaffer and the lower sieve. A clean grain chute has a rear extremity or end. The clean grain chute is under the lower sieve and configured to receive clean grain from the chaffer and the lower sieve. A return chute is under the clean grain chute. A return opening to the return chute is between the return chute and the rear extremity of the clean grain chute. The return chute is configured to receive unclean grain and tailings from the cleaning shoe through the return opening. A first sieve chute and a second sieve chute are mounted proximate to the rear extremity of the lower sieve. The first sieve chute and the second sieve chute are spaced under the rear extremity of the chaffer in side-by-side fashion extending between the first side and the second side and extend rearward and angularly upward above the return opening toward the rear extremity of the chaffer from the rear extremity of the lower sieve, allowing the first sieve chute and the second sieve chute to intercept grain from the chaffer and divert it forward to the lower sieve and away from the return opening. The rear extremity of the lower sieve including a transverse member. The first sieve chute and the second sieve chute each include a front end and a rear end and extend rearward and angularly upward above the return opening to the rear end toward the rear extremity of the chaffer from the front end. Each front end includes a front edge. Each front edge is in direct contact against the transverse member, defining a closed interface between each front edge and the transverse member. Each rear end includes a flange projecting upward toward the rear extremity of the chaffer. The first sieve chute and the second sieve chute are identical. The first sieve chute and the second sieve chute are each mounted directly to the lower sieve. There is a pathway for air from the fan to flow between the rear extremity of the chaffer and the first sieve chute and the second sieve chute.

BRIEF DESCRIPTION OF THE DRAWINGS

Specific objects and advantages of the invention will become apparent to those skilled in the art from the following detailed description of illustrative embodiments thereof, taken in conjunction with the drawings in which:

FIG. 6B is an enlarged right side elevation view showing in more detail a portion of the embodiment of FIG. 5;

FIG. 10 is a lower rear perspective view of the embodiment of FIG. 7;

FIG. 11 is a side elevation view of the embodiment of FIG. 7, the opposite side elevation view being the mirror image thereof;

FIG. 22 is an enlarged fragmentary rear elevation view corresponding to FIG. 21, illustrating a central bolted connection concurrently connecting the sieve chutes to the lower sieve;

FIG. 23 is a vertical section view of the central bolted connection of FIG. 22;

FIGS. 28 and 29 are perspective views of a sieve chute constructed and arranged in accordance with an alternate embodiment of the invention;

FIG. 30 is a side elevation view of the embodiment of FIGS. 28 and 29, the opposite side elevation view being the mirror image thereof;

DETAILED DESCRIPTION

I.

Figure 1:
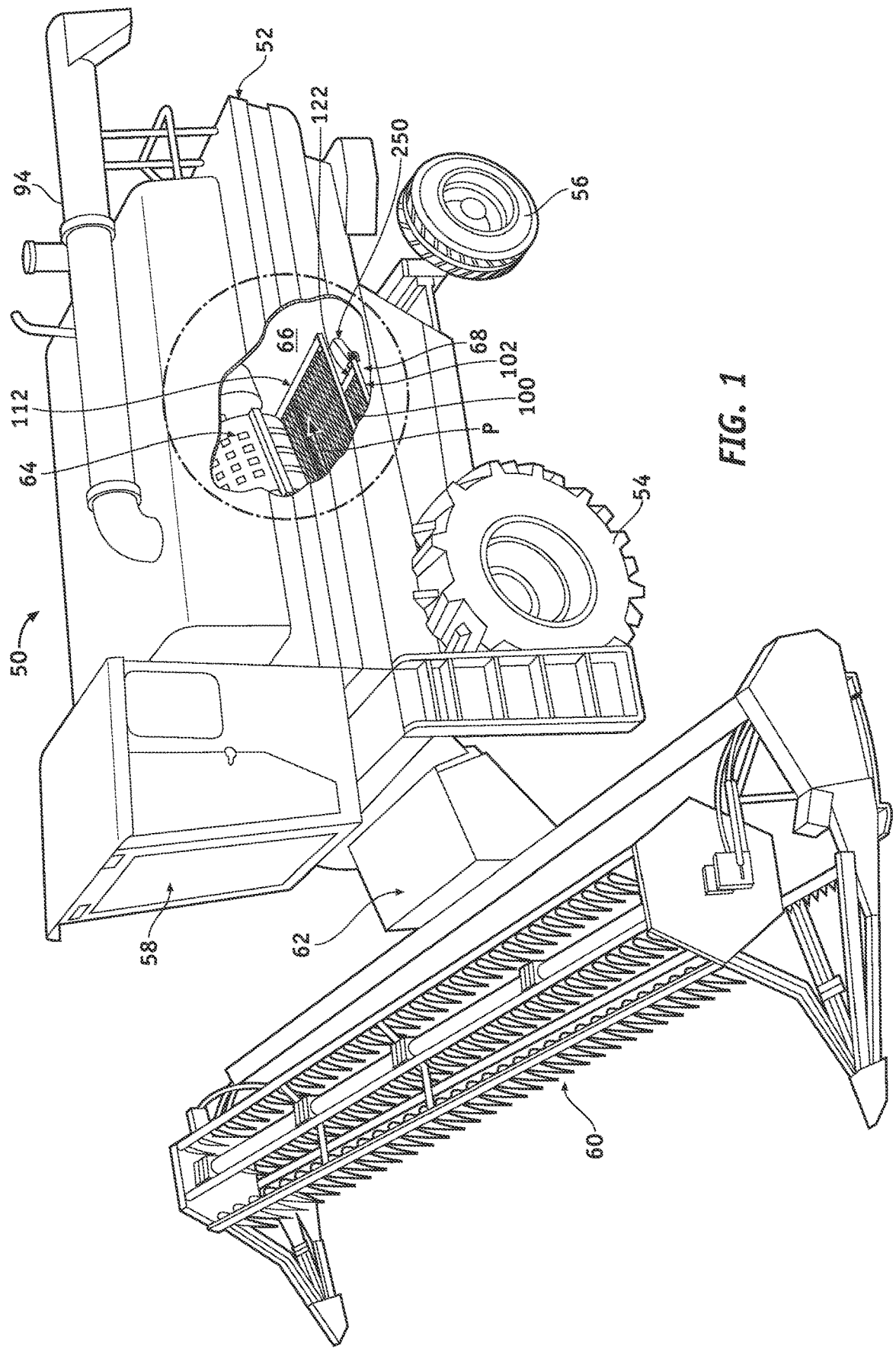
FIG. 1 is a perspective view of a combine, portions thereof broken away illustrating a threshing and separating apparatus and a cleaning shoe including an upper sieve or chaffer over a lower sieve shown configured with a sieve chute according to the invention.
Figure 2:
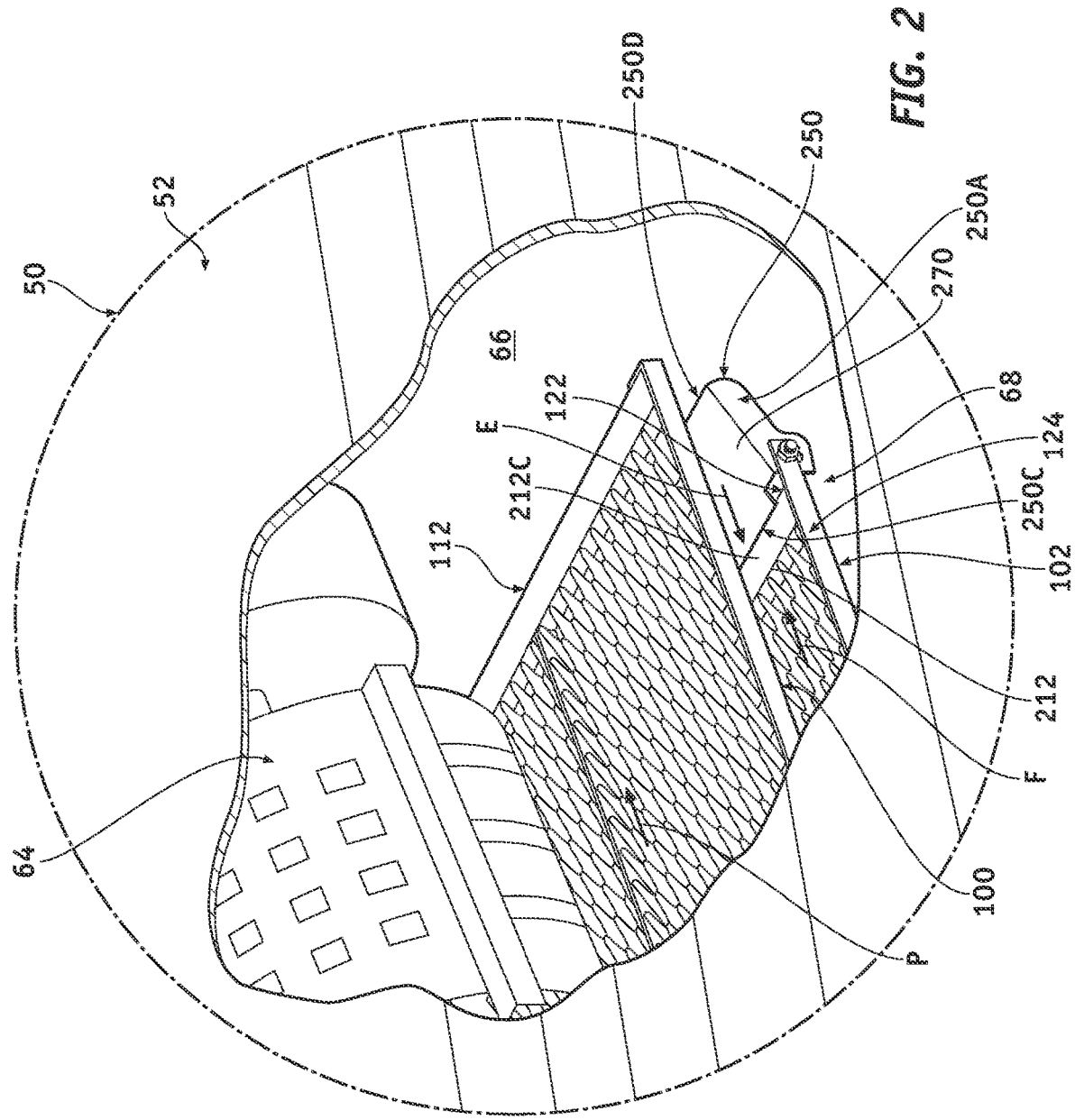
FIG. 2 is an enlarged view of a circled area of FIG. 1.
Figure 3:
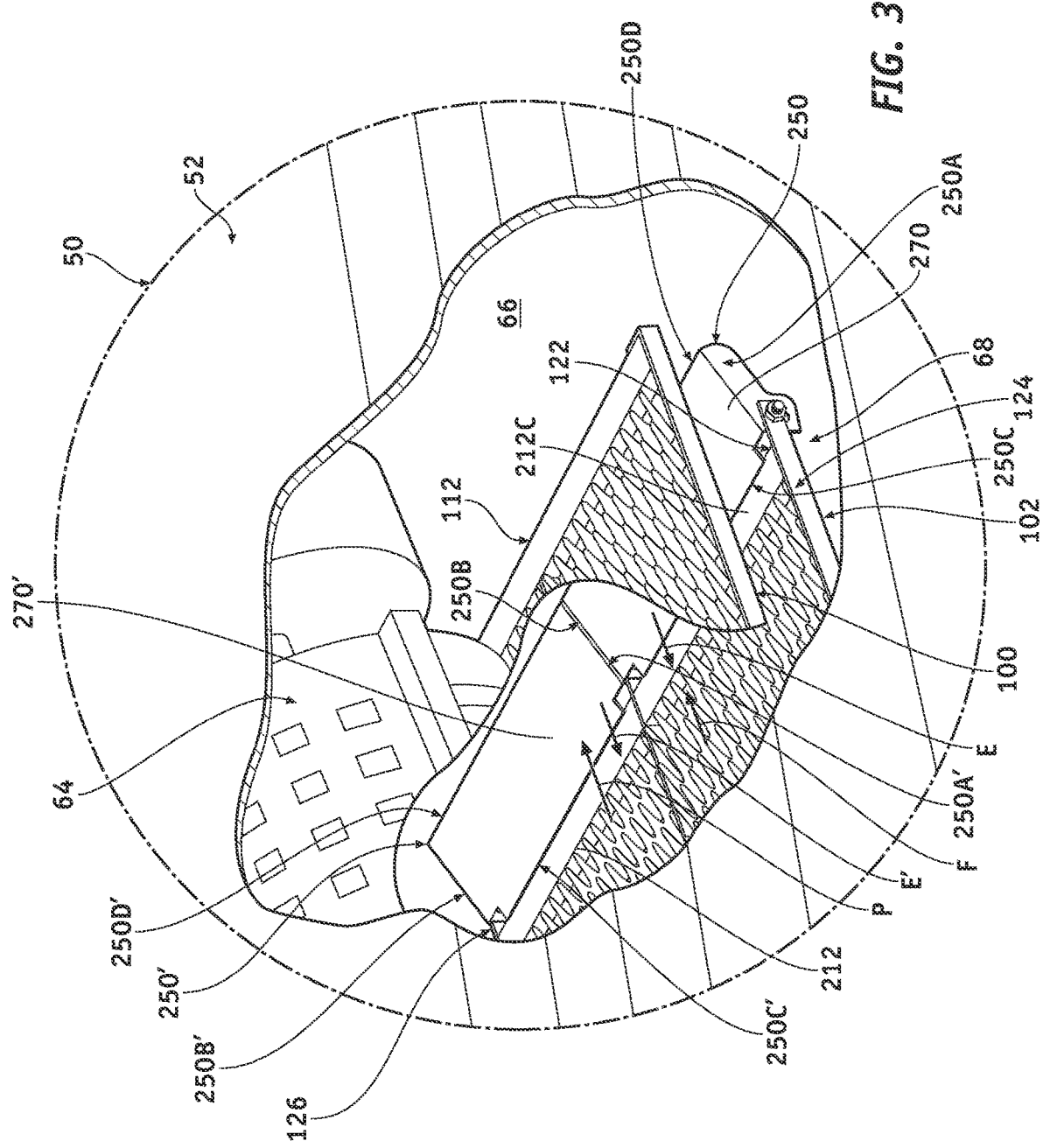
FIG. 3 is a view corresponding to FIG. 2, portions of the chaffer broken away showing the lower sieve configured with two identical sieve chutes, including the sieve chute first illustrated in FIG. 1.

In FIG. 1, a self-propelled combine 50 includes a body or housing 52 supported on a wheeled chassis having front drive wheels 54 and steerable rear wheels 56. An engine powers the combine 50, controlled by an operator from an operator cab 58. At the combine's 50 forward end is a standard crop harvesting apparatus or header 60 and an infeed mechanism or feeder house 62. The header 60 is open to the feeder house 62. The feeder house 62 is open to the combine's 50 processor, the threshing and separating apparatus 64 enclosed in the housing 52 behind the feeder house 62, in FIGS. 1-4. The threshing and separating apparatus 64 is open to the cleaning shoe 66. The cleaning shoe 66 houses the combine's cleaning system 68, in FIG. 4.

The header 60 gathers and cuts the crop and transports it rearward to the feeder house 62 as the combine 50 moves through the field. The feeder house 62 receives the cut crop material from the header 60 and feeds it rearward to the threshing and separating apparatus 64. The threshing and separating apparatus 64 receives the crop from the feeder house 62 and processes it, separating the grain from the chaff, the husks of grains and grasses.

Figure 4:
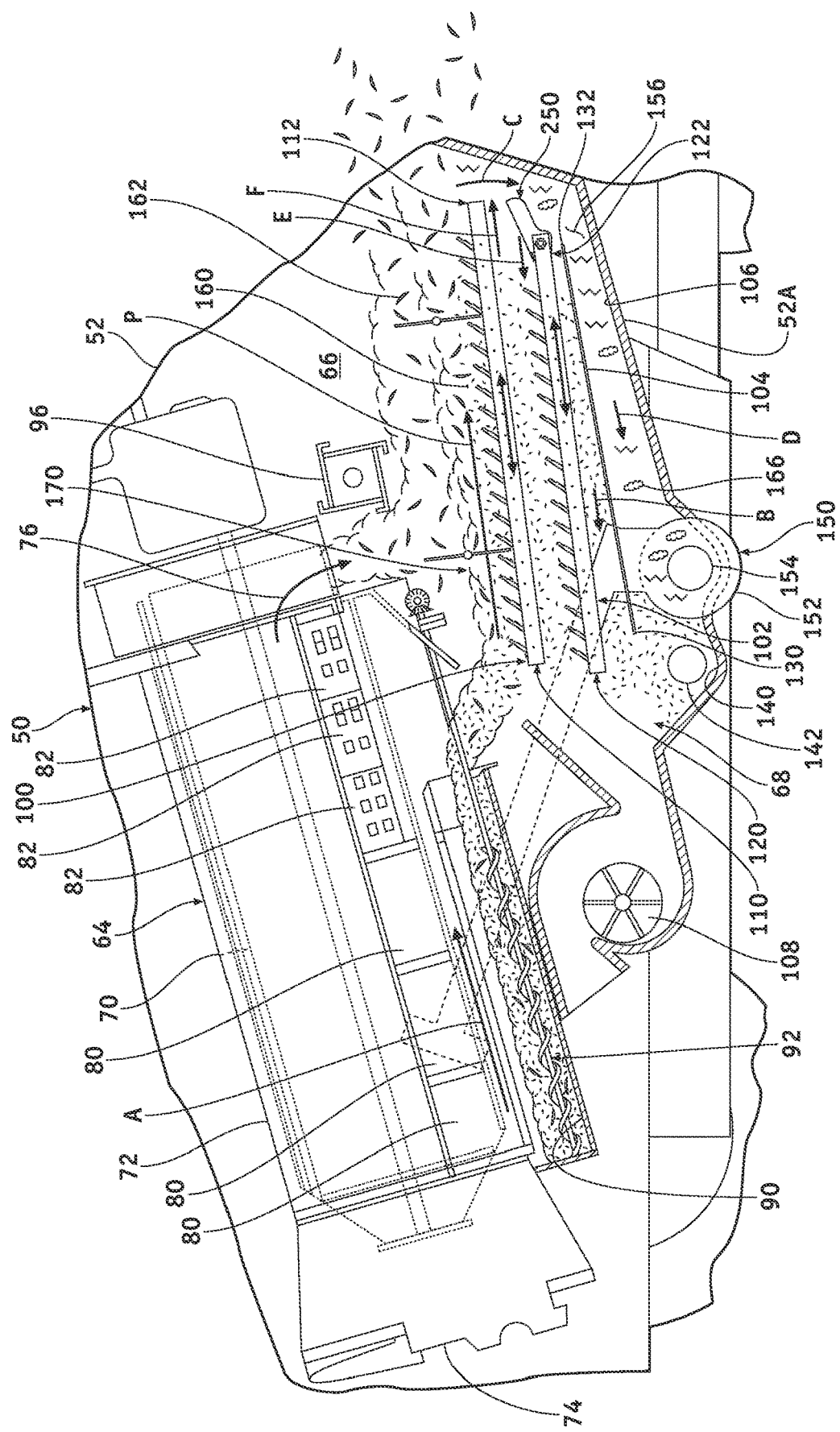
FIG. 4 is an enlarged partial cross-section view, diagrammatically illustrating the threshing and separating apparatus and the cleaning shoe of the embodiment of FIG. 1.

In FIG. 4, the threshing and separating apparatus 64 is a standard axial-flow type, as is known in the art. It includes a rotor 70 mounted rotatably in a threshing cage 72 and has an intake end 74 and a discharge end 76. The combine's 50 motor drives the rotor 70 rotatably. The threshing and separating apparatus receives the cut crop material from the feeder house 62 through the intake end 74. It threshes the crop material as it spirals around the single large diameter rotor 70 rotating through the threshing cage 72. Appropriate threshing implements on the rotor 70 operate with semi-cylindrical concaves 80 and grates 82 on threshing cage 72 to thresh the crop material, separating most of the grain from the chaff and material other than grain. Most of the grain and some material other than grain falls downward through the concaves 80 and the grates 82 to a grain pan 90. An auger mechanism 92 operating in the grain pan 90 conveys its contents in a direction of arrow A from the grain pan 90 to the combine's 50 cleaning system 68.

The cleaning system 68 receives the crop material threshed by the threshing and separating apparatus 64, from the grain pan 90 and the discharge end 76 of the threshing and separating apparatus 64. This material includes clean grain 160 and impurities or material other than clean grain 160, including chaff 162, tailings 164, and any unclean grain 166, grain not wholly separated from chaff 162. The cleaning system 68 separates the clean grain 160 from the material other than grain, discharges most of the impurities through the rear of the combine 50, and directs the clean grain 160 to the combine's 50 grain tank. The combine's 50 operator actuates an unloading auger 94 in FIG. 1 to unload the clean grain from the grain tank periodically. The impurities that discharge through the discharge end 76 encounter a rotary beater 96, which propels this material out the rear of the combine 50.

Figure 5:
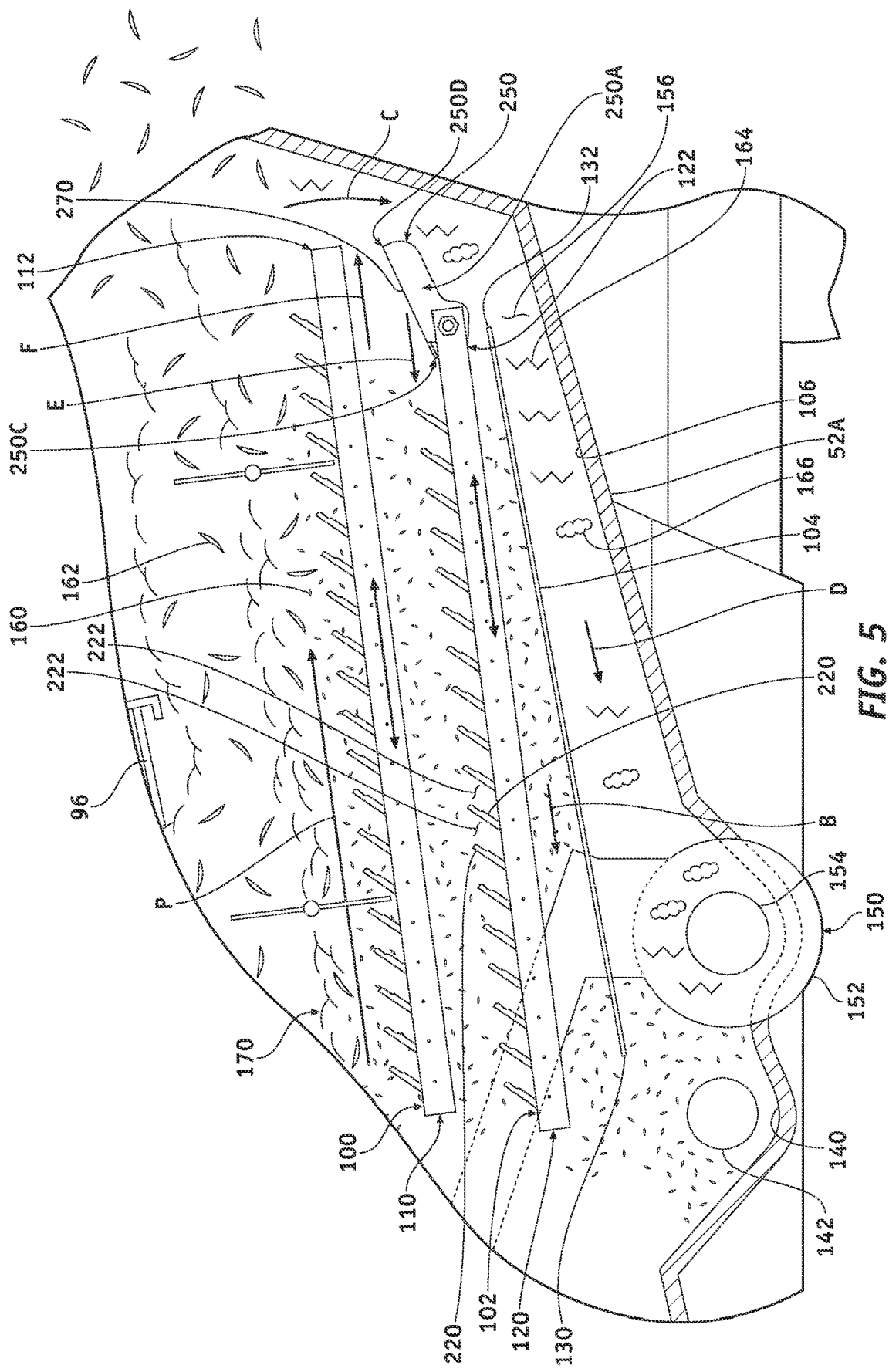
FIG. 5 is an enlarged view corresponding to FIG. 4, diagrammatically illustrating the cleaning shoe in more detail.

In FIGS. 4 and 5, the cleaning system 68 has an upper sieve or chaffer 100, a lower sieve 102, a clean grain chute 104, a return chute 106, and a fan 108. The lower sieve 102 is so named because it is under the chaffer 100, as is known in the art. The chaffer 100 and the lower sieve 102 are each mounted for fore-and-aft reciprocation or oscillation, as is known in the art. The chaffer 100 is spaced above the lower sieve 102, the lower sieve 102 is spaced above the clean grain chute 104, and the clean grain chute 104 is spaced above the return chute 106. This is a standard arrangement. The fan 108 blows air upward and rearward through the cleaning shoe 66, upward and rearward through the lower sieve 102 and the chaffer 100, as is known in the art.

Figure 6A:
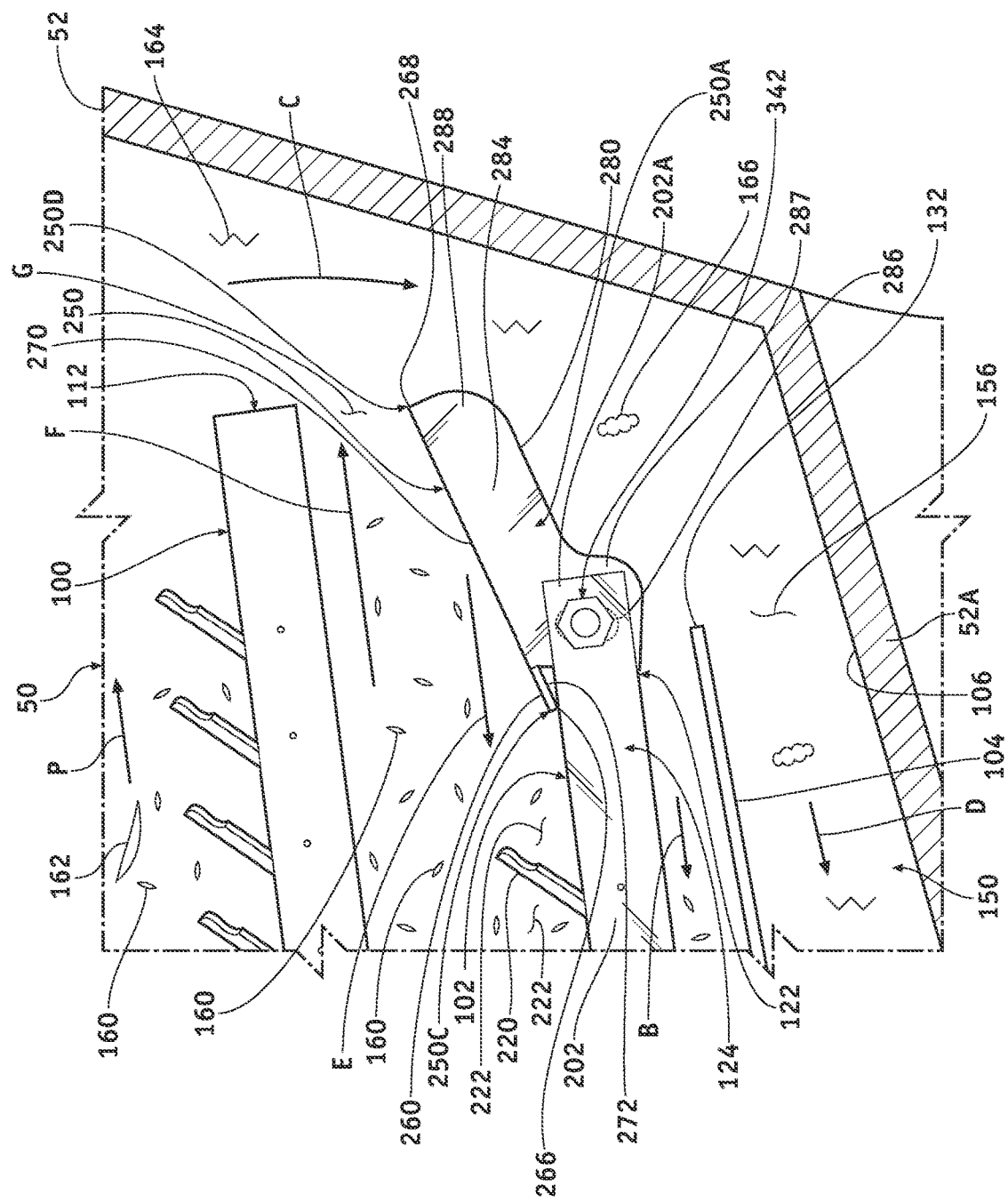
FIG. 6A is an enlarged left side elevation view showing in more detail a portion of the embodiment of FIG. 5.
Figure 7:
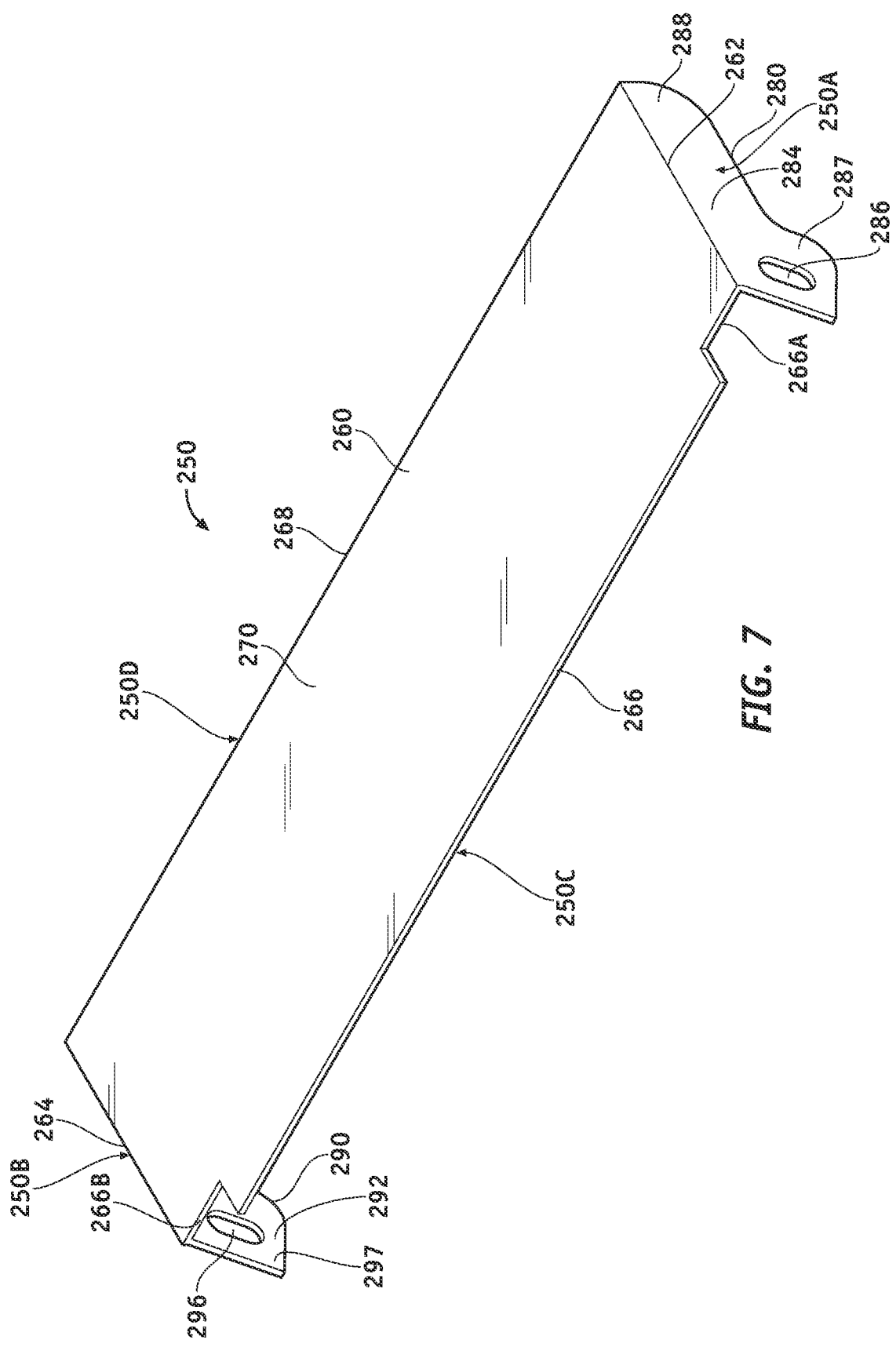
FIG. 7 is an upper front perspective view of the sieve chute first illustrated in FIG. 1.
Figure 8:
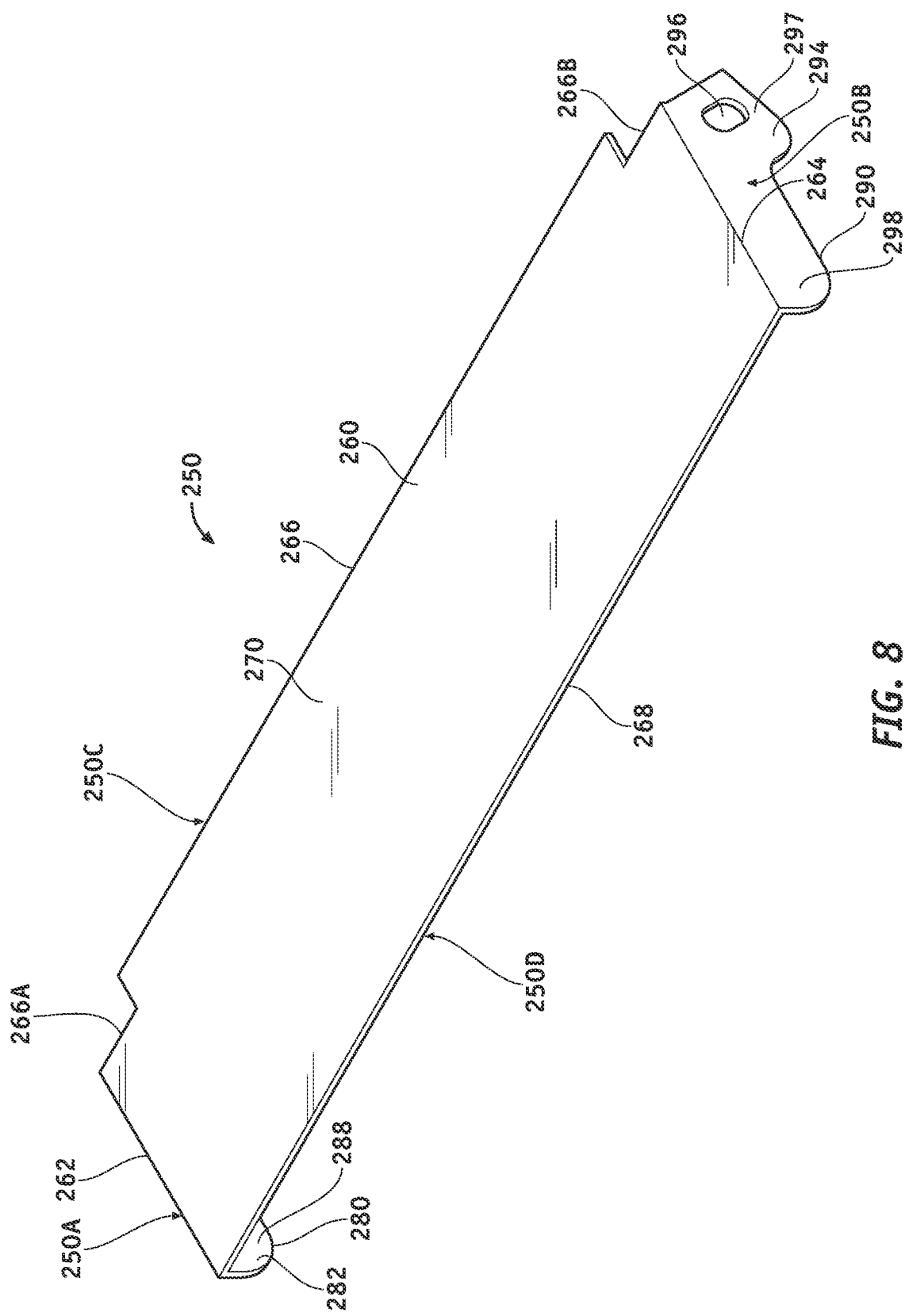
FIG. 8 is an upper rear perspective view of the embodiment of FIG. 7.
Figure 9:
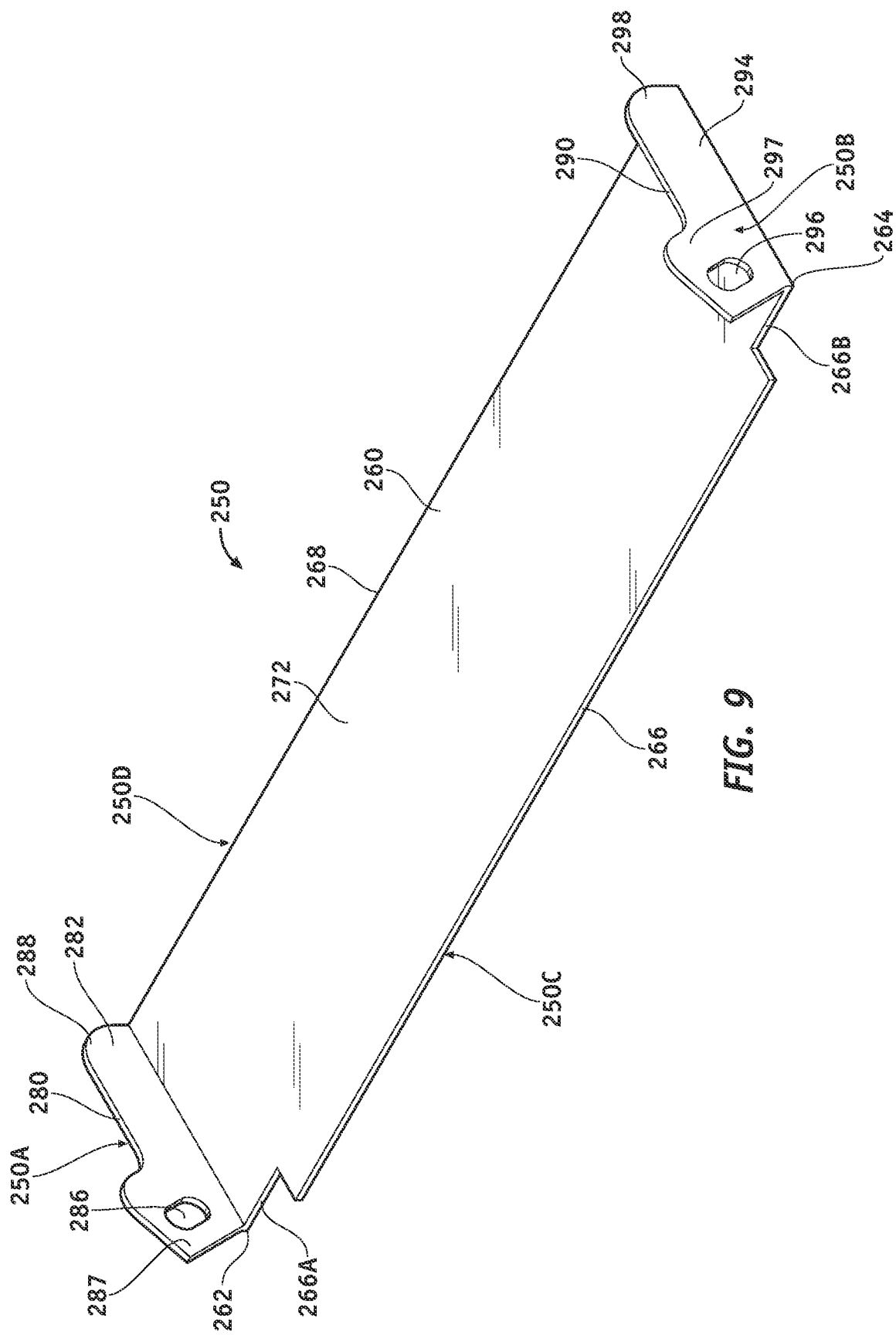
FIG. 9 is a lower front perspective view of the embodiment of FIG. 7.
Figure 12:
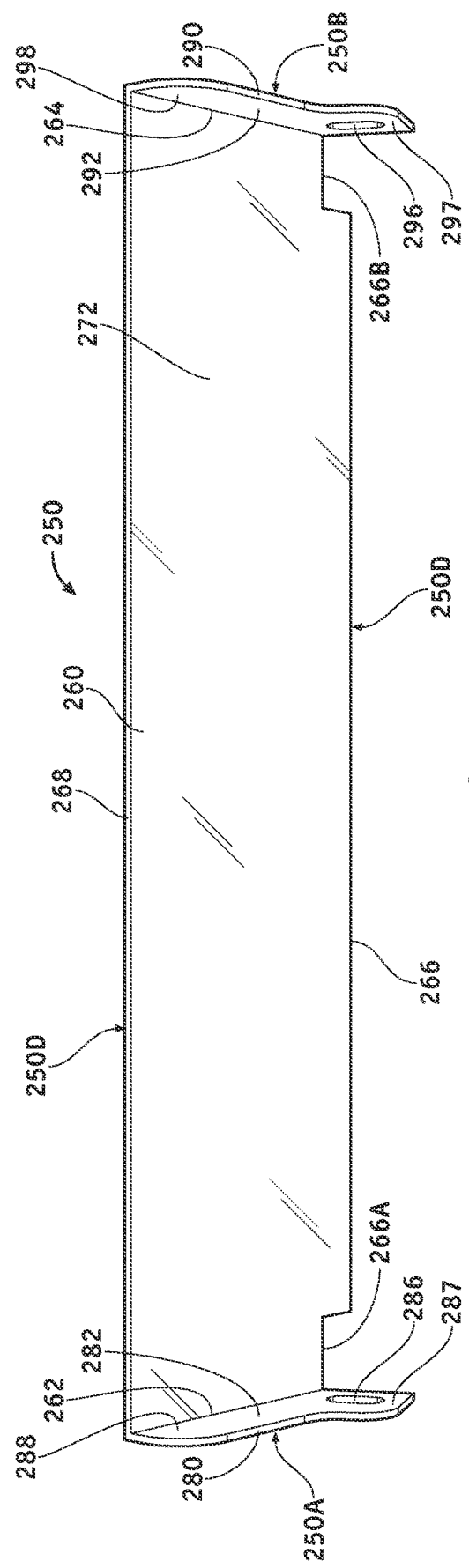
FIG. 12 is a bottom perspective view of the embodiment of FIG. 7.

Referring to FIGS. 5, 6A, and 6B, relevantly, the chaffer 100 has a front end or extremity 110 and a rear end or extremity 112. The front end or extremity 110 is forward of the rear end or extremity 112. The lower sieve 102 has a front end or extremity 120 and a rear end or extremity 122. The front end or extremity 120 is forward of the rear end or extremity 122. The clean grain chute 104 has a front end or extremity 130 and a rear end or extremity 132. The front end or extremity 130 is forward of the rear end or extremity 132. The chaffer 100 extends rearward at an upward incline through the shoe 66 from the front extremity 110 to the rear extremity 112 at the rear of the combine 50. The lower sieve 102 under the chaffer 100 extends rearward at an upward incline through the shoe 66 from the front extremity 120 to the rear extremity 122 at the rear of the combine 50. The rear extremity 112 of the chaffer 100 extends rearward beyond the rear extremity 122 of the lower sieve 102, as is known in the art. The clean grain chute 104 under the lower sieve 102 extends rearward at an upward incline through the shoe 66 from the front extremity 130 to the rear extremity 132 at the rear of the combine 50. The front extremity 130 of the clean grain chute 104 is open to a clean grain trough 140 and a clean grain auger or conveyor 142 operating therein.

The combine 50 has a return 150 configured to receive unclean grain and tailings from the cleaning shoe 66 and return it to the threshing and separating apparatus 64 to reprocess it. The return 150 consists of a return trough 152, a standard return elevator or conveyor 154, usually of the paddle type, operating in the return trough 152 open to the return chute 106, formed by a bottom portion 52A of the combine's 50 body 52, that extends downward and forward from a return opening 156 at the rear of the combine 50 to the return trough 152. The return opening 156 is proximate to and under the lower sieve's 102 rear extremity 122 toward the rear of the combine 50. The rear extremity 112 of the chaffer 100 extends rearward beyond the return opening 156 defined by and between the return chute 106 and the rear extremity 132 of the clean grain chute 104. The return opening 156 is open to the cleaning shoe 66 and the return chute 106, and the return chute 106 is open to the return opening 156 and the return trough 152 and the return auger 154 operating therein. The clean grain trough 140 and its clean grain auger or conveyor 142 are rearward of the fan 108 in FIG. 4 and forward of the return trough 152 and its elevator or conveyor 154 in FIGS. 4 and 5.

The material the cleaning system 68 receives from the threshing and separating apparatus 64 moves over the chaffer 100, sieving out the impurities, the material other than grain, from the clean grain 160. At the same time, the fan 108 and the beater 96 propel the impurities separated from the clean grain 160 through the rear of the combine 50. The clean grain 160 falls through the chaffer 100 and the lower sieve 162 to the clean grain chute 104. The clean grain chute 104 conveys the clean grain 160 forward through a clean grain pathway B under the lower sieve 102 to the clean grain trough 140. The clean grain auger or conveyor 142 operating in the clean grain trough 140 transfers the clean grain 160 from the clean grain trough 140 to the combine's 50 grain tank, as is known in the art.

The chaffer 100 and the lower sieve 102 are frames that support adjacent, transverse louvers defining transverse openings or passages therebetween for grain to pass through, as is known in the art. The openings grade the material by size such that smaller grains 160 fall through the openings, and larger pieces of material move rearward over and off the chaffer 100 and the lower sieve 102 and outwardly through the back of the combine 50. The fan 108 transversely mounted for rotation within the housing 52 beneath the threshing and separating apparatus 64 ahead of the chaffer 100 and the lower sieve 102 establishes a flow of air rearward and upward through the lower sieve 102 and the chaffer 100. The standard reciprocation of the chaffer 100 and the lower sieve 102 consolidates the material from the threshing and separating apparatus 64, the clean grain 160, the chaff 162, the tailings 164, and any unclean grain 166, into a rearward moving crop layer 170 over the chaffer 100. The crop layer 170, a conglomerate mass of the clean grain 160, the chaff 162, the tailings 164, and any unclean grain 166, moves rearward over the chaffer 100 along a crop layer flow path P from the front end 110 of the chaffer 100 adjacent to the grain pan 90 to the rear end 112 of the chaffer 100 toward the rear of combine 50. The air from the fan 108 blowing rearward and upward to and through the crop layer 170 through the passages between the louvers of the lower sieve 102 and the chaffer 100 separates the clean grain 160 from material other than grain. The blowing air creates a force. This force urges the material other than clean grain 160 to float in an airborne state on top of the chaffer 100 in the crop layer flow path P in the path of the air being blown through the lower sieve 102 and the chaffer 100, enabling its expulsion out the back of the combine 50 through its discharge end. At the same time, the comparatively heavier clean grain 160 falls through the chaffer 100 and the lower sieve 102 to the clean grain chute 104. The flow path P extends longitudinally along the combine's 50 longitudinal axis extending from the header 60 to its rear or discharge end.

During this process, some of the tailings 164 and any unclean grain 166 in the cleaning shoe 66 that move over the chaffer 102 beyond its rear extremity 112 pass downward to the rear of the chaffer's 100 rear extremity 112 and the lower sieve's 102 rear extremity 122 in the direction of arrow C in FIGS. 4, 5, 6A, and 6B to the return 150 through the underlying return opening 156 and into to a return pathway D under the clean grain chute 104, as is known in the art. The return chute 106 receives tailings 164 and any unclean grain 166 from the return opening 156 and delivers this material forward through the return pathway D to the return's 150 return trough 152 forward from the return chute's 106 front extremity 130, in FIGS. 4 and 5. The return elevator or conveyor 154 operating in the return trough 152 receives the tailings 164 and the unclean grain 166 and transfers it from the return trough 152 to the combine's 50 threshing and separating apparatus 64 of the combine's 50 processor for reprocessing, as is known in the art.

The chaffer 100 is standard and known in the art, the details of which will readily occur to the person having ordinary skill in the art. Other than how it is modified by sieve chutes according to the invention, the lower sieve 102 is standard and known in the art, the details of which will readily occur to the person having ordinary skill in the art.

Referring to FIGS. 13, 14, 15, and 16, relevantly, the lower sieve 102 includes a generally rectangular frame 200 of metal. The frame 200 has opposite side members or rails 202 and 204 and a central member or rail 206 extending between a front member or rail 210 and an opposite rear member rail 212. The rails 202, 204, and 206 extend longitudinally between the front rail 210 and the rear rail 212 and are spaced apart axially, parallel to one another, and perpendicular relative to the front rail 210 and the rear rail 212 that are transverse relative to the rails 202, 204, and 206. Accordingly, the front rail 210 and the rear rail 212 are transverse members. The front rail 210 and the rear rail 212 extend transversely from the side rail 202 to the center rail 206 and from the center rail 206 to the side rail 204 and are parallel to one another and perpendicular relative to the side rails 202 and 204 and the center rail 206. The side rails 202 and 204 are at opposite sides 124 and 126 of the lower sieve 102. The center rail 206 is equidistant between the side rails 202 and 204. The front rail 210 is at the lower sieve's 102 front extremity 120. The rear rail 212 is at the lower sieve's 102 rear extremity 122. The side rails 202 and 204 and the center rail 206 are equal in length. The front rail 210 and the rear rail 212 are equal in length and shorter than the side rails 202 and 204 and the center rail 206. This characterizes a rectangular configuration of the frame 200 and the lower sieve 102. Accordingly, the lower sieve 102 has a length from front extremity 120 to the opposite rear extremity 122 and a width from side 124 to side 126, in which the width of lower sieve 102 is less than its length.

The side rail 202 has a front end 202A and an opposed rear end 202B. The side rail 204 has a front end 204A and an opposed rear end 204B. The center rail 206 has a front end 206A and an opposed rear end 206B. The front ends 202A, 204A, and 206A are at the front extremity 120. The rear ends 202B, 204B, and 206B are at the rear extremity 122. The front rail 210 at the front extremity 120 has opposed ends 210A and 210B. The rear rail 212 at the rear extremity 122 has opposed ends 212A and 212B and an upper surface 212C extending from end 212A to end 212B. The front ends 202A and 204A of the respective side rails 202 and 204 are rigidly affixed to the respective ends 210A and 210B of the front rail 210 at the front extremity 120 of the lower sieve 102. The side rails 202 and 204 extend rearward along the opposite sides 124 and 126 of the lower sieve 102 from their respective front ends 202A and 204A to their respective rear ends 202B and 204B. According to the invention, the ends 212A and 212B of the rear rail 212 at the rear extremity 122 of the lower sieve 102 are rigidly affixed to the respective side rails 202 and 204 just inboard of the respective rear ends 202B and 204B so the rear ends 202B and 204B extend rearward beyond the respective ends 212A and 212B of the front rail 212. The center rail 206 extends rearward from its front end 206A rigidly affixed to the front rail 210 at an intermediate position between ends 210A and 210B at the front extremity 120 of the lower sieve 102 to its rear end 206B rigidly affixed to the rear rail 212 between ends 212A and 212B at the rear extremity 122 of the lower sieve 102. According to the invention, the front rail 212 has a lug 214. The lug 214 is centered between ends 212A and 212B and projects rearward from the front rail 212. The side rails 202 and 204 and the center rail 2026 extend longitudinally in same direction as the crop layer flow path P in FIGS. 3, 4, and 5 and the combine's 50 longitudinal axis extending from the header 60 to its rear or discharge end. The front and rear rails 210 and 212 extend transversely relative to the crop layer flow path P in FIGS. 3, 4, and 5 and the combine's 50 longitudinal axis extending from the header 60 to its rear or discharge end.

Figure 19:
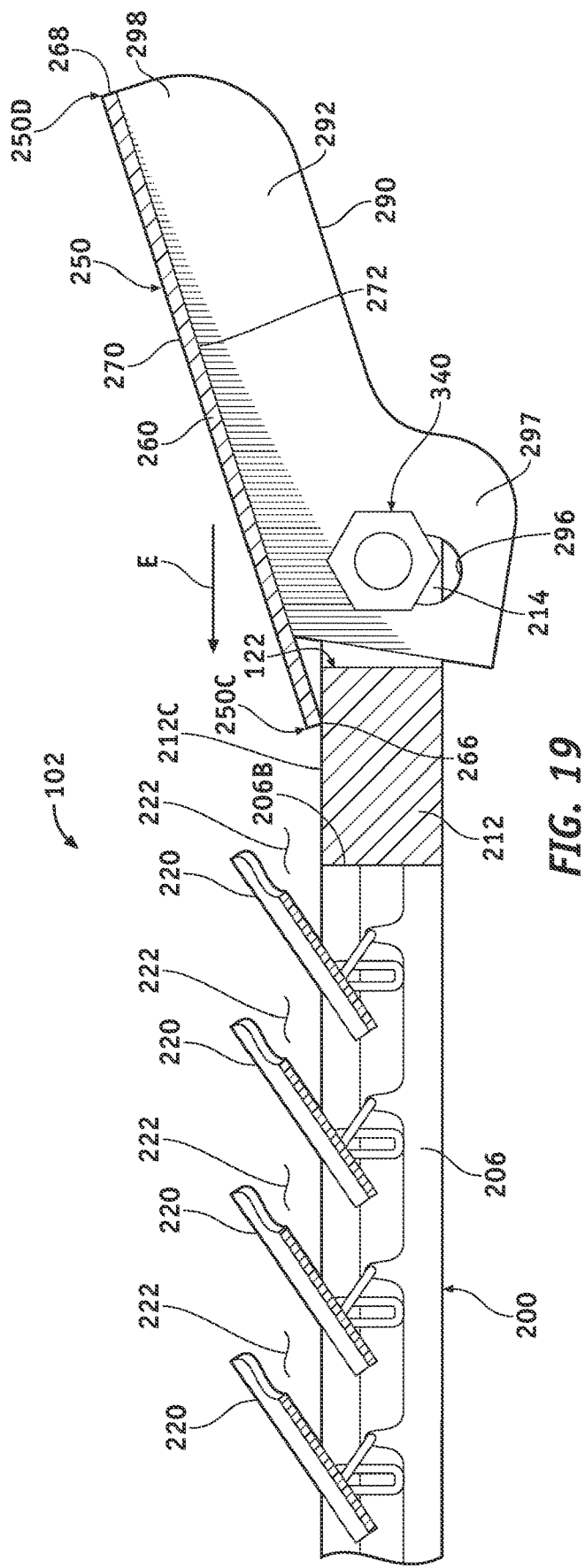
FIG. 19 is a section view taken along line 19-19 of FIG. 18.
Figure 20:
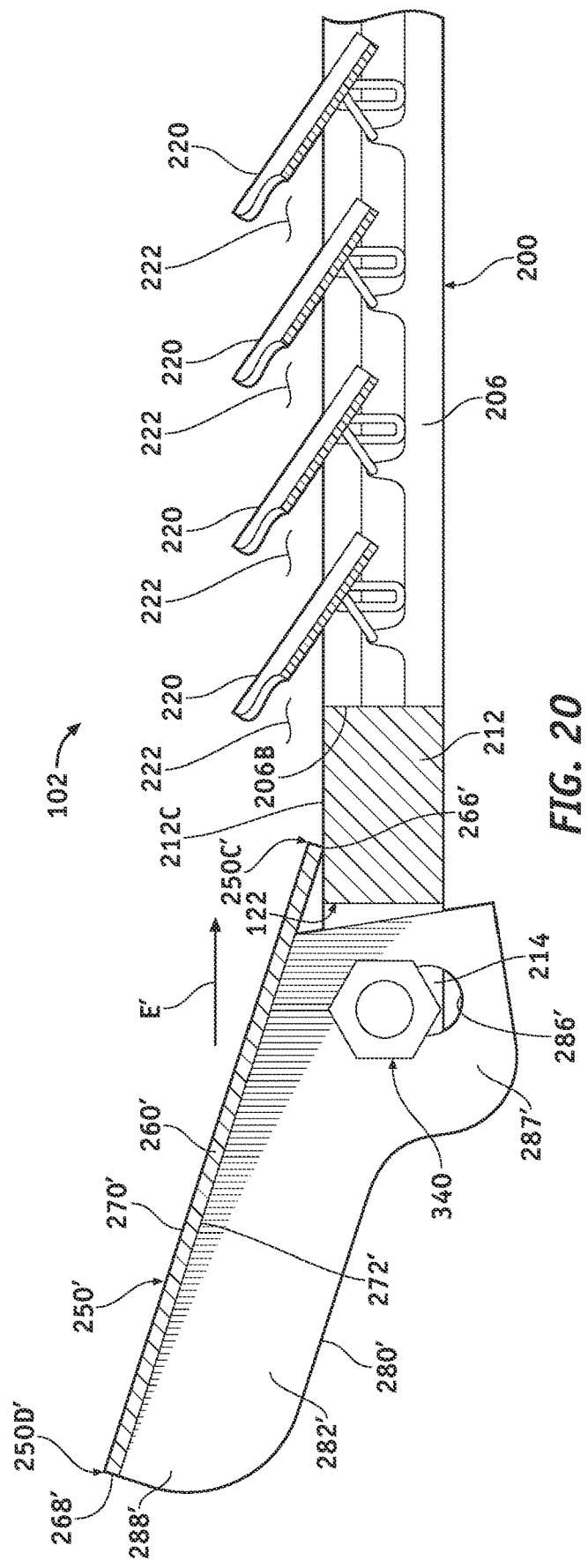
FIG. 20 is a section view taken along line 20-20 of FIG. 18.

The frame 200 supports a series of standard, transversely elongate angular louvers or slats 220 arranged in an adjacent relationship to each other. The louvers 220 are coupled between the center rail 206 and the side rails 202 and 204, respectively. They extend transversely between the center rail 206 and the respective side rails 202 and 204. The adjacent louvers 220 define a series of clean grain passages 222 through which grain falls, shown also in FIGS. 19 and 20. As is known in the art, each grain passage 222 has a relatively narrow width and is elongate transversely. The widthwise dimension of the clean grain passages 222 is adjustable by modulating the angular displacement of the louvers 220 relative to each other. This is a standard configuration known in the art.

Referring to FIGS. 1-5, 6A, 6B, and 15-21, the lower sieve 102 incorporates transversely elongate sieve chutes 250 and 250' according to the invention. The sieve chutes 250 and 250' each favorably influences grain loss and the yield of clean grain to the combine's 50 grain tank. The sieve chutes 250 and 250', inclined or sloped slides over which material may pass, modify the lower sieve 102, improving it by allowing it to receive more clean grain 160 compared to when the lower sieve 102 is without the sieve chutes 250 and 250'. The incorporation of the sieve chutes 250 and 250' with the lower sieve 102 and their usefulness described throughout this specification requires no modifications to the remainder of the combine 50 and its appurtenances. The sieve chutes 250 and 250' are mounted proximate to the rear extremity 122 of the lower sieve 102. They extend transversely along the width of the lower sieve 102 between its sides 124 and 126. They are transverse to the side rails 202 and 204, the crop layer flow path P in FIGS. 3, 4, and 5, the combine's 50 longitudinal axis extending from the header 60 to its rear or discharge end, and airflow pathway F in FIGS. 4, 5, 6A, and 6B, discussed below. The sieve chutes 250 and 250' are spaced vertically under the rear extremity 112 of the chaffer 100 over the return opening 156. They extend rearward and angularly upward in their operative or installed positions toward the chaffer's 100 rear extremity 112 from the lower sieve's 102 rear extremity 122 above the return opening 156. Accordingly, the sieve chutes 250 and 250' tilt forward toward the rear extremity 122 of the lower sieve 102. This allows the sieve chutes 250 and 250' to intercept clean grain 160 falling downward to the rear the lower sieve's 102 rear extremity 122 from the chaffer 100 above and extending rearward beyond the rear extremity 122 of the lower sieve 102 and divert it forward in the directions of arrow E and E', respectively, to the lower sieve 102 away from the return opening 156 while simultaneously allowing air to flow rearward through an airflow pathway F in FIGS. 4, 5, 6A, and 6B between the rear extremity 112 of the chaffer 100 and the sieve chutes 250 and 250'. The expedient of the sieve chutes 250 and 250' sends more clean grain 160 to the lower sieve 102, causing the lower sieve 102 to receive more clean grain 160 and send it downward to the clean grain chute 104 compared to when the lower sieve 102 is without the sieve chutes 250 and 250'.

Arrows E and E' point in the same direction. Arrow E relates to the sieve chute 250. Arrow E' relates to the sieve chute 250'. Air from the fan 108 blows rearward through the airflow pathway F over the lower sieve 102 and the sieve chutes 250 and 250' to facilitate the expulsion of impurities out the back of the combine 50 through its discharge end while allowing the sieve chutes 250 and 250' over the return opening 156 to intercept clean grain 160 falling downward to the rear of the lower sieve's 102 rear extremity 122 from the chaffer 100 above and extending rearward beyond the rear extremity 122 of the lower sieve 102 and divert it forward to the lower sieve 102 and away from the return opening 156. The sieve chutes 250 and 250' each serve to ameliorate or otherwise favorably influence the loss of clean grain 160 to the return 150 and its return to the combine's 50 threshing and separating apparatus 64 by the return elevator or conveyor 154, the yield of clean grain 160 to the combine's 50 a clean grain trough 140 and its grain tank, the burden on the threshing and separating apparatus 64, preventing it from having to reprocess lost clean grain 160 returned to it from the return 150 in addition to the crop material fed to it from the feeder house 62, the combine's 50 ground speed, the rate at which it moves through a field while harvesting a crop, consumption and degradation of the combine's 50 fuel components, and wear-and-tear on the combine's 50 processor.

In the present embodiment, there are two sieve chutes 250 and 250'. They are identical in every respect and share the same reference characters. Each reference character used with the sieve chute 250' has a prime ("'") symbol for clarity. Since they are identical, the details of the sieve chute 250 discussed below apply in every respect to the sieve chute 250'.

Referring to FIGS. 7-12 relevantly, the sieve chute 250 is a rigid, jointless, elongate structural member of metal, preferably steel. The sieve chute 250 has opposed ends 250A and 250B and opposed front and rear ends 250C and 250D. The end 250A is the sieve chute's 250 left end. The end 250B is the sieve chute's 250 right end.

The sieve chute 250 includes a sheet or plate 260 configured with ears or webs 280 and 290 at the respective left and right ends 250A and 250B. The plate 260 has an end edge 262 at the left end 250A and an opposing end edge 264 at the right end 250B. The front end 250C includes a front edge 266. The rear end 250D includes a rear edge 268. The rear edge 268 opposes the front edge 266. The plate 260 has an upper surface 270 and an opposing lower surface 272. The plate 260 is flat, solid, impervious, and without holes or openings, from end edge 262 to end edge 264 and from front edge 266 to rear edge 268. The end edges 262 and 264 are parallel relative to one another. The front edge 266 is notched by a notch 266A proximate to the end edge 260 and an opposed notch 266B proximate to end edge 264. The rear edge 268 is parallel to the front edge 266 that extends between the notches 266A and 266B. The end edges 262 and 264 extend from the rear edge 268 to the respective notches 266A and are perpendicular relative to the rear edge 268 and the front edge 266 extending between the notches 266A and 266B. The upper surface 270 is parallel to the lower surface 272 and the plate 260 has a uniform thickness from the upper surface 270 to the lower surface 272.

The web 280 extends from the end edge 262 outwardly from the plate's 260 lower surface 272 in opposition to the plate's 260 upper surface 270. Web 280, a flat plate, has opposed inner and outer surfaces 282 and 284, an opening 286, a front extremity 287, and a rear extremity 288. It extends along the length of the end edge 262 from the front extremity 287 proximate to the notch 266A proximate to the sieve chute's 250 front end 250C to the rear extremity 288 proximate to the rear edge 268 proximate to the sieve chute's rear end 250D. The opening 286 is elongate and extends through the web's 280 front extremity 287 from the inner surface 282 to the outer surface 284.

The web 290 extends from the end edge 262 outwardly from the plate's 260 lower surface 272 in opposition to the plate's 260 upper surface 270. Web 290, a flat plate, has opposed inner and outer surfaces 292 and 294, an opening 296, a front extremity 297, and a rear extremity 298. It extends along the length of the end edge 262 from the front extremity 297 proximate to the notch 266B proximate to the sieve chute's 250 front end 250C to the rear extremity 298 proximate to the rear edge 268 proximate to the sieve chute's rear end 250D. The opening 296 is elongate and extends through the web's 290 front extremity 297 from the inner surface 292 to the outer surface 294.

The webs 280 and 290 are identical, parallel to one another, and aligned axially. The inner surfaces 282 and 292 face one another and the openings 286 and 296 are aligned axially.

The end edge 262 and the web 280 extending therefrom define the sieve chute's 250 end 250A. The end edge 264 and the web 290 extending therefrom define the sieve chute's 250 end 250B. The front edge 266 that extends between the notches 266A and 266B defines the sieve chute's 250 front end 250C. The rear edge 268 defines the sieve chute's 250 rear end 250D. The ends 250A and 250B are equal in length and shorter than the overall transverse length of the sieve chute 250 extending from the end 250A to the end 250B. The web's 280 front extremity 287 and its opening 286 are proximate to the sieve chute's 250 front end 250C. The web's 280 rear extremity 288 is proximate to the sieve chute's 250 rear end 250D. The web's 290 front extremity 297 and its opening 296 are proximate to the sieve chute's 250 front end 250C. The web's 290 rear extremity 298 is proximate to the sieve chute's 250 rear end 250D.

Figure 13:
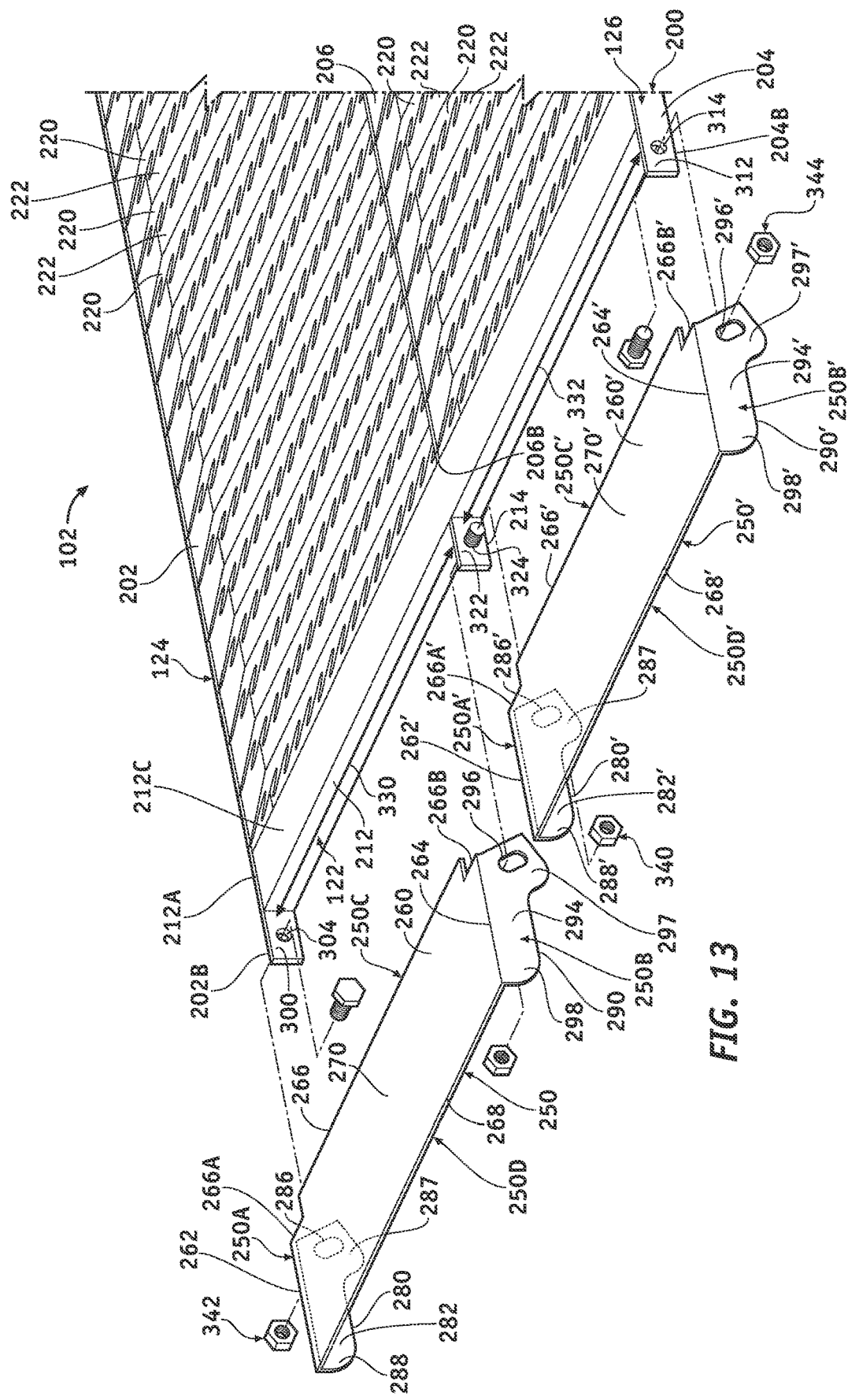
FIGS. 13 and 14 are fragmentary right and left side perspective views, respectively, of the lower sieve corresponding to FIG. 3, the sieve chutes detached from the lower sieve.
Figure 14:
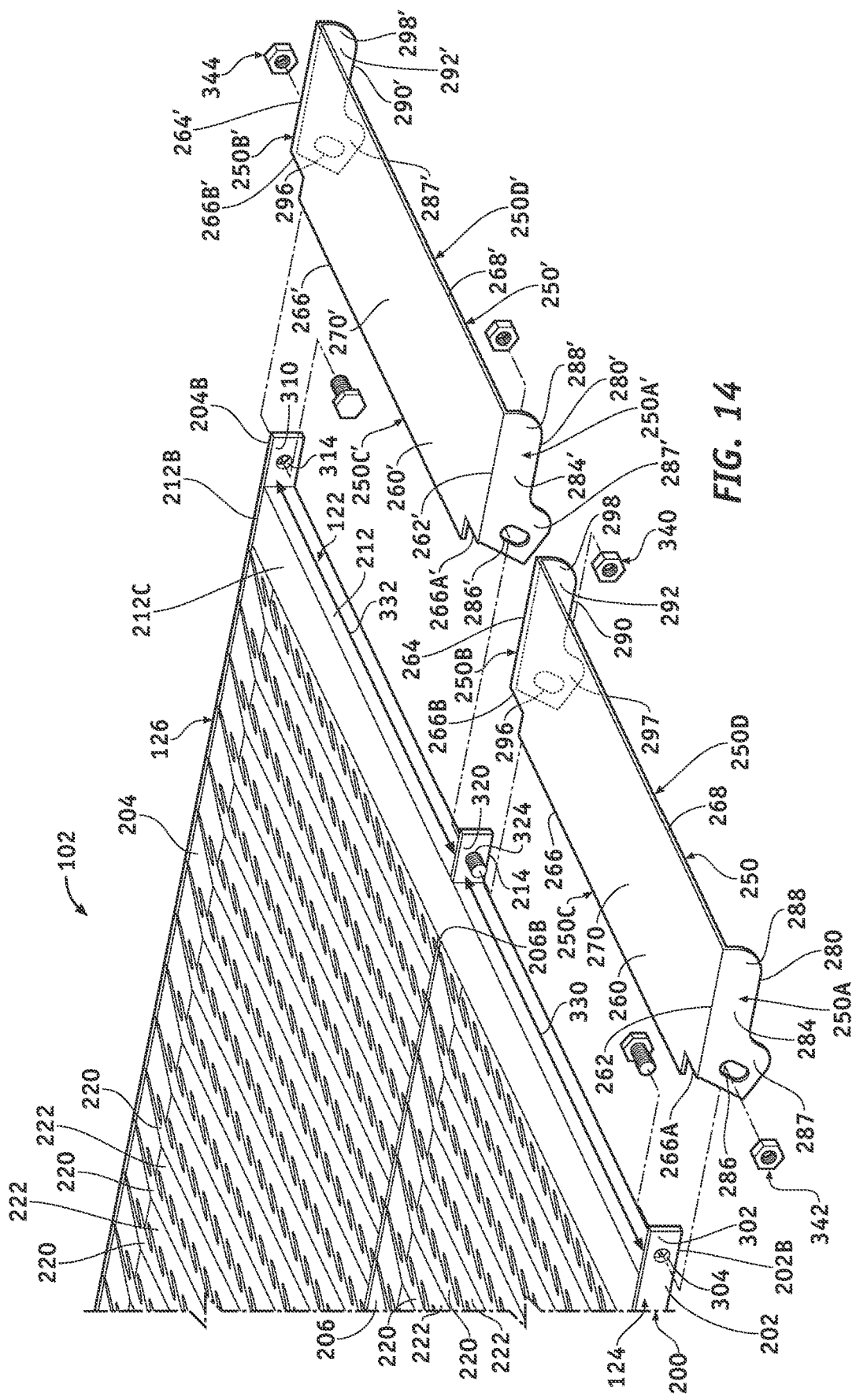
Figure 15:
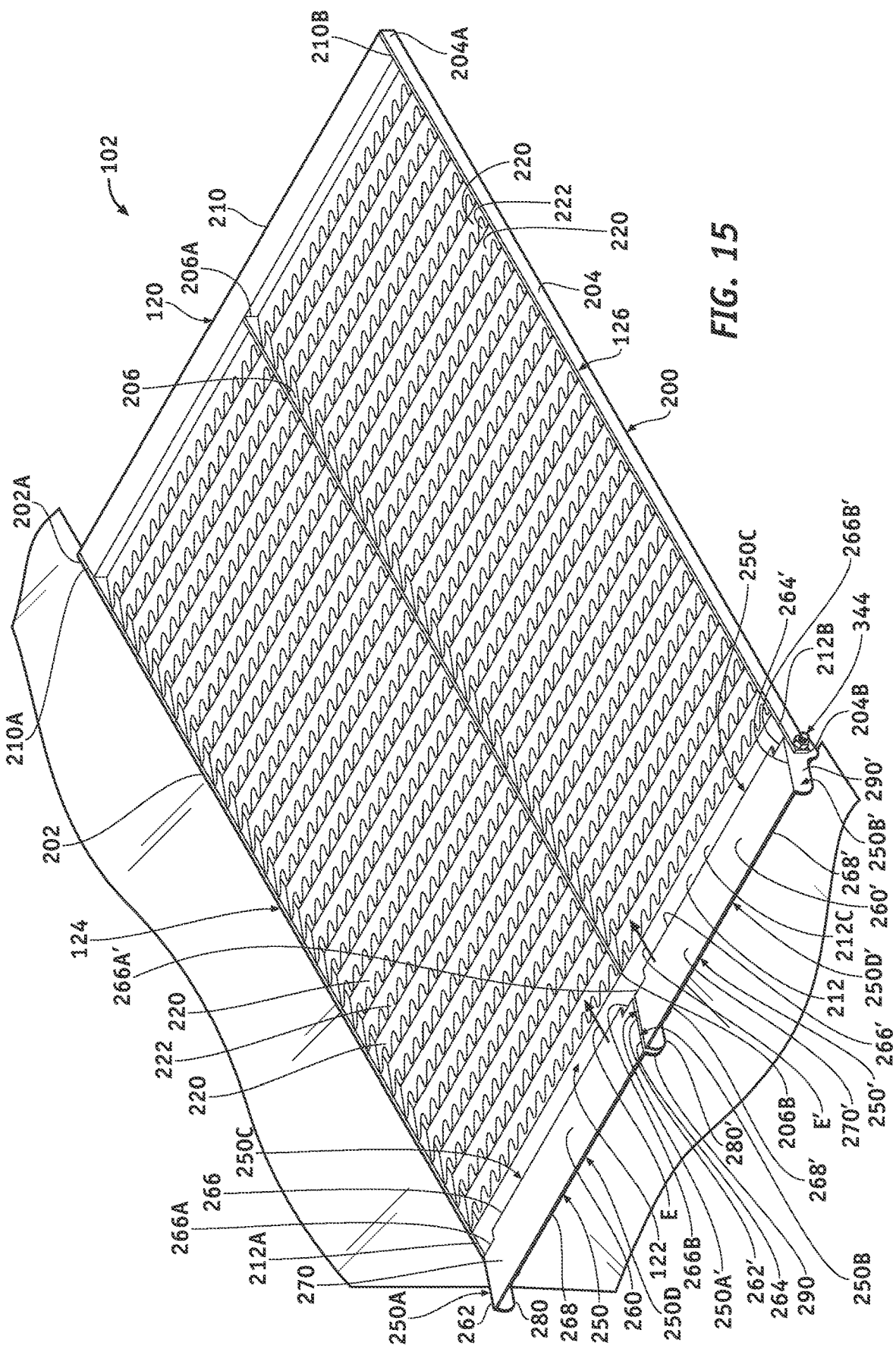
FIGS. 15 and 16 are right and left side perspective views corresponding to FIGS. 13 and 14, respectively, illustrating the sieve chutes attached to the lower sieve.
Figure 16:
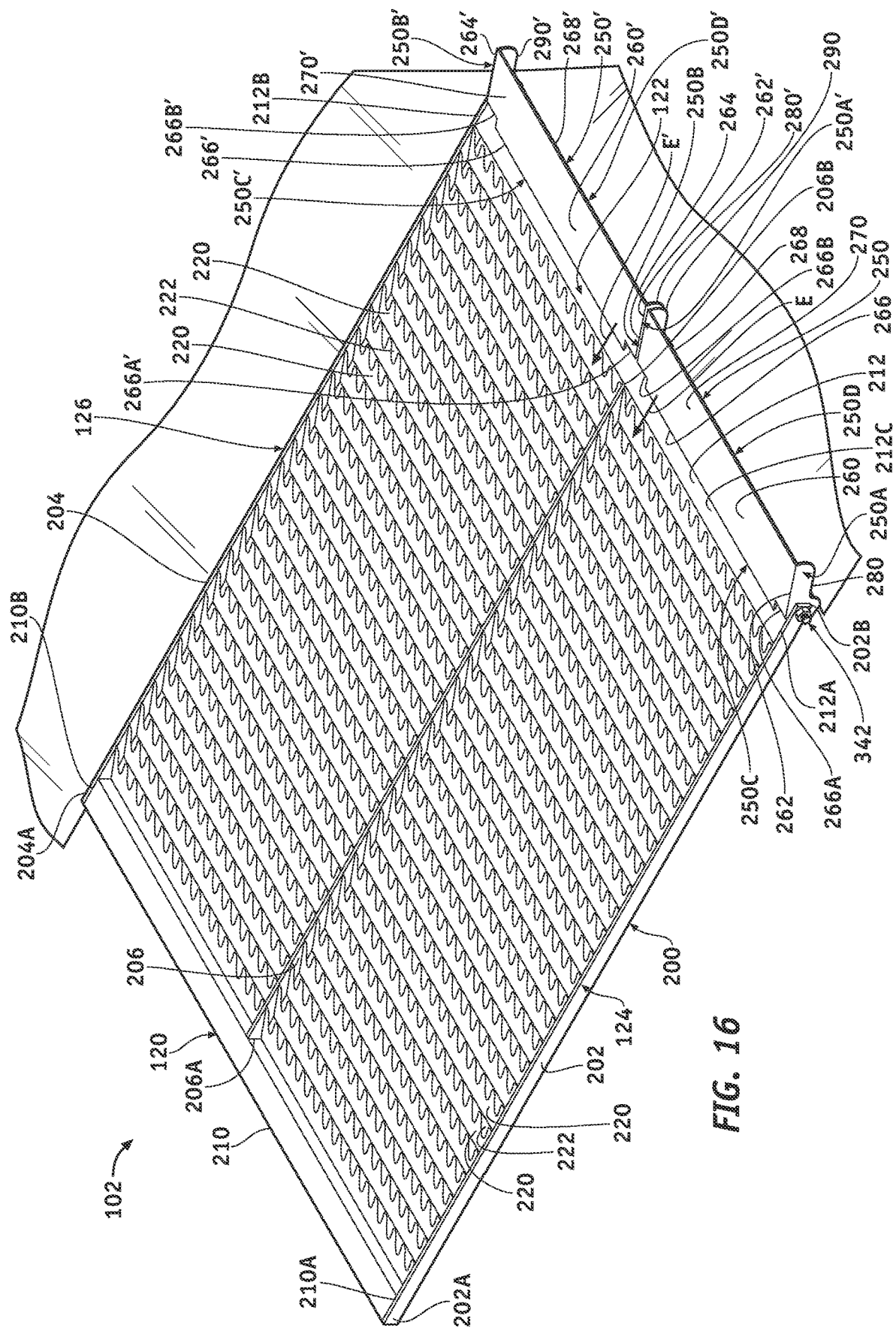
Figure 17:
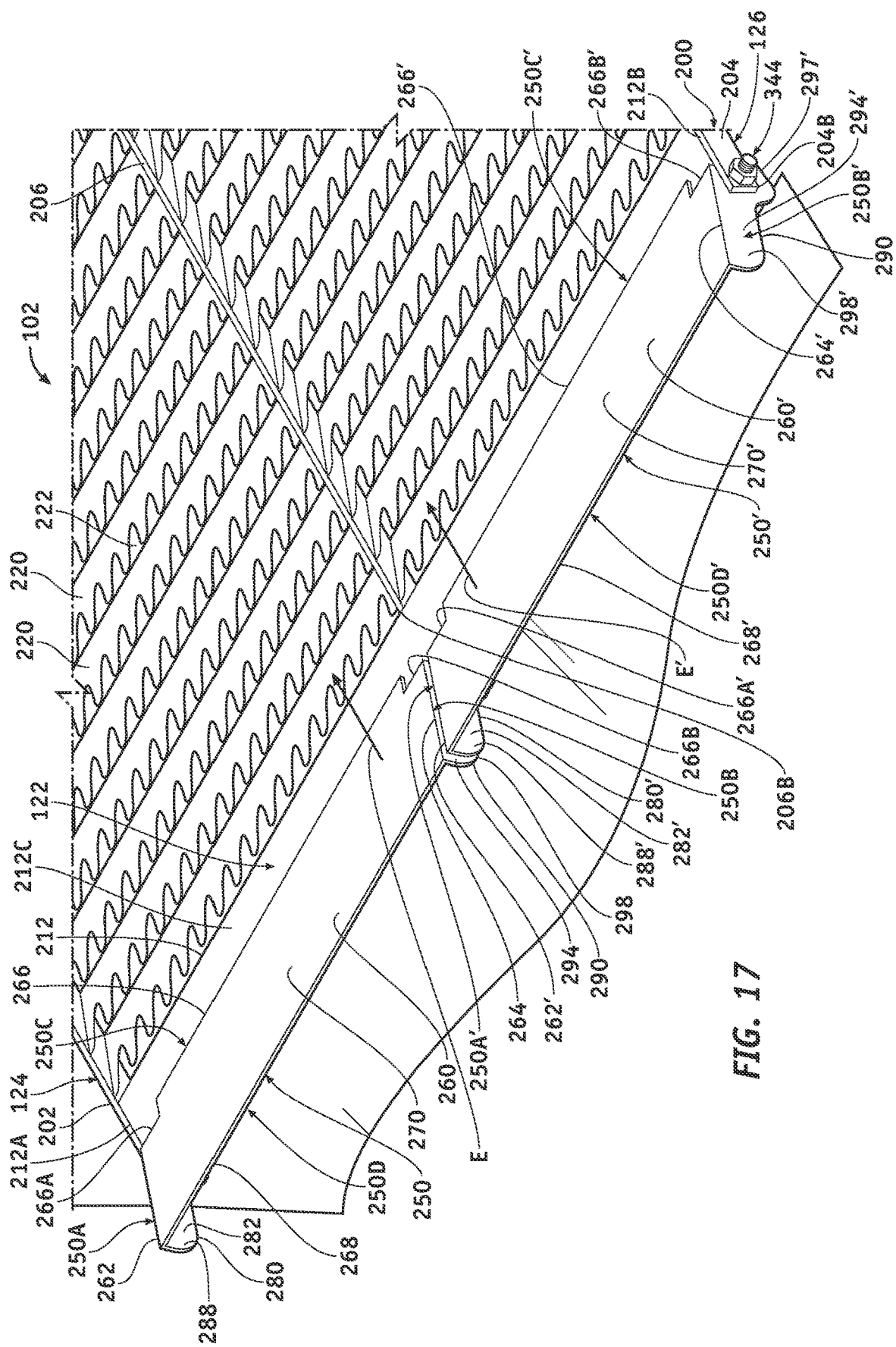
FIGS. 17 and 18 are fragmentary right and left side perspective views corresponding to FIGS. 15 and 16, respectively, illustrating the sieve chutes attached to the lower sieve.
Figure 18:
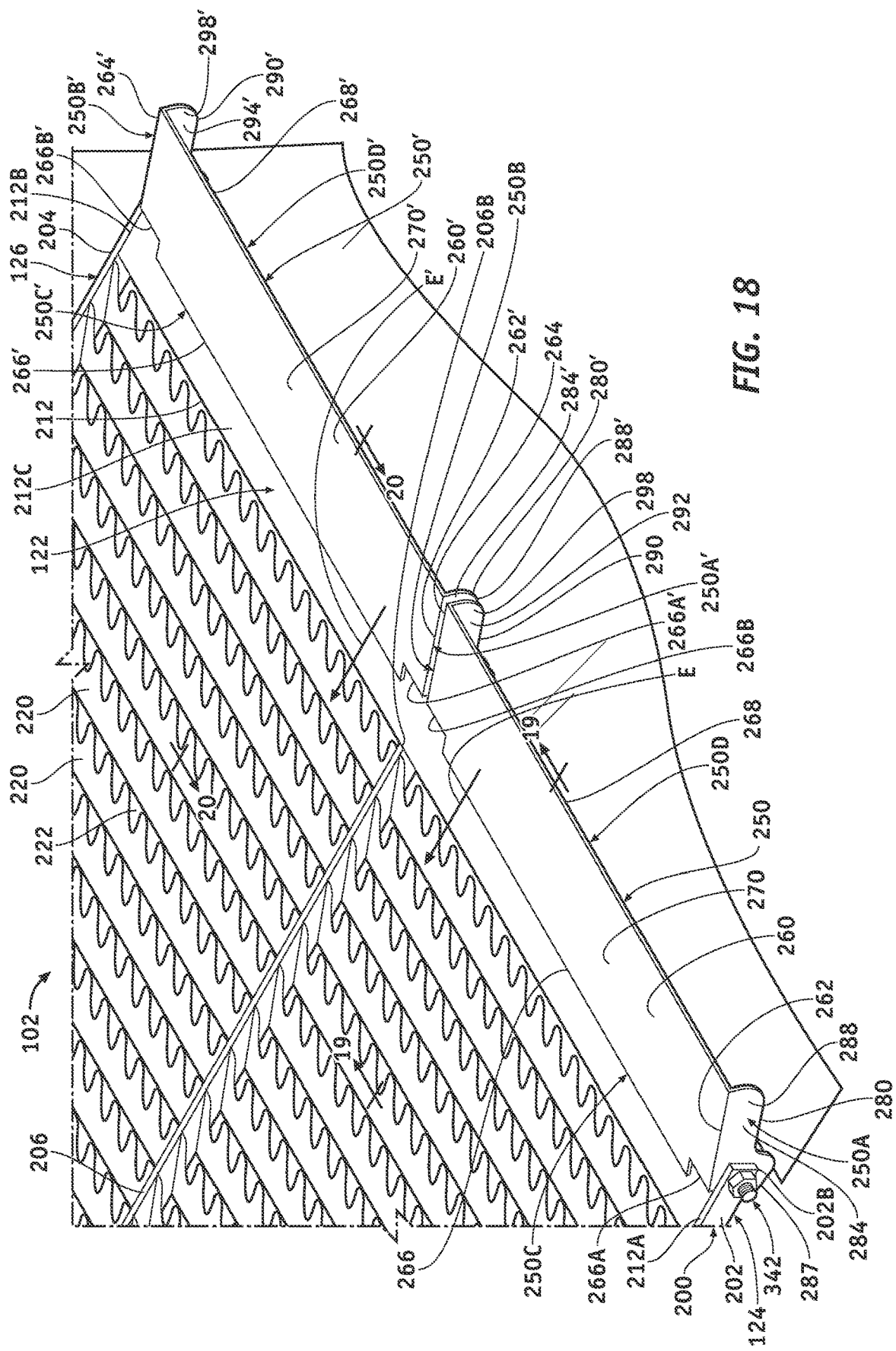

The sieve chutes 250 and 250' are mounted directly to the lower sieve's 102 frame 200, forming an integrated lower sieve unit. FIGS. 13 and 14 show the sieve chutes 250 and 250' detached from the rear extremity 122 of the frame 200 for illustrative purposes. The rear end 202B of the side rail 202, the rear end 204B of the side rail 204, and the lug 214 are attachment points for the sieve chutes 250 and 250'. The rear ends 202B and 204B and the lug 214 are aligned axially in a transverse direction from the side 124 of the lower sieve 102 to the opposing side 126 of the lower sieve 102. The rear end 202B of the side rail 202 has opposed inner and outer lateral surfaces 300 and 302 and an opening 304. The opening 304 extends through the rear end 202B from the inner lateral surface 300 to the outer lateral surface 302. The rear end 204B of the side rail 204 has opposed inner and outer lateral surfaces 310 and 312 and an opening 314. The opening 314 extends through the rear end 204B from the inner lateral surface 310 to the outer lateral surface 312. The lug 214 has opposed lateral surfaces 320 and 322 and an opening 324. The opening 324 extends through the lug 214 from lateral surface 320 to lateral surface 322. The rear ends 202B and 204B and the lug 214 and the respective openings 304, 314, and 324 are spaced apart and aligned axially in a transverse direction from the side 124 of the lower sieve 102 to the opposing side 126 of the lower sieve 102. The rear end's 202B inner lateral surface 300 faces the lug's 214 lateral surface 320. The rear end's 204B inner lateral surface 310 faces the lug's 214 lateral surface 322. There is a distance 330 between the rear end's 202B inner lateral surface 300 and the lug's 214 lateral surface 320 and a distance 332 between the rear end's 204B inner lateral surface 310 and the lug's 214 lateral surface 322. The distances 330 and 332 are identical.

A worker installs the sieve chute 250 between the rear end 202B and the lug 214 and the sieve chute 250' between the rear end 204B and the lug 214 as follows. He situates the sieve chute 250 upright so its webs 280 and 290 extend upright to the plate 260 and the plate's 260 upper surface 270 faces upward, allowing it to intercept clean grain 160 falling downward from the chaffer 100 as described above and in more detail below. He locates the front end 250C of the sieve chute 250 between the inner lateral surface 300 of the rear end 202B and the lateral surface 320 of the lug 214, directing the length of the sieve chute 250 from end 250A to end 250B transversely relative to the sides 124 and 126 of the lower sieve's 102 frame 200 from the outer surface 284 of the web's 280 front extremity 287 in direct contact against the rear end's 202B inner lateral surface 300 to the outer surface 294 of the web's 290 front extremity 297 in direct contact against the lug's 214 lateral surface 320, aligning the front extremity's 287 opening 286 with the rear end's 202B opening 304 and the front extremity's 297 opening 296 with the lug's 214 opening 324, and locating the front edge 266 of the front end 250C between the notches 266A and 266B proximate to and longitudinally over the upper surface 212C of the rear rail 212 of the lower sieve's 102 rear extremity 122 between the rear rail's 212 end 212A and the lug 214. The length of the sieve chute 250 from end 250A to end 250B relates to the distance 330. This allows the outer surface 284 of the web's 280 front extremity 287 to contact the rear end's 202B inner lateral surface 300 directly and the outer surface 294 of the web's 290 front extremity 297 to contact the lug's 214 lateral surface 320 directly, the plate 260 to extend longitudinally between the rear end 202B and the lug 214, and the front edge 266 between the notches 266A and 266B to extend longitudinally over the upper surface 212C of the rear rail 212 between the rear end 202B and the lug 214.

He situates the sieve chute 250' upright so its webs 280' and 290' extend upright to the plate 260' and the plate's 260' upper surface 270' faces upward, allowing it to intercept clean grain 160 falling downward from the chaffer 100 as described above and in more detail below. He locates the front end 250C' of the sieve chute 250' between the lateral surface 322 of the lug 214 and the inner lateral surface 310 of the rear end 204B, directing the length of the sieve chute 250' from end 250A' to end 250B' transversely relative to the sides 124 and 126 of the lower sieve's 102 frame 200 from the outer surface 284' of the web's 280' front extremity 287' in direct contact against the lug's 214 lateral surface 322 to the outer surface 294' of the web's 290' front extremity 297' in direct contact against the rear end's 204B inner lateral surface 310, aligning the front extremity's 287' opening 286' with lug's 214 opening 324 and the front extremity's 297' opening 296' with the rear end's 204B opening 314, and locating the front edge 266' of the front end 250C' between the notches 266A' and 266B' proximate to and longitudinally over the upper surface 212C of the rear rail 212 of the lower sieve's 102 rear extremity 122 between the rear rail's 212 end 212B and the lug 214. The length of the sieve chute 250' from end 250A' to end 250B' relates to the distance 332. This allows the outer surface 284' of the web's 280' front extremity 287 to contact the lug's 214 lateral surface 322 directly and the outer surface 294' of the web's 290' front extremity 297' to contact the rear end's 204B inner lateral surface 310 directly, the plate 260' to extend longitudinally between the lug 214 and the rear end 204B, and the front edge 266' between the notches 266A' and 266B' to extend longitudinally over the upper surface 212C of the rear rail 212 between the lug 214 and the rear end 204B.

The worker completes installing the sieve chutes 250 and 250' as follows. He sets them to their installed positions in FIGS. 6A, 6B, and 15-21 extending rearward and angularly upward from their front ends 250C and 250C' at the rear extremity 122 of the lower sieve 102 to their rear ends 250D and 250D' and secures them in their installed positions by securing the webs 290 and 280' to the lug 214, securing web 280 to rear end 202B, and securing web 290 to rear end 204B. The worker uses a central bolted connection using a fastener 340 to secure the webs 290 and 280' to the lug 214 sandwiched therebetween, an outer bolted connection using a fastener 342 to secure the web 280 to the rear end 202B, and an outer bolted connection using a fastener 344 to secure the web 290' to the rear end 204B.

Referring in relevant part to FIGS. 6A, 15-19, and 21, in the sieve chute's 250 installed position the webs 280 and 290 extend rearward and incline angularly upward from their respective front extremities 287 and 297 directly to the rear of the rear rail 212 to their respective rear extremities 288 and 298. The sieve chute 250 extends rearward and inclines angularly upward above the return opening 156 to the rear end 250D toward the rear extremity 112 of the chaffer 100 from the front end 250C proximate to the rear rail 212 of the rear extremity 122 of the lower sieve 102. The plate 260 follows the webs 280 and 290, projecting rearward and inclining angularly upward from the front end's 250C front edge 266 between the notches 266A and 266B and in direct contact against the rear rail's 212 upper surface 212C between the rear end 202B and the lug 214 to the plate's 260 rear edge 268 under the chaffer's 100 rear extremity 112, forming a space or gap G between the plate's 260 rear edge 268 and the chaffer's 100 rear extremity 112. The space or gap G in FIG. 6A extends transversely under the chaffer's 100 rear extremity 112 from the sieve chute's 250 left end 250A to its right end 250B. The direct contact of the front end's 250C front edge 266 between the notches 266A and 266B against the rear rail's 212 upper surface 212C between the rear end 202B and the lug 214 forms or otherwise defines a closed interface between the front end's 250C front edge 266 extending between the notches 266A and 266B and the rear rail 212, specifically the upper surface 212C of the rear rail 212 between the rear end 202B and the lug 214. Accordingly, the sieve chute 250 extends forward and slopes downward from its rear end 250D to its front end 250C.

Referring in relevant part to FIGS. 6B, 15-18, 20, and 21, in the sieve chute's 250' installed position the webs 280' and 290' extend rearward and incline angularly upward from their respective front extremities 287' and 297' directly to the rear of the rear rail 212 to their respective rear extremities 288' and 298'. The sieve chute 250' extends rearward and inclines angularly upward above the return opening 156 to the rear end 250D' toward the rear extremity 112 of the chaffer 100 from the front end 250C' proximate to the rear rail 212 of the rear extremity 122 of the lower sieve 102. The plate 260' follows the webs 280' and 290', projecting rearward and inclining angularly upward from the front end's 250C front edge 266' between the notches 266A' and 266B' and in direct contact against the rear rail's 212 upper surface 212C between the rear end 204B and the lug 214 to the plate's 260' rear edge 268' under the chaffer's 100 rear extremity 112, forming a space or gap G' between the plate's 260' rear edge 268' and the chaffer's 100 rear extremity 112. The space or gap G' in FIG. 6B is identical to the gap G in FIG. 6A and extends transversely under the chaffer's 100 rear extremity 112 from the sieve chute's 250' left end 250A' to its right end 250B'. The direct contact of the front end's 250C' front edge 266' between the notches 266A' and 266B' against the rear rail's 212 upper surface 212C between the rear end 204B and the lug 214 forms or otherwise defines a closed interface between the front end's 250C' front edge 266' extending between the notches 266A and 266B and the rear rail 212, specifically the upper surface 212C of the rear rail 212 between the rear end 202B and the lug 214. Accordingly, the sieve chute 250' extends forward and slopes downward from its rear end 250D' to its front end 250C'.

Figure 21:
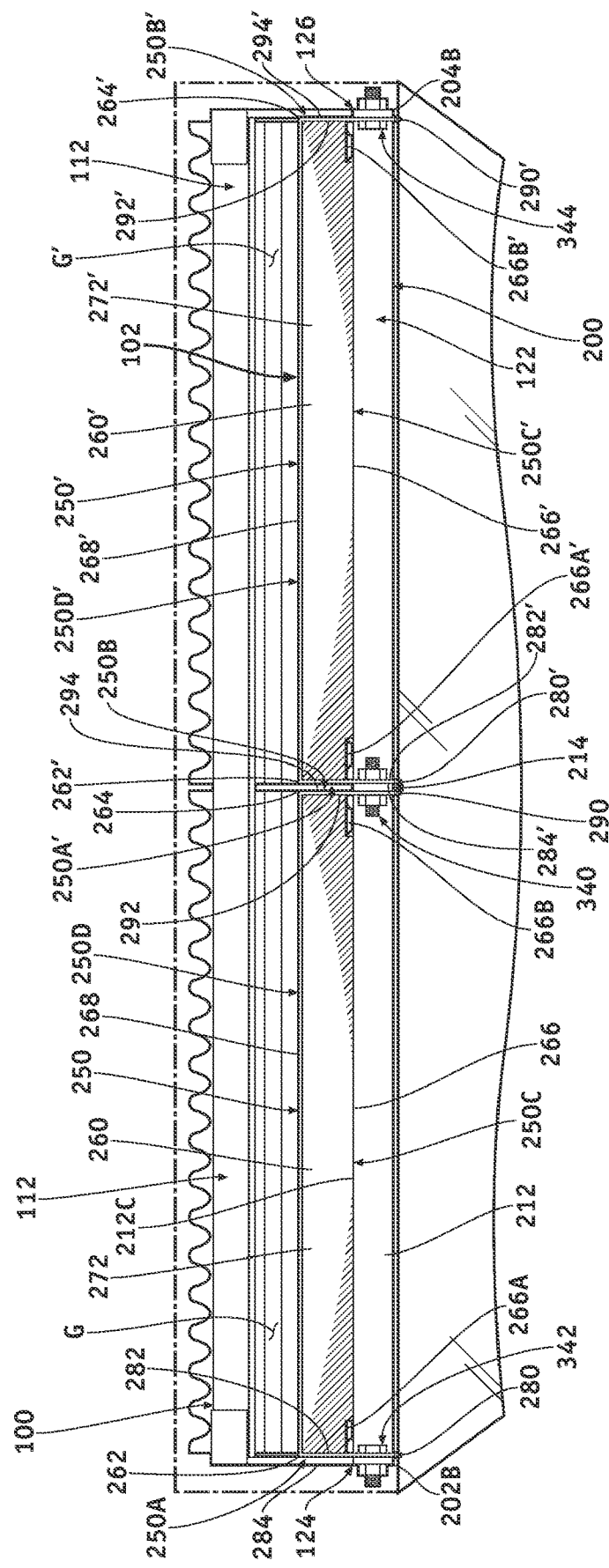
FIG. 21 is a rear elevation view of the lower sieve of FIGS. 15 and 16, also showing the chaffer of FIGS. 1-6 over the lower sieve.

FIG. 22 is an enlarged fragmentary rear elevation view corresponding to FIG. 21, illustrating the central bolted connection securing the web 290 at the sieve chute's 250 right side and the web 280' at the sieve chute's 250' left side to the lower sieve's 102 lug 214, and FIG. 23 is a vertical section view of the central bolted connection of FIG. 22. Referring to FIGS. 22 and 23 relevantly, the fastener 340 includes a shank 350 and two identical nuts, including a first nut 350 and second nut 352. The first nut 350 and the second nut 352 are each internally threaded. The shank 350 is longitudinally straight, extends from an end 360, a first end of the shank 350, to its other end 362, the second end of the shank 350. The shank 350 has external threads 364 and 366 on either side of unthreaded body 368. The external thread 364 is the first external thread of the shank 250. The external thread 366 is the second external thread of the shank 350.

The worker secures the webs 290 and 280' to the lug 214 sandwiched therebetween by inserting the shank 350 through the axially aligned holes 296, 324, and 286'. He does this by inserting the shank second end 362 first through the web's 290 opening 296 from inner surface 292 to outer surface 294, through the lug's 214 opening 324 from surface 320 to surface 322, and through the web's 280' opening 286' from outer surface 284' to inner surface 282'. The unthreaded body 369 extends through the lug's 214 opening 324 and the openings 296 and 286' on either side of it, the first external thread 364 extends outwardly from the inner surface 292 of the web 290 to the first end 360, and the second external thread 366 extends outwardly from the inner surface 282' of the web 280. The worker turns the internally threaded first nut 352 over the first external thread 364 and the internally threaded second nut 354 over the second external thread 366, threading the first nut 352 over the first external thread 364 and the second nut 354 over the second external thread 366. The worker turns the first and second nuts 352 and 354 over the respective first and second external threads 354 and 366, urging them toward and tightening them firmly against the respective inner and outer surfaces 292 and 282'. This clamps the web 290, the lug 214, and the web 280' between the first nut 352 against the web's 290 inner surface 292 and the second nut 354 against the web's 280' inner surface 282', clamping the outer surfaces 294 and 284' of the respective webs 290 and 280' against the lug's 214 surfaces 320 and 322, respectively, securing the webs 290 and 280' to the lug 214. The worker can release the webs 290 and 280' from the lug 214 by reversing this operation.

Figure 25:
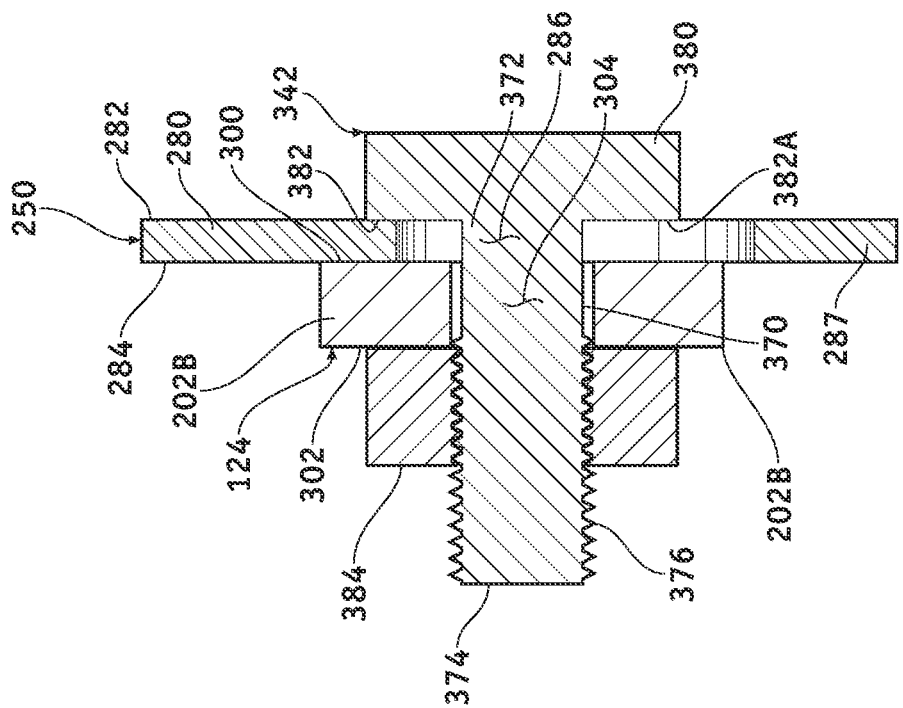
FIG. 25 is a vertical section view of the outer bolted connection of FIG. 24.
Figure 24:
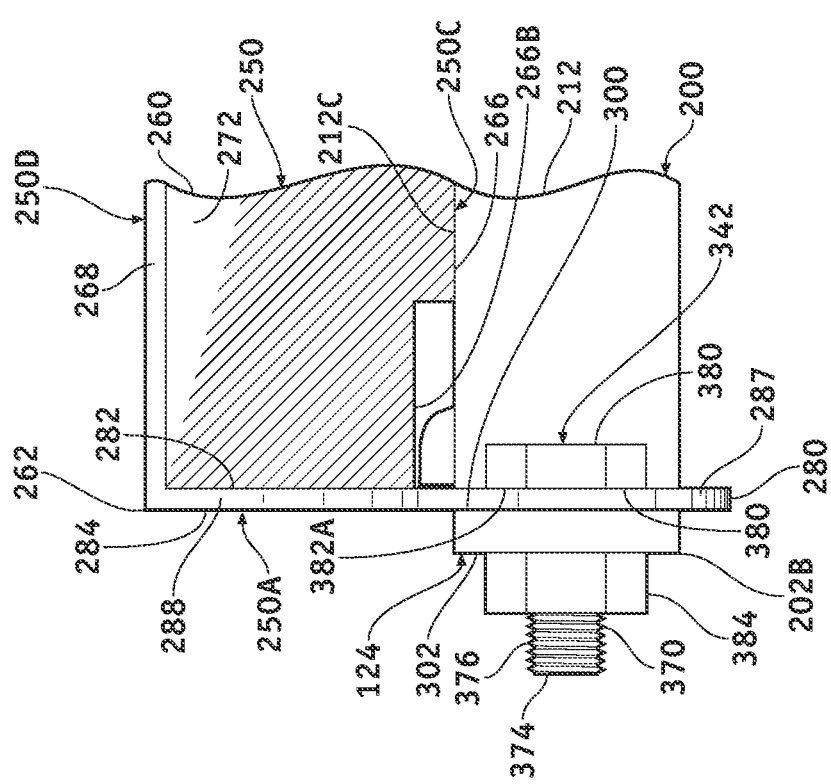
FIG. 24 is an enlarged fragmentary rear elevation view corresponding to FIG. 21, illustrating an outer bolted connection connecting of one of the sieves chute to the lower sieve.

FIG. 24 is an enlarged fragmentary rear elevation view corresponding to FIG. 21, illustrating the outer bolted connection securing the web 280 to the lower sieve's 102 rear end 202B, and FIG. 25 is a vertical section view of the outer bolted connection of FIG. 24. Referring to FIGS. 24 and 25 relevantly, the fastener 342 includes a bolt, including a longitudinally straight shank 370 extending from a proximal end 372, configured with enlarged head 380 having an underside 382, to a distal end 374, and an external thread 376. The shank 370 extends outwardly to the external thread 366 and the distal end 374 from the proximal end 372 affixed centrally to the underside 382 of the head 100. A radial bearing surface or radius 382A of the underside 382 radiates outwardly from the shank 370.

The worker secures the web 280 to the rear end 202B by inserting the shank 370 through the axially aligned holes 286 and 304. He does this by inserting the shank 370 distal end 374 first through the web's 280 opening 286 from the inner surface 282 to the outer surface 284, and through the rear end's 202B opening 304 from the inner surface 300 to the outer surface 302, bringing the radial bearing surface 382A of the head's 380 underside 382 directly against the web's 280 inner surface 282 so the external thread 376 extends outwardly from the outer surface 302 of the rear end 202B to the shank's 370 distal end 374. The worker turns an internally threaded nut 384 over the external thread 376, threading the nut 384 over the external thread 376. The worker turns the nut 384 over the external thread 376, urging it and the head's 380 radial bearing surface 382A toward and tightening them firmly against the outer surface 302 of the rear end 202B and the inner surface 282 of the web 280, respectively. This clamps the web 280 and the rear end 202B between the head's 380 radial bearing surface 382A against the web's 280 inner surface 282 and the nut 384 against the rear end's 202B outer surface 302, clamping outer surface 284 of the web 280 against the inner surface 300 of the rear end 202B, securing the web 280 to the rear end 202B. The worker can release the web 280 from the rear end 202B by reversing this operation.

Figure 27:
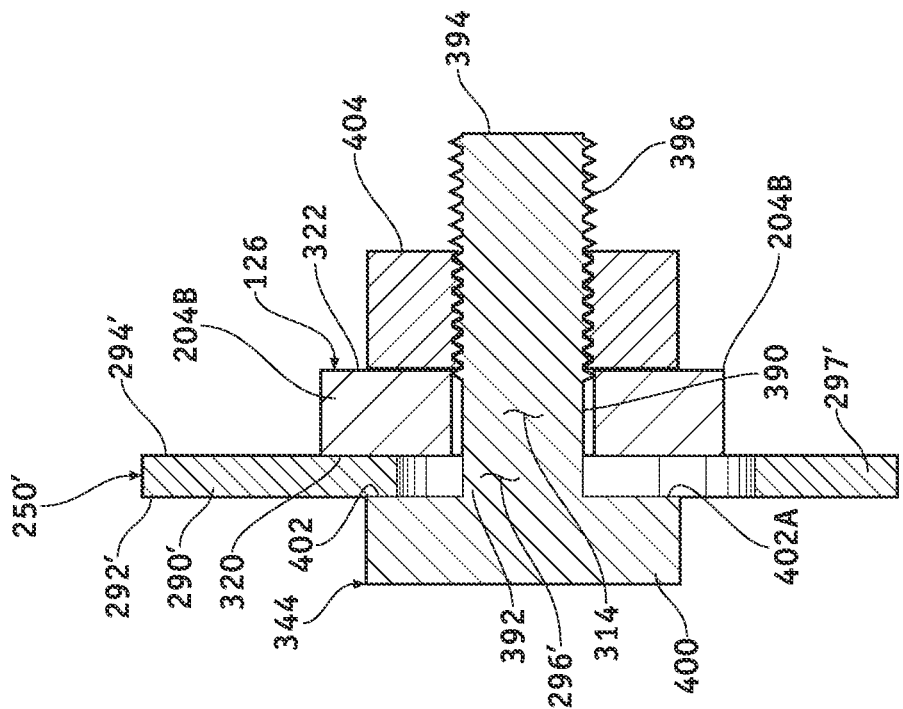
FIG. 27 is a vertical section view of the outer bolted connection of FIG. 26.
Figure 26:
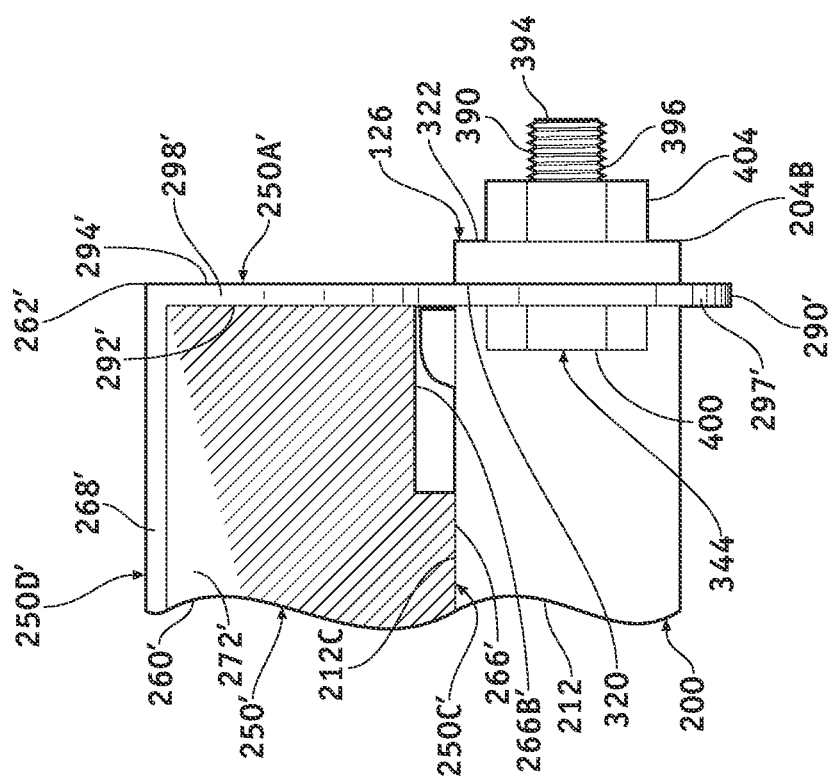
FIG. 26 is an enlarged fragmentary rear elevation view corresponding to FIG. 21, illustrating another outer bolted connection connecting one of the sieves chute to the lower sieve.

FIG. 26 is an enlarged fragmentary rear elevation view corresponding to FIG. 21, illustrating the outer bolted connection securing the web 290' to the lower sieve's 102 rear end 204B, and FIG. 27 is a vertical section view of the outer bolted connection of FIG. 26. Referring to FIGS. 26 and 27 relevantly, the fastener 344 includes a bolt, including a longitudinally straight shank 390 extending from a proximal end 392, configured with an enlarged head 400 having an underside 402, to a distal end 394, and an external thread 396. The shank 390 extends outwardly to the external thread 366 and the distal end 394 from the proximal end 392 affixed centrally to the underside 402 of the head 100. A radial bearing surface or radius 402A of the underside 402 radiates outwardly from the shank 390.

The worker secures the web 290' to the rear end 204B by inserting the shank 390 through the axially aligned holes 296' and 314. He does this by inserting the shank 390 distal end 394 first through the web's 290' opening 296' from inner surface 292' to outer surface 294', and through the rear end's 204B opening 314 from the inner surface 310 to the outer surface 312, bringing the radial bearing surface 402A of the head's 400 underside 402 directly against the web's 290' inner surface 292' so the external thread 396 extends outwardly from the outer surface 312 of the rear end 204B to the shank's 390 distal end 394. The worker turns an internally threaded nut 404 over the external thread 396, threading the nut 404 over the external thread 396. The worker turns the nut 404 over the external thread 396, urging it and the head's 400 radial bearing surface 402A toward and tightening them firmly against the outer surface 312 of the rear end 204B and the inner surface 292' of the web 290', respectively. This clamps the web 290' and the rear end 204B between the head's 400 radial bearing surface 402A against the web's 290' inner surface 292' and the nut 404 against the rear end's 204B outer surface 312, clamping outer surface 294' of the web 290' against the inner surface 310 of the rear end 204B, securing the web 290' to the rear end 204B. The worker can release the web 290' from the rear end 204B by reversing this operation.

The central bolted connection using fastener 340, the outer bolted connection using fastener 342, and the outer bolted connection using fastener 344 enable the sieve chutes 250 and 250' to be removed and replaced or repaired as needed. If desired, the worker may permanently affix web 280 to the rear end 202B, the webs 290 and 280' to the lug 214, and the web 290' to the rear 204B, such as by welding. Once the sieve chutes 250 and 250' are connected to the lower sieve's 102 frame 200 in their installed positions, they are fixed in place and immovable. The sieve chutes 250 and 250' have no rotating or moving parts and are immovably mounted to the lower sieve's 102 frame 200. The sieve chutes 250 and 250' move with lower sieve 102 as it oscillates during operation. The positions/orientations of the lower sieves 250 and 250' relative to the lower sieve 102 do not change while the lower sieve 102 oscillates during operation.

Concerning the assembly of the sieve chutes 250 and 250' and the lower sieve 102 referencing FIGS. 1-5, 6A, 6B, and 15-21 relevantly, the sieve chutes 250 and 250' are mounted proximate to the rear extremity 122 of the lower sieve 102. They are spaced under the chaffer 100 extending rearward beyond the rear extremity 122 of the lower sieve 102. The sieve chute 250 extends transversely along the width of the lower sieve 102 from its end 250A connected to the frame's 200 rear end 202B to its end 250B connected to the frame's 200 lug 214 centered between the rear ends 202B and 204B. The sieve chute 250 extends rearward and inclines angularly upward from the lower sieve's 102 rear extremity 122 toward the chaffer's 100 rear extremity 112 extending beyond the lower sieve's 102 rear extremity 122. The sieve chute 250 extends upright so its webs 280 and 290 extend upright to the plate 260 and the plate's 260 upper surface 270 facing upward toward the chaffer 100 extending rearward beyond the rear extremity 122 of the lower sieve 102. Based on this, the sieve chute 250 and its upper surface 270 extend forward and slope downward from the rear end 250D to the front end 250C at the lower sieve's 102 rear extremity 122. The sieve chute 250' extends transversely along the width of the lower sieve 102 from its end 250A' connected to the frame's 200 lug 214 centered between the rear ends 202B and 204B to its end 250B' connected to the frame's 200 rear end 204B. The sieve chute 250' extends rearward and inclines angularly upward from the lower sieve's 102 rear extremity 122 toward the chaffer's 100 rear extremity 112 extending beyond the lower sieve's 102 rear extremity 122. The sieve chute 250' extends upright so its webs 280' and 290' extend upright to the plate 260' and the plate's 260' upper surface 270' facing upward toward the chaffer 100 extending rearward beyond the rear extremity 122 of the lower sieve 102. Based on this, the sieve chute 250' and its upper surface 270' extend forward and slope downward from the rear end 250D' to the front end 250C' at the lower sieve's 102 rear extremity 122. The sieve chutes 250 and 250' are parallel relative to the frame's 200 rear rail 212, perpendicular relative to the lower sieve's sides 124 and 126, and axially aligned transversely along the width of the lower sieve 102 from side 124 to side 126. The sieve chutes 250 and 250' are transverse to the crop layer flow path P and the airflow pathway F in FIGS. 2-5, 6A, and 6B and the combine's 50 longitudinal axis extending from the header 60 to its rear or discharge end. The sieve chutes 250 and 250' are spaced vertically under the rear extremity 112 of the chaffer 100 extending rearward beyond the rear extremity 122 of the lower sieve 102 and over the return opening 156.

Accordingly, the sieve chutes 250 and 250' extend rearward and incline angularly upward toward the chaffer's 100 rear extremity 112 extending rearward beyond the rear extremity 122 of the lower sieve 102 from the lower sieve's 102 rear extremity 122. Being inclined, the sieve chutes 250 and 250 and their upper surfaces 270 and 270' tilt forward toward the lower sieve's 102 rear extremity 122. They are spaced below the chaffer's 100 rear extremity 112 extending rearward beyond the rear extremity 122 of the lower sieve 102. This forms the gap G between the chaffer's 100 rear extremity 112 and the rear edge 268 of the sieve chute's 250 rear end 250D and the gap G' between the chaffer's 100 rear extremity 112 and the rear edge 268' of the sieve chute's 250' rear end 250D'. The sieve chutes 250 and 250' are above the return opening 156. They extend upright to their respective upper surfaces 270 and 270'. The upper surfaces 270 and 270' face upward toward the chaffer's 100 rear extremity 112 extending rearward beyond the rear extremity 122 of the lower sieve 102. The upper surfaces 270 and 270' incline angularly upward from the lower sieve 102 and away from the combine's 50 discharge end, in which the upper surfaces 270 and 270' tilt forward toward the lower sieve's 102 rear extremity 122. Accordingly, the sieve chute 250 and its upper surface 270 slope downward sufficiently from the rear end 250D to the front end 250C at the lower sieve's 102 rear extremity 122 and the sieve chute 250' and its upper surface 270' slope downward sufficiently from the rear end 250D' to the front end 250C' at the lower sieve's 102 rear extremity 122 to allow the sieve chutes 250 and 250' to reduce or otherwise favorably influence clean grain 160 loss to the return 150 and the yield of clean grain 160 to the combine's 50 a clean grain trough 140 and its grain tank. Their deflecting surfaces, the respective upper surfaces 270 and 270' tilted forward toward the lower sieve's 102 rear extremity 122, are sufficiently inclined to enable them to intercept clean grain 160 falling downward from the chaffer 100 extending rearward beyond the rear extremity 122 of the lower sieve 102 to the rear of the lower sieve's 102 rear extremity 122 and inherently divert it forward in the direction of arrows E and E', respectively, to the lower sieve 102 away from the return opening 156. The diverted clean grain 160 passes by sliding downward and forward along the sloped upper surfaces 270 and 270' to the respective front ends 250C and 250C', forward beyond the front ends 250C and 250C' of the respective sieve chutes 250 and 250' to the lower sieve 102, and downward through the lower sieve 102 to the clean grain chute 104, not to the return opening 156. At the same time, the sieve chutes 250 and 250' allow air to flow rearward through the airflow pathway F in FIGS. 4, 5, 6A, and 6B between the rear extremity 112 of the chaffer 100 extending rearward beyond the rear extremity 122 of the lower sieve 102 and the sieve chutes 250 and 250' and through the gaps G and G' in FIGS. 6A and 6B. The airflow pathway F allows the air from the fan 108 to blow rearward over the lower sieve 102 and the sieve chutes 250 and 250' under the chaffer 100 and through the gaps G and G' to facilitate the expulsion of impurities through the discharge end at the rear of the combine 50 while the upper surfaces 270 and 270' of the sieve chutes 250 and 250' over the return opening 156 intercept the clean grain 160 falling downward from the chaffer's 100 rear extremity 112 extending rearward beyond the rear extremity 122 of the lower sieve 102 and divert the intercepted clean grain 160 forward to the lower sieve 102 in the directions of f arrow E and E', respectively, and away from the return opening 156. Thus, the sieve chutes 250 and 250' each usefully ameliorate or otherwise favorably influence the loss of clean grain 160 to the return 150 through the return opening 156 and its return to the combine's 50 threshing and separating apparatus 64 by the return elevator or conveyor 154, the yield of clean grain 160 to the combine's 50 a clean grain trough 140 and its grain tank, the burden on the threshing and separating apparatus 64, preventing it from having to reprocess lost clean grain 160 returned to it from the return 150 in addition to the crop material fed to it from the feeder house 62, the combine's 50 ground speed, the rate at which it moves through a field while harvesting a crop, consumption and degradation of the combine's 50 fuel components, and wear-and-tear on the combine's 50 processor. The closed interfaces between the rear rail 212 of the lower sieve's 102 rear extremity 122 and the front ends 250C and 250C' of respective sieve chutes 250 and 250' prevent clean grain 160 and other material from collecting between the sieve chutes 250 and 250' and the lower sieve's 102 rear rail 212, specifically between the sieve chute's 250 front edge 266 between the notches 266A and 266B and the upper surface 212C of the rear rail 212 between the rear rail's 212 end 212A and the lug 214, and between the sieve chute's 250' front edge 266' between the notches 266A' and 266B' and the upper surface 212C of the rear rail 212 between the rear rail's 212 end 212B and the lug 214.

The lower sieve 102 incorporates two sieve chutes 250 and 250' and it can include more or less as desired. If it has one sieve chute, it can extend across the width of the chaffer from side 124 to side 126. Accordingly, the placement of the sieve chutes 250 and 250' under that part of the chaffer 100 extending rearward beyond the rear extremity 122 of the lower sieve 102 allows each of the sieve chute's 250 and 250' to intercept grain from the chaffer 100 and deflect it to the lower sieve 102, stopping it from falling to the return opening 156. Instead of falling to the return opening 156, the grain deflected forward to the lower sieve 102 by each of the sieve chutes 250 and 250' falls through the lower sieve 102 to the clean grain chute 104, through the pathway B by the clean grain chute 104 to the clean grain auger or conveyor 142 operating in the clean grain trough 140.

II.

Figure 28:
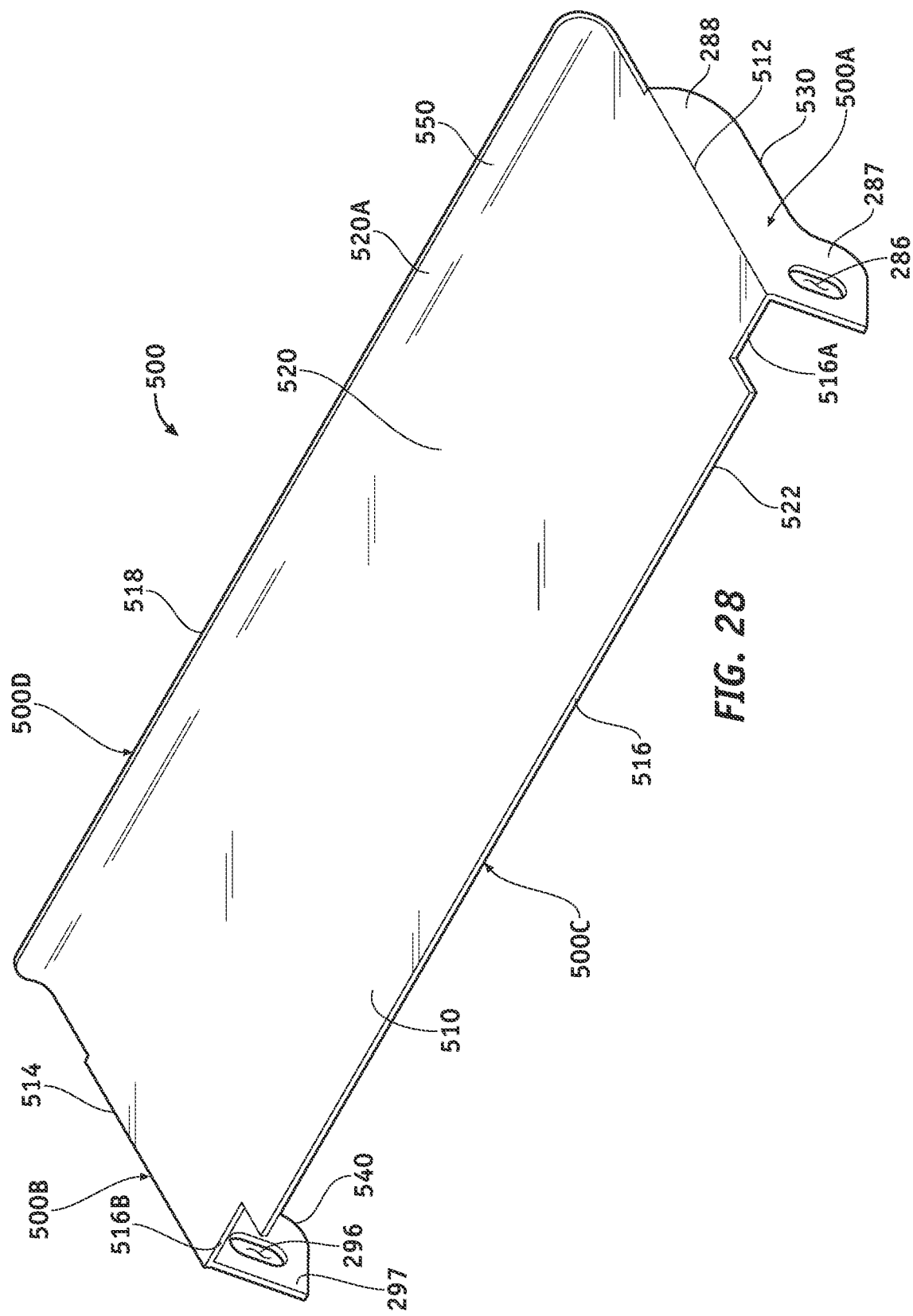
Figure 31:
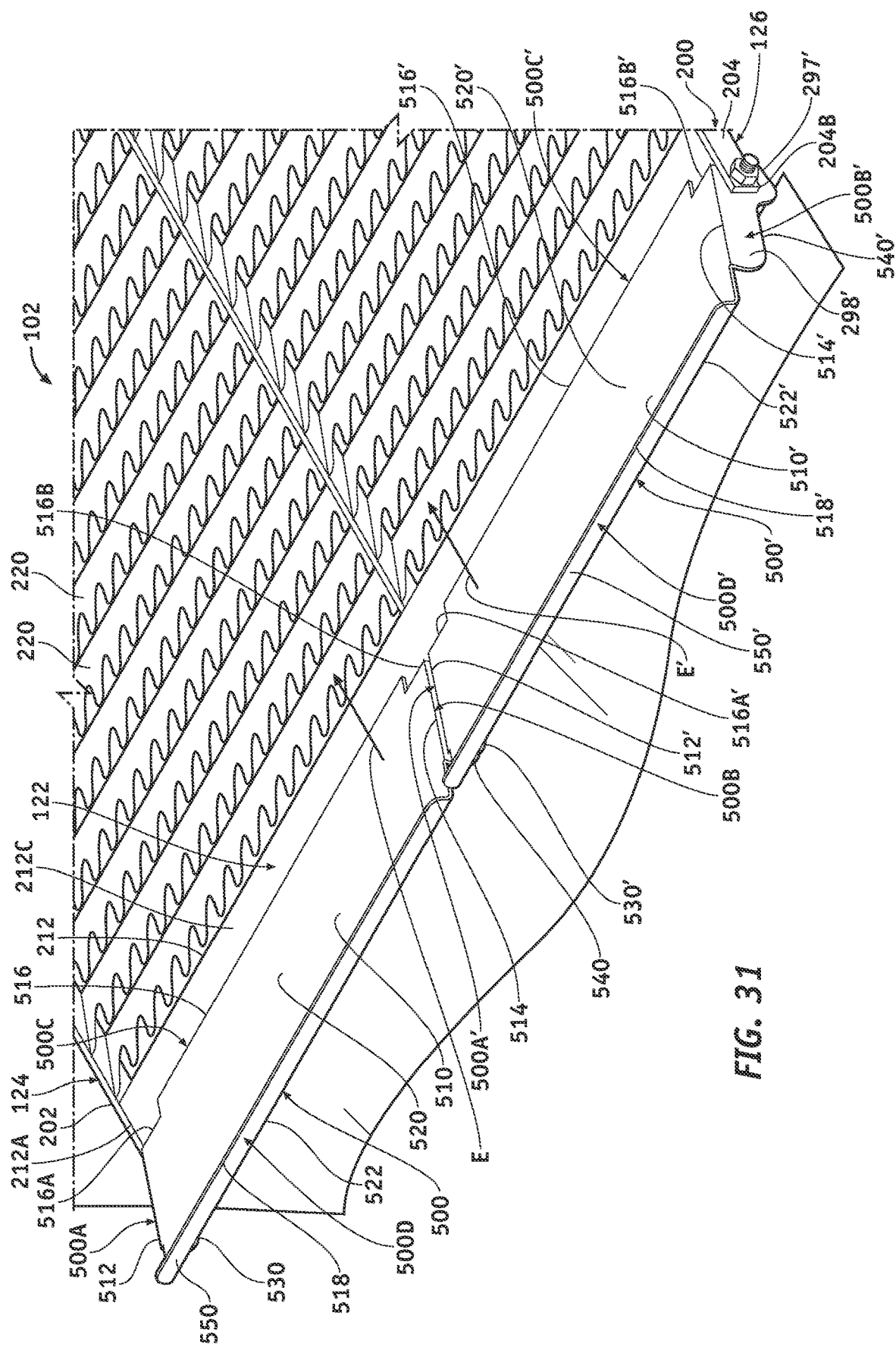
FIGS. 31 and 32 are fragmentary right and left rear perspective views, respectively, of a lower sieve configured with two identical sieve chutes, including the sieve chute first illustrated in FIGS. 28 and 29.
Figure 32:
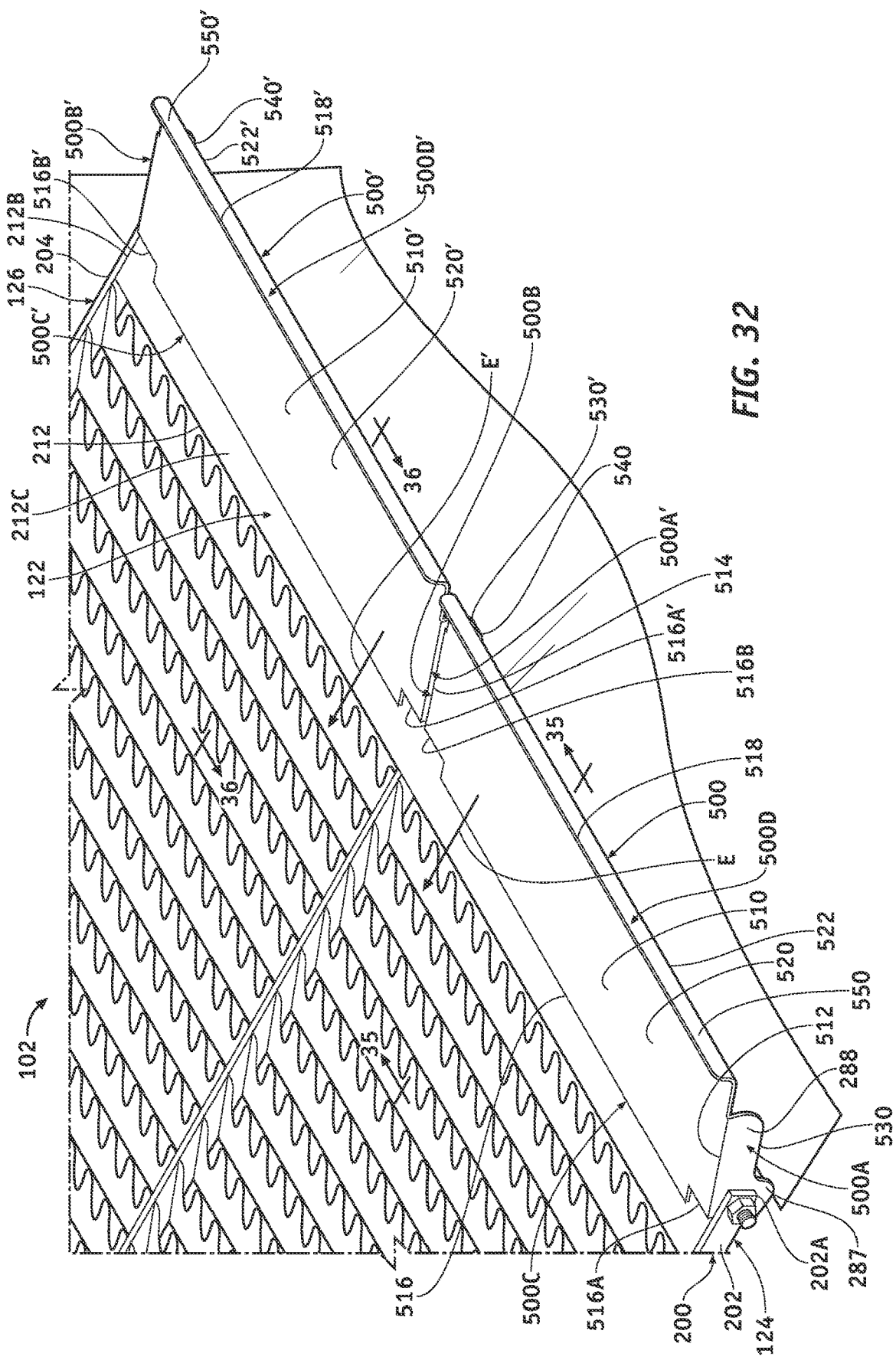
Figure 33:
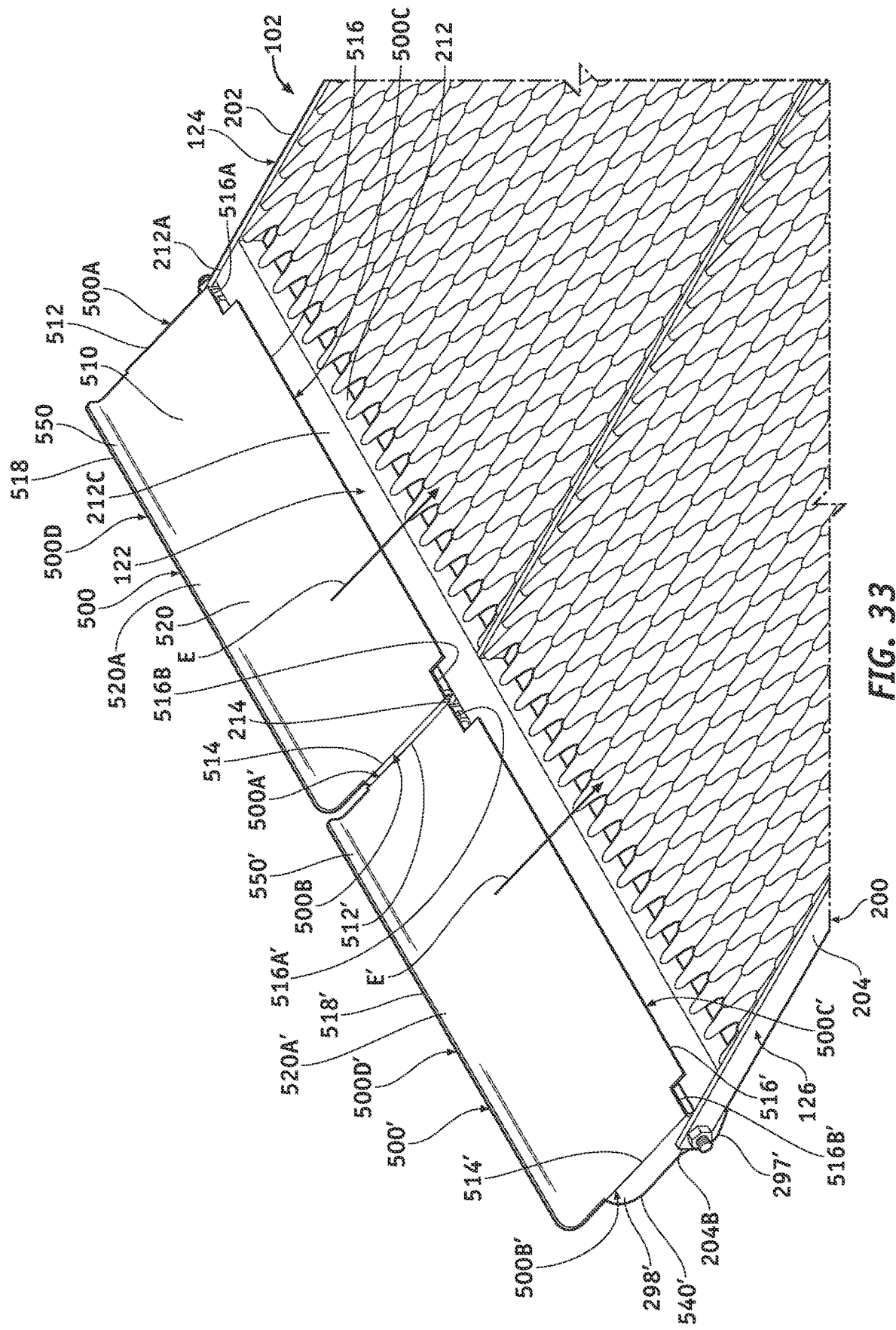
FIGS. 33 and 34 are fragmentary right and left side front perspective views corresponding to FIGS. 31 and 32, respectively, illustrating the sieve chutes attached to the lower sieve.
Figure 34:
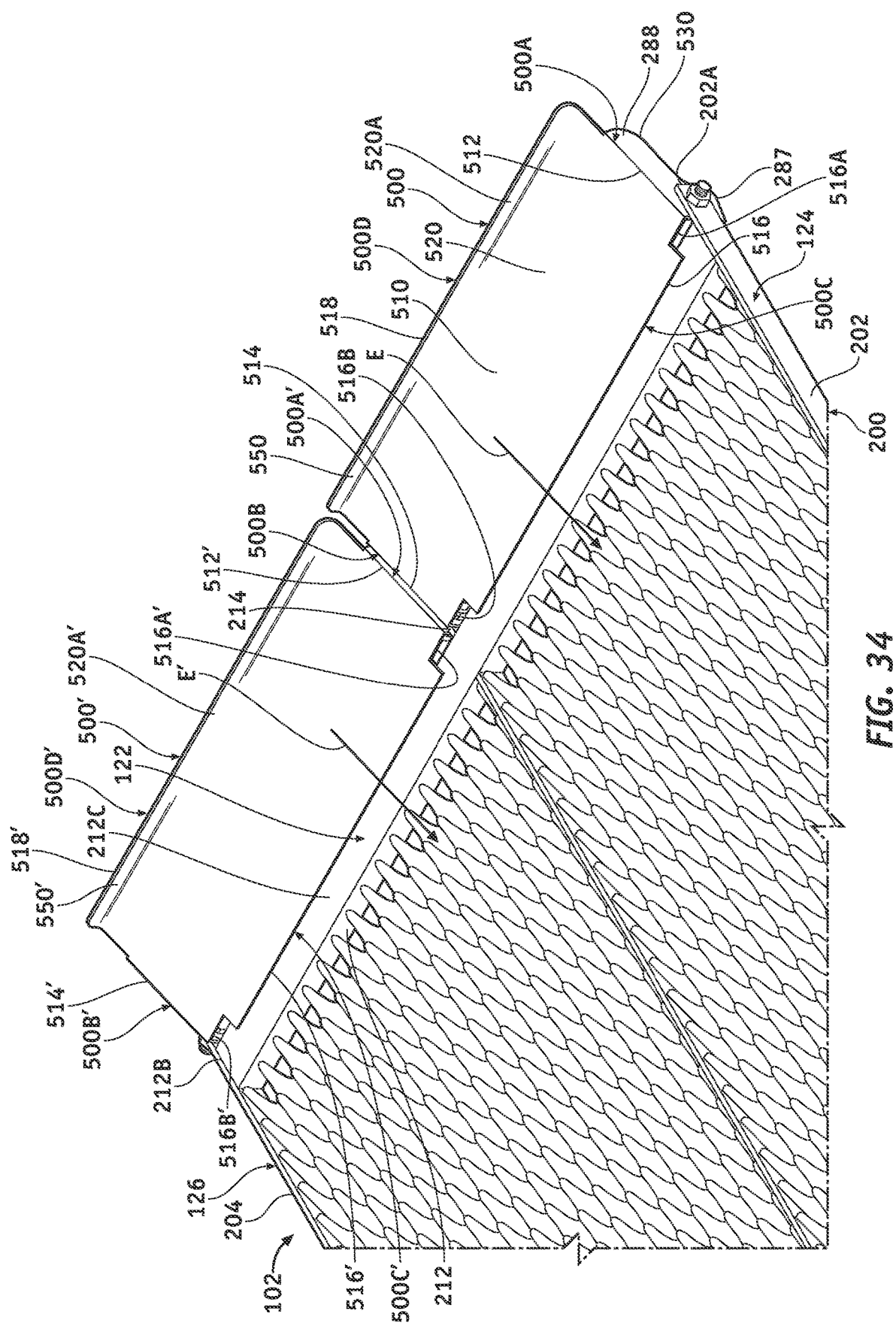
Figure 35:
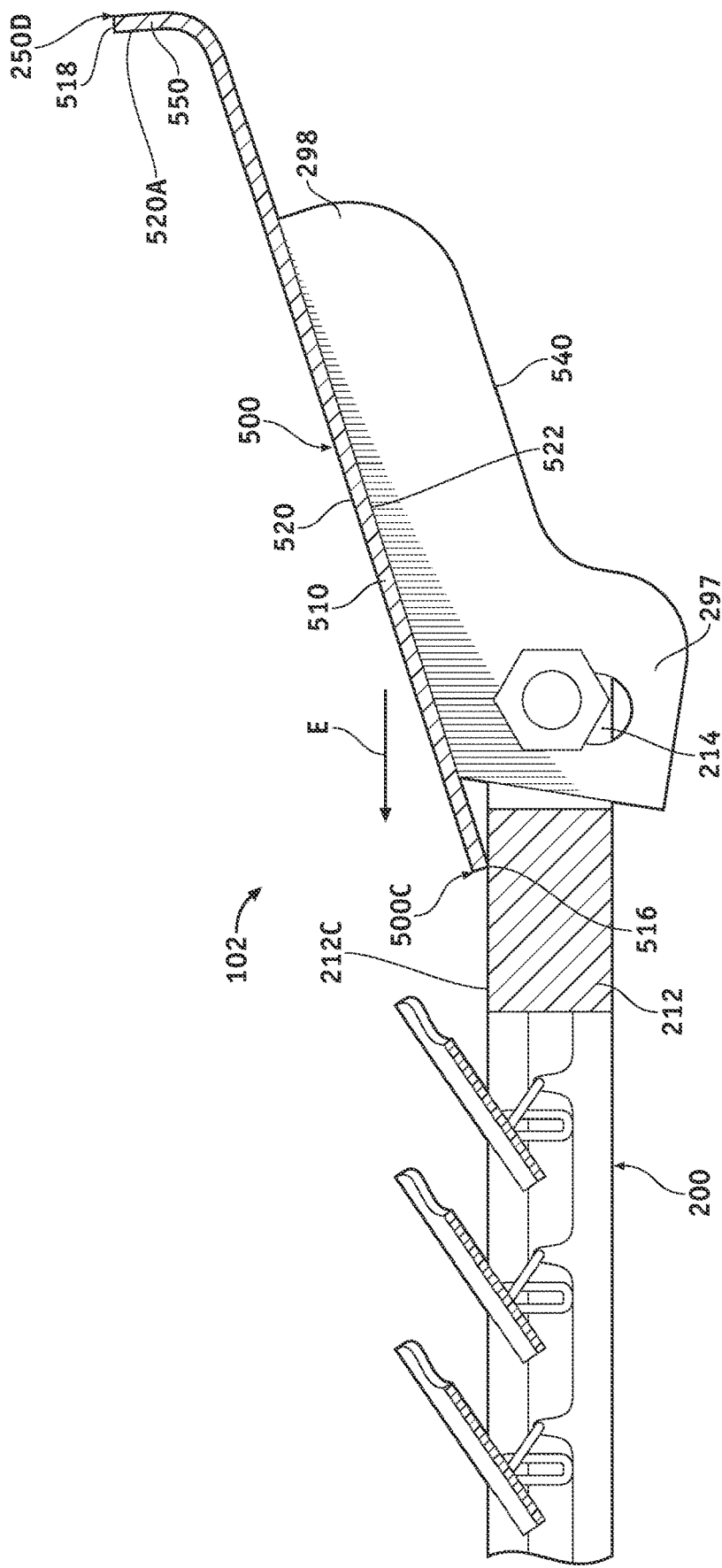
FIG. 35 is a section view taken along line 35-35 of FIG. 32.
Figure 36:
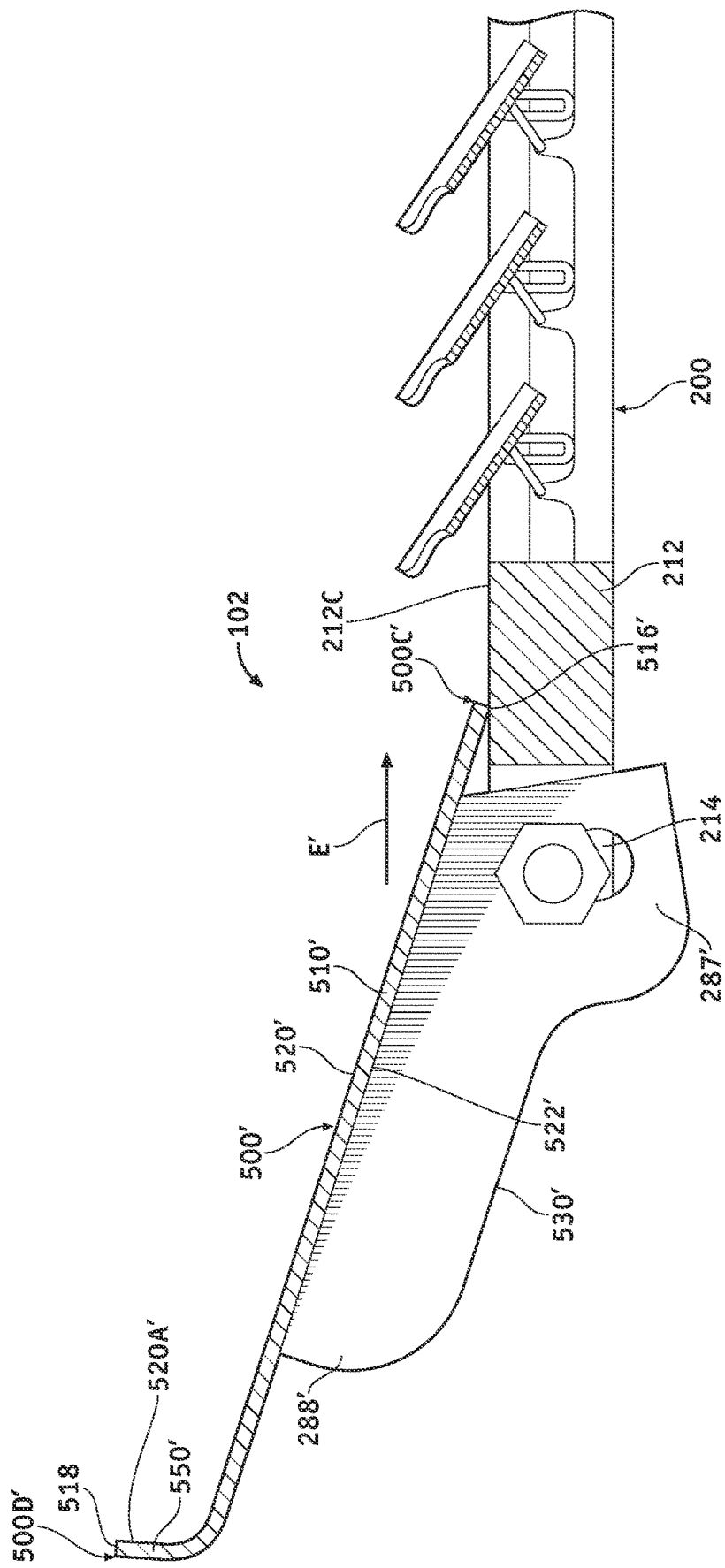
FIG. 36 is a section view taken along line 36-36 of FIG. 32.

FIGS. 28, 29 and 31 illustrate an alternate embodiment of a sieve chute 500. The sieve chute 500 is a rigid, jointless, elongate structural member of metal, preferably steel. The sieve chute 500 has opposed ends 500A and 500B and opposed front and rear ends 500C and 500D. The end 500A is the sieve chute's 500 left end. The end 500B is the sieve chute's 500 right end.

The sieve chute 500 includes a sheet or plate 510 configured with ears or webs 530 and 540 at the respective left and right ends 500A and 500B and a flange 550 at the rear end 500D. The flange 550 is a projecting rim or end wall. Being formed with the flange 550, the rear end 500D is a flanged end. The webs 530 and 540 are identical in every respect to the respective webs 280 and 290 of the sieve chute 250 described above. Accordingly, webs 530 and 540 bear the same reference characters as the respective webs 280 and 290 as needed.

The plate 510 has an end edge 512 at the left end 500A and an opposing end edge 514 at the right end 500B. The front end 500C includes a front edge 516. The rear end 500D includes a rear edge 518. The rear edge 518 and the flange 550 oppose the front edge 516. The plate 510 has an upper surface 520 and an opposing lower surface 522. The plate 510 is solid, impervious, without holes or openings, and is flat from end edge 512 to end edge 514 and from front edge 516 to the flange 550. The flange 550 projects upright from the plate's 510 upper surface 520 to the plate's 510 rear edge 518. The upper surface 520, a deflecting surface, follows the flange 550 upward to the rear edge 518. Accordingly, the part of upper surface 520 following the flange 550, the flange's 550 deflecting surface, is denoted at 520A. The end edges 512 and 514 are parallel relative to one another. The front edge 516 is notched by a notch 516A proximate to the end edge 512 and an opposed notch 516B proximate to end edge 514. The flange 550 and the rear edge 518 extend transversely and longitudinally straight along the length of the sieve chute 500 of from the end edge 512 to the end edge 514 and are parallel to the front edge 516 that extends between the notches 516A and 516B. The end edges 512 and 514 extend from the respective notches 516A and 516B to the rear edge 518 and are perpendicular relative to the flange 550 and the rear edge 518 and the front edge 516 extending between the notches 516A and 516B. The upper surface 520 between the end edges 512 and 514 and between the front edge 516 and the flange 550 is parallel to the lower surface 522. The plate 510 has a uniform thickness from the upper surface 520 to the lower surface 522.

The web 530 extends from the end edge 512 outwardly from the plate's 510 lower surface 522 in opposition to the plate's 510 upper surface 520. The web 530 extends rearward along the end edge 512 from its front extremity 287 and the notch 516A to its rear extremity 288 inboard of the flange 550. The web 540 extends from the end edge 514 outwardly from the plate's 510 lower surface 522 in opposition to the plate's 510 upper surface 520. The web 540 extends rearward along the end edge 514 from its front extremity 297 and the notch 516B to its rear extremity 298 inboard of the flange 550. The plate 510 extends rearward beyond the rear extremities 288 and 298 to the flange 550. Like webs 280 and 290 of the sieve chute 250, the webs 530 and 540 of the sieve chute 500 are identical, parallel to one another, and aligned axially and connect to a lower sieve in the same way as the sieve chute's 250 webs 280 and 290.

The end edge 512 and the web 530 extending therefrom define the sieve chute's 500 end 500A. The end edge 514 and the web 540 extending therefrom define the sieve chute's 500 end 500B. The front edge 516 that extends between the notches 516A and 516B defines the sieve chute's 500 front end 500C. The rear edge flange 550 and the rear edge 518 define the sieve chute's 500 rear or flanged end 500D. The ends 500A and 500B are equal in length and shorter than the overall transverse length of the sieve chute 500 extending from the end 500A to the end 500B. The web's 530 front extremity 287 and its opening 286 are proximate to the sieve chute's 500 front end 500C. The web's 530 rear extremity 288 is between the sieve chute's 500 front and rear ends 500C and 500D. The web's 540 front extremity 297 and its opening 296 are proximate to the sieve chute's 500 front end 500C. The web's 540 rear extremity 298 is between the sieve chute's 500 front and rear ends 500C and 500D.

Instead of being configured with lower sieves 250 and 250', in an alternate embodiment the lower sieve 102 is configured with two identical sieve chutes 500 and 500' in FIGS. 31-34. The sieve chutes 500 and 500' each favorably influences grain loss and the yield of clean grain to the combine's 50 grain tank. The sieve chutes 500 and 500', inclined or sloped slides over which material may pass, modify the lower sieve 102, improving it by allowing it to receive more clean grain 160 compared to when the lower sieve 102 is without the sieve chutes 500 and 500'. Since the sieve chutes 500 and 500' are identical, they share the same reference characters and the details of the sieve chute 500 apply in every respect to the sieve chute 500'. Each reference character used with the sieve chute 500' has a prime ("'") symbol for clarity.

Referring to FIGS. 31-38, relevantly, the sieve chutes 500 and 500' are mounted proximate to the rear extremity 122 of the lower sieve 102. They are mounted in the same way as how the sieve chutes 250 and 250' are mounted proximate to the rear extremity 122 of the lower sieve 102, by connecting the webs 540 and 530' to the lug 214, the web 530 to the rear end 202B, and the 540' to the rear end 204B. Once the sieve chutes 500 and 500' are connected to the lower sieve's 102 frame 200 in their installed positions, they are fixed in place and immovable. The sieve chutes 500 and 500' have no rotating or moving parts and are immovably mounted to the lower sieve's 102 frame 200. The sieve chutes 500 and 500' move with lower sieve 102 as it oscillates during operation. The positions/orientations of the lower sieves 500 and 500' relative to the lower sieve 102 do not change while the lower sieve 102 oscillates during operation.

Figure 37:
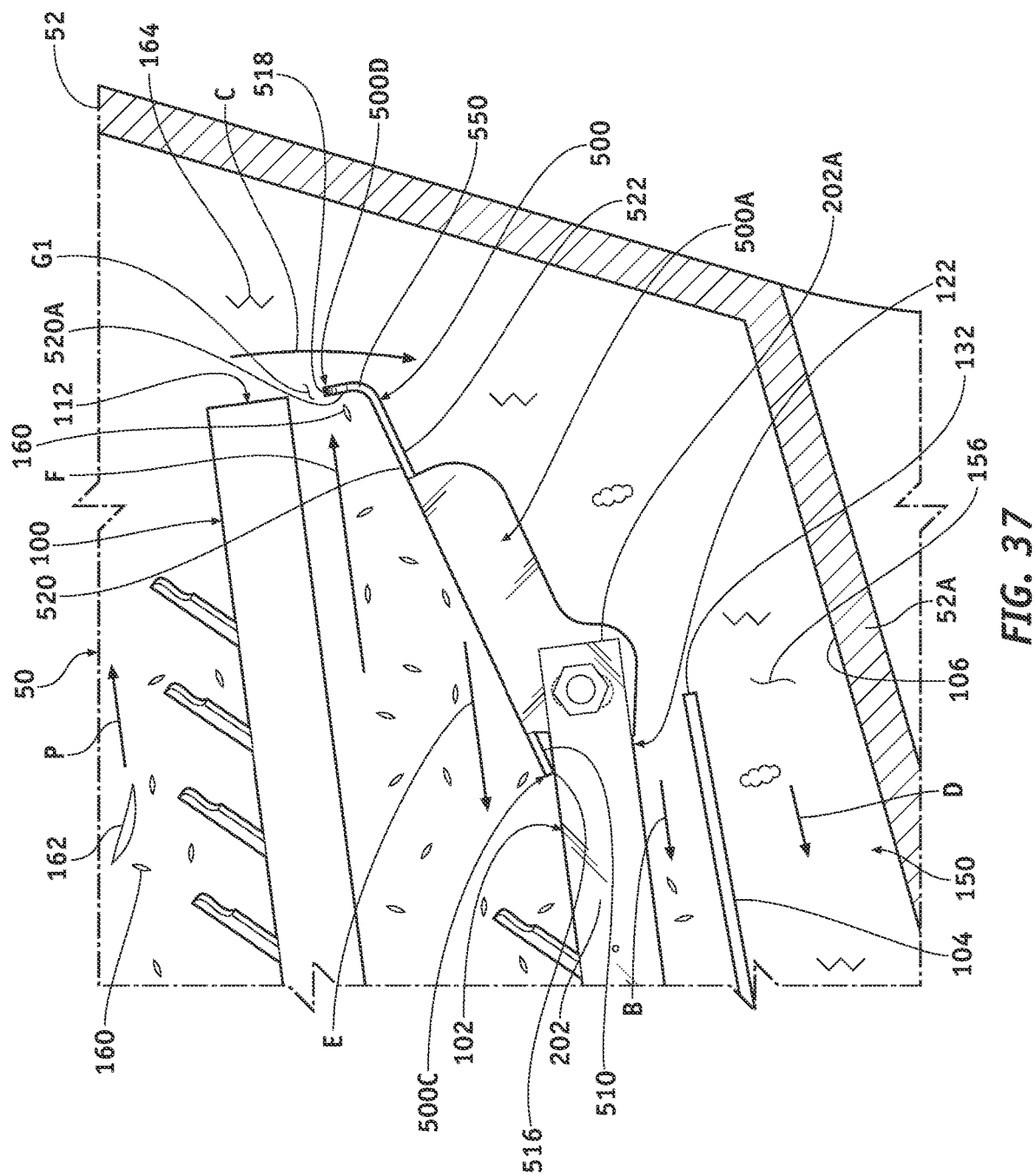
FIGS. 37 and 38 are enlarged left and right side elevation views like FIGS. 6A and 6B, respectively, each incorporating a FIGS. 28 and 29 sieve chute in place of the FIG. 7 sieve chute.
Figure 38:
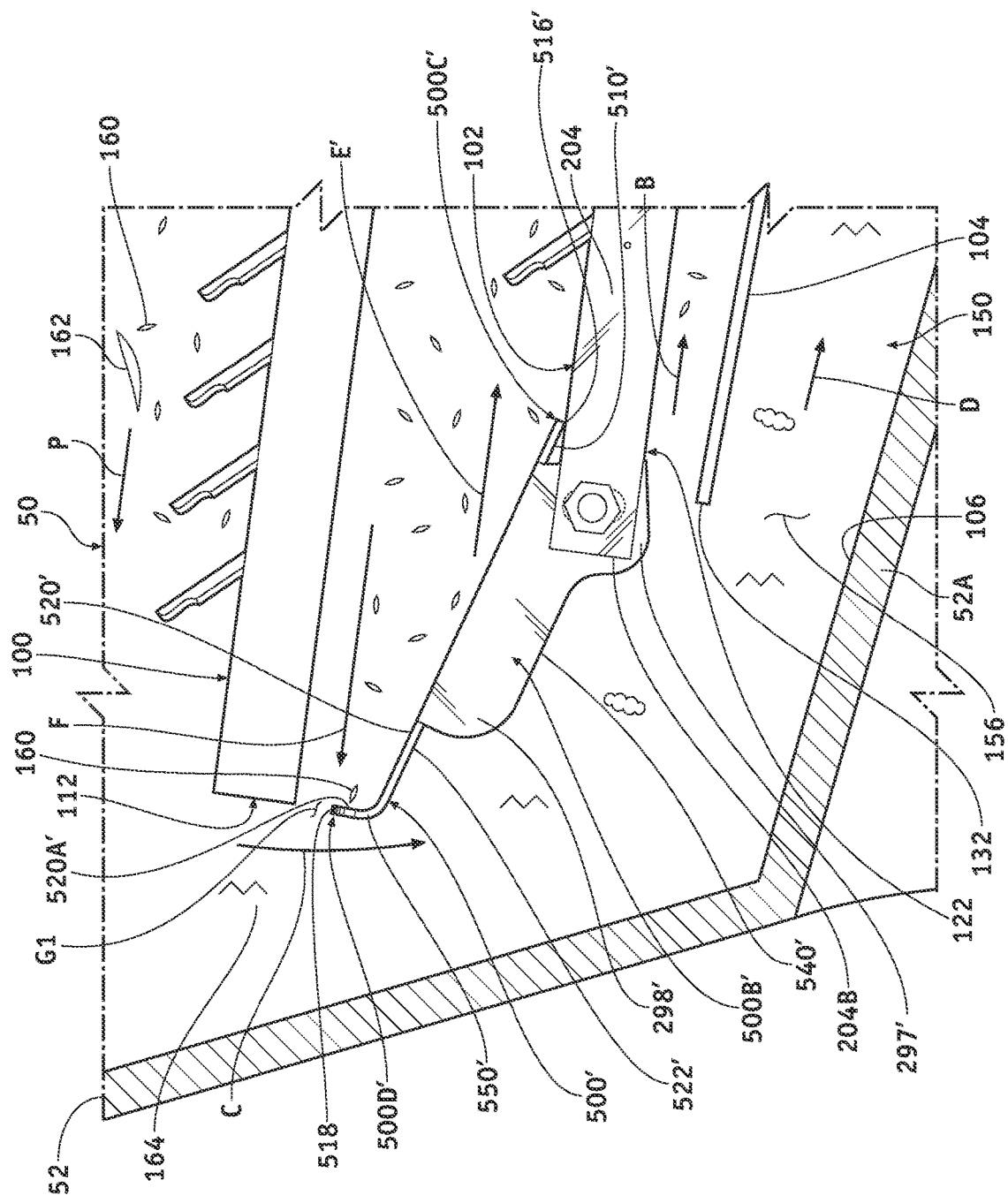

The sieve chutes 500 and 500' extend transversely along the width of the lower sieve 102 between its sides 124 and 126 and are transverse to the side rails 202 and 204 and the crop layer flow path P and airflow pathway F in FIGS. 37 and 38. In FIGS. 37 and 38, the sieve chutes 500 and 500' are spaced vertically under the rear extremity 112 of the chaffer 100 over the return opening 156. They extend rearward and incline angularly upward in their operative or installed positions toward the chaffer's 100 rear extremity 112 from the lower sieve's 102 rear extremity 122 above the return opening 156. Accordingly, the sieve chutes 500 and 500' tilt forward toward the rear extremity 122 of the lower sieve 102. This allows the sieve chutes 500 and 500' to intercept clean grain 160 falling downward to the rear of the lower sieve's 102 rear extremity 122 from the chaffer 100 above and extending rearward beyond the rear extremity 122 of the lower sieve 102 and divert it forward in the directions of arrow E and E', respectively, to the lower sieve 102 away from the return opening 156. At the same time, the sieve chutes 500 and 500' allow air to flow rearward through the airflow pathway F in FIGS. 37 and 38 between the rear extremity 112 of the chaffer 100 and the sieve chutes 500 and 500'. Like the sieve chutes 250 and 250', the expedient of the sieve chutes 500 and 500' sends more clean grain 160 to the lower sieve 102, causing the lower sieve 102 to receive more clean grain 160 and send it downward to the clean grain chute 104 compared to when the lower sieve 102 is without the sieve chutes 500 and 500'.

Arrows E and E' point in the same direction. Arrow E relates to the sieve chute 500. Arrow E' relates to the sieve chute 500'. Air from the fan 108 in FIG. 4 blows through the airflow pathway F rearward over the lower sieve 102 and the sieve chutes 500 and 500' to facilitate the expulsion of impurities out the back of the combine 50 through its discharge end while allowing the sieve chutes 500 and 500' over the return opening 156 to intercept clean grain 160 falling downward to the rear of the lower sieve's 102 rear extremity 122 from the chaffer 100 above and extending rearward beyond the rear extremity 122 of the lower sieve 102 and divert it forward to the lower sieve 102 and away from the return opening 156. And so the sieve chutes 500 and 500' each ameliorate or otherwise favorably influence the loss of clean grain 160 to the return 150 and its return to the combine's 50 threshing and separating apparatus 64 by the return elevator or conveyor 154, the yield of clean grain 160 to the combine's 50 a clean grain trough 140 and its grain tank, the burden on the threshing and separating apparatus 64, preventing it from having to reprocess lost clean grain 160 returned to it from the return 150 in addition to the crop material fed to it from the feeder house 62, the combine's 50 ground speed, the rate at which it moves through a field while harvesting a crop, consumption and degradation of the combine's 50 fuel components, and wear-and-tear on the combine's 50 processor.

The sieve chutes 500 and 500' are mounted directly to the lower sieve's 102 frame 200 identically to how the sieve chutes 250 and 250' are mounted to the lower sieve's frame 200. This forms an integrated lower sieve unit consisting of the sieve chutes 500 and 500' connected to the lower sieve 102.

Referring in relevant part to FIGS. 30-35 and 37, in the sieve chute's 500 installed position the webs 530 and 540 extend rearward and incline angularly upward from their respective front extremities 287 and 297 directly to the rear of the rear rail 212 to their respective rear extremities 288 and 298. The sieve chute 500 extends rearward and inclines angularly upward above the return opening 156 to the rear end 500D toward the rear extremity 112 of the chaffer 100 from the front end 500C proximate to the rear rail 212 of the rear extremity 122 of the lower sieve 102. The plate 510 follows the webs 530 and 540, projecting rearward and inclining angularly upward from the front end's 500C front edge 516 between the notches 516A and 516B and in direct contact against the rear rail's 212 upper surface 212C between the rear end 202B and the lug 214 to and beyond the rear extremities 288 and 298 of the respective webs 530 and 540 to the flange 550 defining the plate's 510 flanged rear extremity 500D. The flange 550 projecting upright from the plate's 510 upper surface 520 to the plate's 510 rear edge 518 forms a gap G1 between the flange's 550 rear edge 518, also the rear edge of the plate 510, and the chaffer's 100 rear extremity 112. The space or gap G1 in FIG. 37 follows the sieve chute's 550 rear edge 518, the space or gap G1 extending transversely under the chaffer's 100 rear extremity 112 from the sieve chute's 500 left end 500A to its right end 500B. The direct contact of the front end's 500C front edge 516 between the notches 516A and 516B against the rear rail's 212 upper surface 212C between the rear end 202B and the lug 214 forms or otherwise defines a closed interface between the front end's 500C front edge 516 extending between the notches 516A and 516B and the rear rail 212, specifically the upper surface 212C of the rear rail 212 between the rear end 202B and the lug 214. Accordingly, the sieve chute 500 extends forward and slopes downward from its rear end 500D to its front end 500C.

Referring in relevant part to FIGS. 30-34, 36, and 38, in the sieve chute's 500' installed position the webs 530' and 540' extend rearward and incline angularly upward from their respective front extremities 287' and 297' directly to the rear of the rear rail 212 to their respective rear extremities 288' and 298'. The sieve chute 500' extends rearward and inclines angularly upward above the return opening 156 to the rear end 500D' toward the rear extremity 112 of the chaffer 100 from the front end 500C' proximate to the rear rail 212 of the rear extremity 122 of the lower sieve 102. The plate 510' follows the webs 530' and 540', projecting rearward and inclining angularly upward from the front end's 500C front edge 516' between the notches 516A' and 516B' and in direct contact against the rear rail's 212 upper surface 212C between the rear end 204B and the lug 214 to and beyond the rear extremities 288' and 298' of the respective webs 530' and 540' to the flange 500 that defines the plate's 510' flanged rear extremity 500D'. The flange 550' projects upright from the plate's 510' upper surface 520' to the plate's 510' rear edge 518', forming a gap G1' between the flange's 550' rear edge 518', also the rear edge of the plate 510', and the chaffer's 100 rear extremity 112. The space or gap G1' in FIG. 38 is identical to the gap G1 in FIG. 37 and extends transversely under the chaffer's 100 rear extremity 112 from the sieve chute's 500' left end 500A' to its right end 500B'. The direct contact of the front end's 500C' front edge 516' between the notches 516A' and 516B' against the rear rail's 212 upper surface 212C between the rear end 204B and the lug 214 forms or otherwise defines a closed interface between the front end's 500C' front edge 516' extending between the notches 516A' and 516B' and the rear rail 212, specifically the upper surface 212C of the rear rail 212 between the rear end 204B and the lug 214. Accordingly, the sieve chute 500' extends forward and slopes downward from its rear end 500D' to its front end 500C'.

Concerning the assembly of the sieve chutes 500 and 500' and the lower sieve 102 referencing FIGS. 31-38 relevantly, the sieve chutes 500 and 500' are mounted proximate to the rear extremity 122 of the lower sieve 102. They are spaced under the chaffer 100 extending rearward beyond the rear extremity 122 of the lower sieve 102. The sieve chute 500 extends transversely along the width of the lower sieve 102 from its end 500A connected to the frame's 200 rear end 202B to its end 500B connected to the frame's 200 lug 214 centered between the rear ends 202B and 204B. The sieve chute 500 extends rearward and inclines angularly upward from the lower sieve's 102 rear extremity 122 toward the chaffer's 100 rear extremity 112 extending beyond the lower sieve's 102 rear extremity 122. The sieve chute 500 extends upright so its webs 530 and 540 extend upright to the plate 510 and the plate's 510 upper surface 520 facing upward toward the chaffer 100 extending rearward beyond the rear extremity 122 of the lower sieve 102. Based on this, the sieve chute 500 and its upper surface 520 extend forward and slope downward from the rear end 500D to the front end 500C at the lower sieve's 102 rear extremity 122. The sieve chute 500' extends transversely along the width of the lower sieve 102 from its end 500A' connected to the frame's 200 lug 214 centered between the rear ends 202B and 204B to its end 500B' connected to the frame's 200 rear end 204B. The sieve chute 500' extends rearward and inclines angularly upward from the lower sieve's 102 rear extremity 122 toward the chaffer's 100 rear extremity 112 extending beyond the lower sieve's 102 rear extremity 122. The sieve chute 500' extends upright so its webs 530' and 540' extend upright to the plate 510' and the plate's 510' upper surface 520' facing upward toward the chaffer 100 extending rearward beyond the rear extremity 122 of the lower sieve 102. Based on this, the sieve chute 500' and its upper surface 520' extend forward and slope downward from the rear end 500D' to the front end 500C' at the lower sieve's 102 rear extremity 122. The sieve chutes 500 and 500' are parallel relative to the frame's 200 rear rail 212, perpendicular relative to the lower sieve's sides 124 and 126, and axially aligned transversely along the width of the lower sieve 102 from side 124 to side 126. The sieve chutes 500 and 500' are transverse to the crop layer flow path P and the airflow pathway F in FIGS. 37 and 38 and the combine's 50 longitudinal axis extending from the header 60 to its rear or discharge end. The sieve chutes 500 and 500' are spaced vertically under the rear extremity 112 of the chaffer 100 extending rearward beyond the rear extremity 122 of the lower sieve 102 and over the return opening 156.

Accordingly, the sieve chutes 500 and 500' extend rearward and incline angularly upward toward the chaffer's 100 rear extremity 112 extending rearward beyond the rear extremity 122 of the lower sieve 102 from the lower sieve's 102 rear extremity 122. Being inclined, the sieve chutes 500 and 500' and their upper surfaces 520 and 520' tilt forward toward the lower sieve's 102 rear extremity 122. They are spaced below the chaffer's 100 rear extremity 112 extending rearward beyond the rear extremity 122 of the lower sieve 102. This forms the gap G1 between the chaffer's 100 rear extremity 112 and the rear edge 518 of the sieve chute's 500 rear end 500D and the gap G1' between the chaffer's 100 rear extremity 112 and the rear edge 518' of the sieve chute's 500' rear end 500D'. The sieve chutes 500 and 500' are above the return opening 156. They extend upright to their respective upper surfaces 520 and 520'. The upper surfaces 520 and 520' face upward toward the chaffer's 100 rear extremity 112 extending rearward beyond the rear extremity 122 of the lower sieve 102. The upper surfaces 520 and 520' extending to the respective flanges 550 and 550' incline angularly upward from the lower sieve 102 and away from the combine's 50 discharge end, in which the upper surfaces 520 and 520' tilt forward toward the lower sieve's 102 rear extremity 122. Accordingly, the sieve chute 500 and its upper surface 520 slope downward sufficiently from the rear end 500D to the front end 500 at the lower sieve's 102 rear extremity 122 and the sieve chute 500' and its upper surface 520' slope downward sufficiently from the rear end 500D' to the front end 500C' at the lower sieve's 102 rear extremity 122 to allow the sieve chutes 500 and 500' to favorably influence clean grain 160 loss to the return 150 and the yield of clean grain 160 to the combine's 50 a clean grain trough 140 and its grain tank. Their deflecting surfaces, the respective upper surfaces 520 and 520' tilted forward toward the lower sieve's 102 rear extremity 122, are sufficiently inclined to enable them to intercept clean grain 160 falling downward from the chaffer 100 extending rearward beyond the rear extremity 122 of the lower sieve 102 to the rear of the lower sieve's 102 rear extremity 122 and inherently divert it forward in the direction of arrows E and E', respectively, to the lower sieve 102 away from the return opening 156. The diverted clean grain 160 passes by sliding downward and forward along the sloped upper surfaces 520 and 520' to the respective front ends 500C and 500C', forward beyond the front ends 500C and 500C' of the respective sieve chutes 500 and 500' to the lower sieve 102, and downward through the lower sieve 102 to the clean grain chute 104, not to the return opening 156. At the same time, the sieve chutes 500 and 500' allow air to flow rearward through the airflow pathway F in FIGS. 37 and 38 between the rear extremity 112 of the chaffer 100 extending rearward beyond the rear extremity 122 of the lower sieve 102 and the sieve chutes 500 and 500' and through the gaps G1 and G1' in FIGS. 37 and 38, respectively. The airflow pathway F allows the air from the fan 108 in FIG. 4 to blow over and rearward over the lower sieve 102 and the sieve chutes 500 and 500' under the chaffer 100 and through the gaps G1 and G1' to facilitate the expulsion of impurities through the discharge end at the rear of the combine 50 while the upper surfaces 520 and 520' of the sieve chutes 500 and 500' over the return opening 156 intercept the clean grain 160 falling downward from the chaffer's 100 rear extremity 112 extending rearward beyond the rear extremity 122 of the lower sieve 102 and divert the intercepted clean grain 160 forward to the lower sieve 102 in the directions of arrow E and E', respectively, and away from the return opening 156. Thus, the sieve chutes 500 and 500' each usefully ameliorate or otherwise favorably influence the loss of clean grain 160 to the return 150 through the return opening 156 and its return to the combine's 50 threshing and separating apparatus 64 by the return elevator or conveyor 154, the yield of clean grain 160 to the combine's 50 a clean grain trough 140 and its grain tank, the burden on the threshing and separating apparatus 64, preventing it from having to reprocess lost clean grain 160 returned to it from the return 150 in addition to the crop material fed to it from the feeder house 62, the combine's 50 ground speed, the rate at which it moves through a field while harvesting a crop, consumption and degradation of the combine's 50 fuel components, and wear-and-tear on the combine's 50 processor. The closed interfaces between the lower sieve's 102 rear rail 212 and the respective sieve chutes 500 and 500' prevent clean grain 160 and other material from collecting between the sieve chutes 500 and 500' and the lower sieve's 102 rear rail 212, specifically between the sieve chute's 500 front edge 516 between the notches 516A and 516B and the upper surface 212C of the rear rail 212 between the rear rail's 212 end 212A and the lug 214, and between the sieve chute's 500' front edge 516' between the notches 516A' and 516B' and the upper surface 212C of the rear rail 212 between the rear rail's 212 end 212B and the lug 214.

The lower sieve 102 incorporates two sieve chutes 500 and 500' and it can include more or less as desired. If it has one sieve chute, it can extend across the width of the chaffer from side 124 to side 126. Accordingly, the placement of the sieve chutes 500 and 500' under that part of the chaffer 100 extending rearward beyond the rear extremity 122 of the lower sieve 102 allows each of the sieve chute's 500 and 500' to intercept grain from the chaffer 100 and deflect it to the lower sieve 102, stopping it from falling to the return opening 156. Instead of falling to the return opening 156, the grain deflected forward to the lower sieve 102 by each of the sieve chutes 500 and 500' falls through the lower sieve 102 to the clean grain chute 104, through the pathway B by the clean grain chute 104 to the clean grain auger or conveyor 142 operating in the clean grain trough 140.

The gaps G1 and G1' between the chaffer's 100 rear extremity 112 and the respective sieve chutes 500 and 500' are the same as, albeit smaller vertically compared to, the gaps G and G' between the chaffer's 100 rear extremity 112 and the respective sieve chutes 250 and 250'. Accordingly, the gaps G1 and G1' restrict air flow therethrough along airflow pathway F more than gaps G and G', inherently restricting the amount of material that the air from the fan 108 (FIG. 4) can blow therethrough compared to the gaps G and G' relating to the lower sieve 102 configured with the sieve chutes 250 and 250'. The flanges 550 and 550' and their deflecting surfaces 520A and 520A' extend upright toward the chaffer 100 from the respective upper surfaces 520 and 520' to the respective rear edges 518 and 518' and transversely relative to the airflow pathway F. The deflecting surfaces 520A and 520A' of the flanges 550 and 550' directly facing the airflow pathway F intercept clean grain 160 blown rearward through the airflow pathway F by the fan 108 over the respective upper surfaces 520 and 520' and deflect the intercepted clean grain 160 forward to the lower sieve 102 so it falls through the lower sieve 102 to the clean grain chute 104 instead of discharging through the rear of the combine 50 or ejecting rearward beyond the sieve chutes 500 and 500' and falling downward in the direction of arrow C in FIGS. 37 and 38 to the return 150 through the underlying return opening 156 and into to a return pathway D under the clean grain chute 104. Accordingly, the flanges 550 and 550' operating under the respective gaps G1 and G1' usefully ameliorate or otherwise favorably influence gain loss outward through the combine's 50 discharge end and to the return 150 through the return opening 156 and the yield of clean grain 160 to the combine's 50 a clean grain trough 140 and its grain tank.

III.

The present invention is described above with reference to illustrative embodiments. Those skilled in the art will recognize that changes and modifications may be made in the described embodiments without departing from the scope of the present invention. Various changes and modifications to the embodiments herein chosen for purposes of illustration will readily occur to those having ordinary skill in the art. To the extent that such modifications and variations do not depart from the invention, they are intended to be included within the scope thereof.

Having fully described the invention in such clear and concise terms as to enable those having ordinary skill in the art to understand and practice the same, the invention claimed is:

The invention claimed is:
1. A cleaning system for an agricultural combine, comprising:
    a cleaning shoe including a chaffer having a rear extremity and a lower sieve having a rear extremity, the chaffer spaced over the lower sieve, a rear section of the chaffer extending rearward beyond the rear extremity of the lower sieve to the rear extremity of the chaffer;
    a fan configured to blow air rearward and upward through the chaffer and the lower sieve;
    a clean grain chute having a rear extremity, the clean grain chute under the lower sieve and configured to receive clean grain from the chaffer and the lower sieve;
    a return chute under the clean grain chute;
    a return opening open to the cleaning shoe and the return chute, the return opening between the return chute and the rear extremity of the clean grain chute;

the return chute configured to receive unclean grain and tailings from the cleaning shoe through the return opening; and a sieve chute mounted proximate to the rear extremity of the lower sieve, the sieve chute spaced under the rear section of the chaffer and extending rearward and angularly upward above the return opening from the rear extremity of the lower sieve and toward the rear extremity of the chaffer, allowing the sieve chute to intercept clean grain that falls downward from the rear section of the chaffer over the sieve chute and divert it forward away from the return opening under the sieve chute and to the lower sieve for falling downward therethrough to the clean grain chute.

2. The cleaning system according to claim 1, further comprising:

the rear extremity of the lower sieve including a transverse member; and the sieve chute including a front end and a rear end, the sieve chute extending rearward and angularly upward above the return opening to the rear end toward the rear extremity of the chaffer from the front end proximate to the transverse member.

3. The cleaning system according to claim 2, the front end comprises a front edge, the front edge in direct contact against the transverse member, defining a closed interface between the front edge and the transverse member.

4. The cleaning system according to claim 2, the rear end comprising a flange projecting upward toward the rear extremity of the chaffer.

5. The cleaning system according to claim 1, further comprising the sieve chute mounted directly to the lower sieve.

6. The cleaning system according to claim 1, further comprising a pathway for air from the fan to flow between the rear extremity of the chaffer and the sieve chute.

7. A cleaning system for an agricultural combine, comprising:

a cleaning shoe including a chaffer having a rear extremity and a lower sieve having a first side and a second side extending between a front extremity and a rear extremity, the chaffer spaced over the lower sieve, a rear section of the chaffer extending rearward beyond the rear extremity of the lower sieve to the rear extremity of the chaffer;

a fan configured to blow air rearward and upward through the chaffer and the lower sieve;

a clean grain chute having a rear extremity, the clean grain chute under the lower sieve and configured to receive clean grain from the chaffer and the lower sieve;

a return chute under the clean grain chute;

a return opening open to the cleaning shoe and the return chute, the return opening between the return chute and the rear extremity of the clean grain chute;

the return chute configured to receive unclean grain and tailings from the cleaning shoe through the return opening; and a sieve chute mounted proximate to the rear extremity of the lower sieve, the sieve chute spaced under the rear section of the chaffer, extending between the first side and the second side, and extending rearward and angularly upward above the return opening from the rear extremity of the lower sieve and toward the rear extremity of the chaffer, allowing the sieve chute to intercept clean grain that falls downward from the rear section of the chaffer over the sieve chute and divert it forward away from the return opening under the sieve chute and to the lower sieve for falling downward therethrough to the clean grain chute.

8. The cleaning system according to claim 7, further comprising:

the rear extremity of the lower sieve including a transverse member; and the sieve chute including a front end and a rear end, the sieve chute extending rearward and angularly upward above the return opening to the rear end toward the rear extremity of the chaffer from the front end proximate to the transverse member.

9. The cleaning system according to claim 8, the front end comprises a front edge, the front edge in direct contact against the transverse member, defining a closed interface between the front edge and the transverse member.

10. The cleaning system according to claim 8, the rear end comprising a flange projecting upward toward the rear extremity of the chaffer.

11. The cleaning system according to claim 7, further comprising the sieve chute mounted directly to the lower sieve.

12. The cleaning system according to claim 7, further comprising a pathway for air from the fan to flow between the rear extremity of the chaffer and the sieve chute.

13. A cleaning system for an agricultural combine, comprising:

a cleaning shoe including a chaffer having a rear extremity and a lower sieve having a rear extremity, the chaffer spaced over the lower sieve, a rear section of the chaffer extending rearward beyond the rear extremity of the lower sieve to the rear extremity of the chaffer;

a fan configured to blow air rearward and upward through the chaffer and the lower sieve;

a clean grain chute having a rear extremity, the clean grain chute under the lower sieve and configured to receive clean grain from the chaffer and the lower sieve;

a return chute under the clean grain chute;

a return opening open to the cleaning shoe and the return chute, the return opening between the return chute and the rear extremity of the clean grain chute;

the return chute configured to receive unclean grain and tailings from the cleaning shoe through the return opening; and a first sieve chute and a second sieve chute mounted proximate to the rear extremity of the lower sieve, the first sieve chute and the second sieve chute spaced under the rear section of the chaffer in side-by-side fashion and extending rearward and angularly upward above the return opening from the rear extremity of the lower sieve and toward the rear extremity of the chaffer, allowing the first sieve chute and the second sieve chute to intercept clean grain that falls downward from the rear section of the chaffer over the first sieve chute and the second sieve chute and divert it forward away from the return opening under the first sieve chute and the second sieve chute and to the lower sieve for falling downward therethrough to the clean grain chute.

14. The cleaning system according to claim 13, further comprising:

the rear extremity of the lower sieve including a transverse member; and the first sieve chute and the second sieve chute each including a front end and a rear end and extending rearward and angularly upward above the return opening to the rear end toward the rear extremity of the chaffer from the front end.

15. The cleaning system according to claim 14, the front end comprises a front edge, the front edge in direct contact against the transverse member, defining a closed interface between the front edge and the transverse member.

16. The cleaning system according to claim 14, the rear end comprising a flange projecting upward toward the rear extremity of the chaffer.

17. The cleaning system according to claim 13, wherein the first sieve chute and the second sieve chute are identical.

18. The cleaning system according to claim 13, further comprising the first sieve chute and the second sieve chute each mounted directly to the lower sieve.

19. The cleaning system according to claim 13, further comprising a pathway for air from the fan to flow between the rear extremity of the chaffer and the first sieve chute and the second sieve chute.

20. A cleaning system for an agricultural combine, comprising:
- a cleaning shoe including a chaffer having a rear extremity and a lower sieve having a first side and a second side extending between a front extremity and a rear extremity, the chaffer spaced over the lower sieve, a rear section of the chaffer extending rearward beyond the rear extremity of the lower sieve to the rear extremity of the chaffer;
- a fan configured to blow air rearward and upward through the chaffer and the lower sieve;
- a clean grain chute having a rear extremity, the clean grain chute under the lower sieve and configured to receive clean grain from the chaffer and the lower sieve;
- a return chute under the clean grain chute;
- a return opening open to the cleaning shoe and the return chute, the return opening between the return chute and the rear extremity of the clean grain chute;
- the return chute configured to receive unclean grain and tailings from the cleaning shoe through the return opening; and
- a first sieve chute and a second sieve chute mounted proximate to the rear extremity of the lower sieve, the first sieve chute and the second sieve chute spaced under the rear section of the chaffer in side-by-side fashion extending between the first side and the second side and extending rearward and angularly upward above the return opening from the rear extremity of the lower sieve and toward the rear extremity of the chaffer, allowing the first sieve chute and the second sieve chute to intercept clean grain that falls downward from the rear section of the chaffer over the first sieve chute and the second sieve chute and divert it forward away from the return opening under the first sieve chute and the second sieve chute and to the lower sieve for falling downward therethrough to the clean grain chute.

21. The cleaning system according to claim 20, further comprising:
- the rear extremity of the lower sieve including a transverse member; and
- the first sieve chute and the second sieve chute each including a front end and a rear end and extending rearward and angularly upward above the return opening to the rear end toward the rear extremity of the chaffer from the front end.

22. The cleaning system according to claim 21, the front end comprises a front edge, the front edge in direct contact against the transverse member, defining a closed interface between the front edge and the transverse member.

23. The cleaning system according to claim 21, the rear end comprising a flange projecting upward toward the rear extremity of the chaffer.

24. The cleaning system according to claim 20, wherein the first sieve chute and the second sieve chute are identical.

25. The cleaning system according to claim 20, further comprising the first sieve chute and the second sieve chute each mounted directly to the lower sieve.

26. The cleaning system according to claim 20, further comprising a pathway for air from the fan to flow between the rear extremity of the chaffer and the first sieve chute and the second sieve chute.

* * * * *